(12) United States Patent
Leitersdorf et al.

(10) Patent No.: US 11,068,925 B2
(45) Date of Patent: Jul. 20, 2021

(54) REAL-TIME DIGITAL ASSET SAMPLING APPARATUSES, METHODS AND SYSTEMS

(71) Applicant: ADFIN SOLUTIONS, INC., New York, NY (US)

(72) Inventors: Jonathan Leitersdorf, Verbier (CH); Milosz Tanski, Brooklyn, NY (US)

(73) Assignee: ADFIN SOLUTIONS, INC., New York, NY (US)

( * ) Notice: Subject to any disclaimer, the term of this patent is extended or adjusted under 35 U.S.C. 154(b) by 951 days.

(21) Appl. No.: 14/760,613

(22) PCT Filed: Jan. 13, 2014

(86) PCT No.: PCT/US2014/011357
§ 371 (c)(1),
(2) Date: Jul. 13, 2015

(87) PCT Pub. No.: WO2014/110536
PCT Pub. Date: Jul. 17, 2014

(65) Prior Publication Data
US 2015/0363820 A1 Dec. 17, 2015

Related U.S. Application Data

(60) Provisional application No. 61/751,929, filed on Jan. 13, 2013.

(51) Int. Cl.
*G06Q 30/02* (2012.01)
*G06Q 10/04* (2012.01)
*G06Q 40/02* (2012.01)

(52) U.S. Cl.
CPC ......... *G06Q 30/0242* (2013.01); *G06Q 10/04* (2013.01); *G06Q 30/02* (2013.01); *G06Q 30/0273* (2013.01); *G06Q 40/02* (2013.01)

(58) Field of Classification Search
CPC .... G06Q 30/0242; G06Q 30/02; G06Q 10/04; G06Q 40/02; G06Q 30/0273
See application file for complete search history.

(56) References Cited

U.S. PATENT DOCUMENTS 5,471,622 A * 11/1995 Eadline .................. G06F 8/313
6,131,087 A 10/2000 Luke et al.
(Continued)

OTHER PUBLICATIONS

Supplementary European Search Report, dated Jun. 17, 2016 for EP Application No. 14738288.1, filed Jan. 13, 2014.
(Continued)

*Primary Examiner* — Mario C. Iosif

(57) ABSTRACT

The real-time digital asset sampling apparatuses, methods and systems ("RDA") transform ad bidding requests via RDA components and/or the like into ad pricing indices, financial instruments and/or the like. In one implementation, the RDA may determine a digital asset market bid sampling distribution for a digital asset associated with a plurality of attribute parameters; submit a digital asset pricing bid to an exchange platform; determine a current digital asset price based on bidding result of the digital asset market bids sampling; and aggregate the determined current digital asset price to generate a digital asset price index for the digital asset associated with a plurality of attribute parameters.

16 Claims, 62 Drawing Sheets

Example RDA Query Processing

(56) References Cited

U.S. PATENT DOCUMENTS

| | | | |
|---|---|---|---|
| 6,470,333 B1* | 10/2002 | Baclawski | G06F 16/2255 |
| 2002/0052766 A1 | 5/2002 | Dingman et al. | |
| 2004/0193488 A1* | 9/2004 | Khoo | G06Q 30/02 |
| | | | 705/14.52 |
| 2005/0046584 A1 | 3/2005 | Breed | |
| 2005/0235030 A1* | 10/2005 | Lauckhart | G06F 17/30864 |
| | | | 709/200 |
| 2006/0026067 A1* | 2/2006 | Nicholas | G06Q 30/00 |
| | | | 705/14.58 |
| 2006/0100949 A1 | 5/2006 | Whaley et al. | |
| 2007/0055569 A1* | 3/2007 | Subramanian | G06Q 30/02 |
| | | | 705/14.42 |
| 2008/0082435 A1 | 4/2008 | O'Brien et al. | |
| 2010/0145794 A1 | 6/2010 | Barger et al. | |
| 2010/0318451 A1 | 12/2010 | Niccolini et al. | |
| 2010/0332413 A1 | 12/2010 | Ballow et al. | |
| 2011/0295826 A1* | 12/2011 | McLellan | G06F 17/30867 |
| | | | 707/706 |
| 2012/0041862 A1 | 2/2012 | Bul et al. | |
| 2013/0311351 A1 | 11/2013 | Chatter et al. | |
| 2014/0114788 A1* | 4/2014 | Baskin | G06Q 30/08 |
| | | | 705/26.3 |

OTHER PUBLICATIONS

International Search Report and Written Opinion, dated May 1, 2014, for PCT/US2014/011357.

* cited by examiner

Example Data Flow: RDA Bidding Data Collection

Example RDA Logic Flow: Creating Index

Example RDA Logic Flow: Generating an Index 3 35

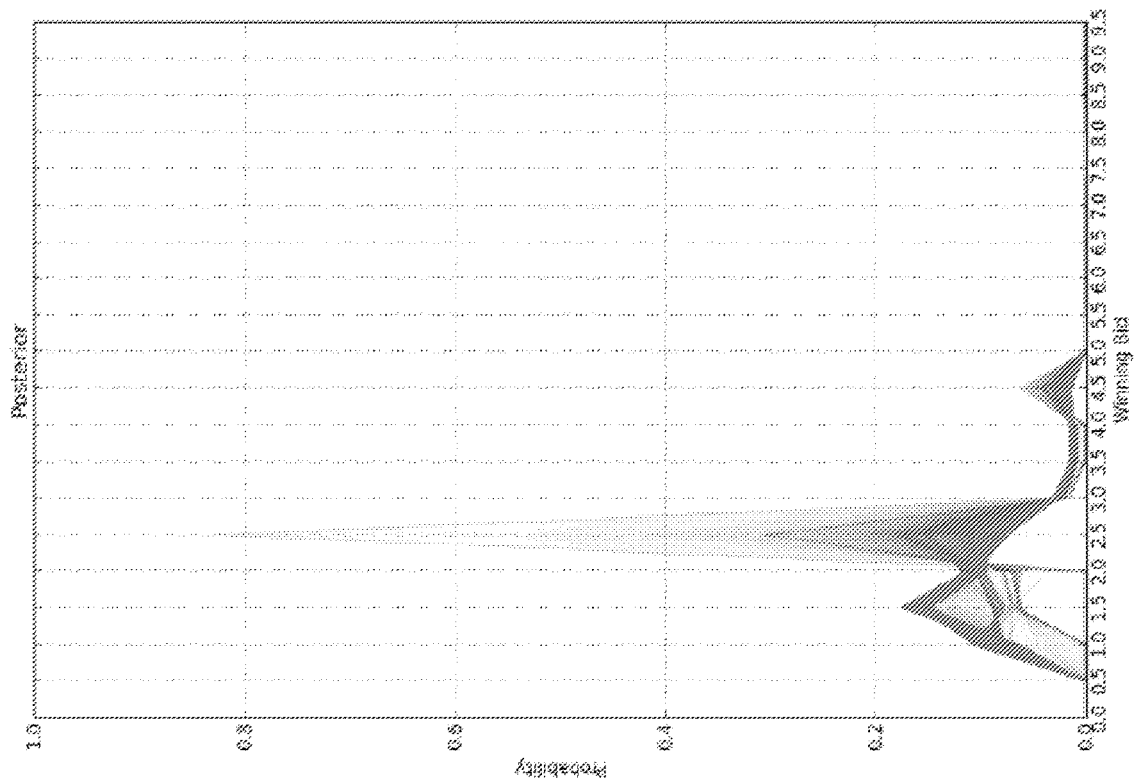
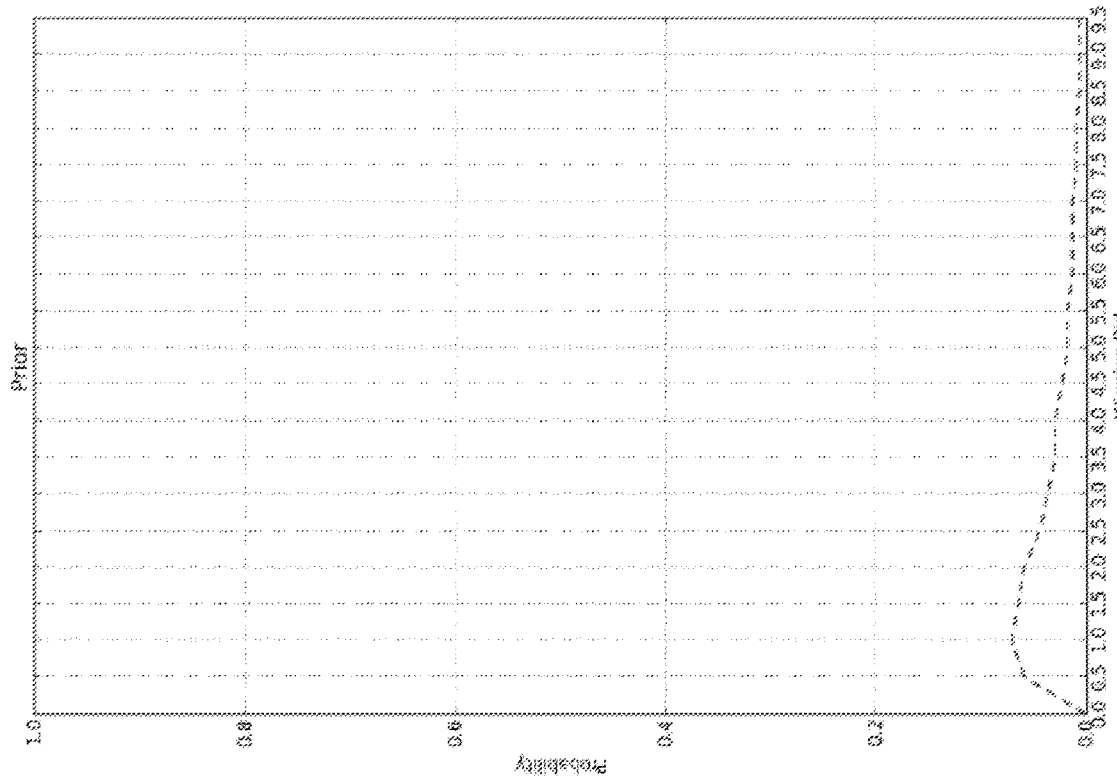
FIG 4B

| Attribute Group | Attribute | Type | Values |
|---|---|---|---|
| Time | Hour of Day | numeric | 24 (1 to 24) |
| | Day of Week | numeric | 7 (1 to 7) |
| | Optional - Day of Month | numeric | 31 (1 to 31) |
| Location | US State | categorical | 50 |
| | Optional - DMA | categorical | ≈100 |
| | Optional - City | categorical | ≈1500 |
| User Demographic | Age Group | categorical | 13 |
| | Gender | categorical | 2 |
| | Household Income | categorical | 7 |
| User Interest[2] | Interest Group | categorical | ≈25 |
| Publisher | Context Classification | categorical | 30 |
| Ad Type | Ad Size | categorical | 7 |
| | Ad Position | categorical | 3 |

Example RDA Analysis: Ad Attributes

FIG 4C

| Scenario | Limitation | Size³ | | | | | |
|---|---|---|---|---|---|---|---|
| | | Time | Location | Demogr. | Interest | Publisher | Ad Type |
| A[4] | None | 6400 | 1500 | 336 | 26 | 31 | 32 |
| B[5] | Only DMA | 6400 | 200 | 336 | 26 | 31 | 32 |
| $T_1$ | No Month | 200 | 1500 | 336 | 26 | 31 | 32 |
| $T_2$ | 10 DMA | 6400 | 60 | 336 | 26 | 31 | 32 |
| $T_3$ | 10 Interests | 6400 | 1500 | 336 | 11 | 31 | 32 |
| $T_4$ | 3 Ad Types | 6400 | 1500 | 336 | 26 | 31 | 4 |
| C | B, $T_1$ | 200 | 200 | 336 | 26 | 31 | 32 |
| D | $T_1, T_2, T_3, T_4$ | 200 | 60 | 336 | 11 | 31 | 4 |

Example RDA Analysis: Scenarios for Reduced Attributes

FIG 4D

| Scenario | Accuracy ($\varepsilon$) | $\Sigma N_i$ | $N(\varepsilon, \alpha, \beta)$ | $n(\varepsilon, \alpha, \beta, H)$ |
|---|---|---|---|---|
| A | 0.05 | 8,325 | 22,478,000 | ≤16,000 |
| A | 0.1 | 8,325 | 5,661,000 | ≤4,000 |
| B | 0.05 | 7,025 | 18,968,000 | ≤13,500 |
| B | 0.1 | 7,025 | 4,777,000 | ≤3,400 |
| C | 0.05 | 825 | 2,228,000 | ≤1,600 |
| C | 0.1 | 825 | 561,000 | ≤400 |
| D | 0.05 | 642 | 1,738,000 | ≤1,200 |
| D | 0.1 | 642 | 437,000 | ≤300 |

Example RDA Analysis: Sampling Accuracy

FIG 4E

| Scenario | L | $L_{id}$ | N | c | s | q | Av. Bid | Upp. Bound | Exp. Cost |
|---|---|---|---|---|---|---|---|---|---|
| A | 7 | 0 | 22,478,000 | 0.05 | $0.50 | 80% | $4.20 | $84,407 | $33,042 |
| A | 7 | 3 | 22,478,000 | 0.05 | $0.50 | 80% | $2.81 | $56,793 | $23,698 |
| A | 7 | 0 | 22,478,000 | 0.05 | $0.50 | 75% | $2.40 | $63,047 | $25,175 |
| A | 7 | 3 | 22,478,000 | 0.05 | $0.50 | 75% | $1.58 | $35,043 | $19,202 |
| B | 7 | 0 | 18,868,000 | 0.05 | $0.50 | 80% | $4.20 | $79,885 | $27,882 |
| B | 7 | 3 | 18,868,000 | 0.05 | $0.50 | 80% | $2.81 | $49,557 | $19,897 |
| B | 7 | 0 | 18,868,000 | 0.05 | $0.50 | 75% | $2.40 | $45,523 | $21,244 |
| B | 7 | 3 | 18,868,000 | 0.05 | $0.50 | 75% | $1.58 | $20,077 | $10,204 |
| C | 7 | 0 | 2,229,000 | 0.05 | $0.50 | 80% | $4.20 | $8,357 | $3,275 |
| C | 7 | 3 | 2,229,000 | 0.05 | $0.50 | 80% | $2.81 | $5,824 | $2,348 |
| C | 7 | 0 | 2,229,000 | 0.05 | $0.50 | 75% | $2.40 | $5,347 | $2,495 |
| C | 7 | 3 | 2,229,000 | 0.05 | $0.50 | 75% | $1.58 | $3,532 | $1,903 |
| D | 7 | 0 | 1,738,000 | 0.05 | $0.50 | 80% | $4.20 | $7,299 | $2,554 |
| D | 7 | 3 | 1,738,000 | 0.05 | $0.50 | 80% | $2.81 | $4,543 | $1,832 |
| D | 7 | 0 | 1,738,000 | 0.05 | $0.50 | 75% | $2.40 | $4,171 | $1,946 |
| D | 7 | 3 | 1,738,000 | 0.05 | $0.50 | 75% | $1.58 | $2,755 | $1,484 |

Example RDA Analysis: Ad Market Sampling

FIG 4F

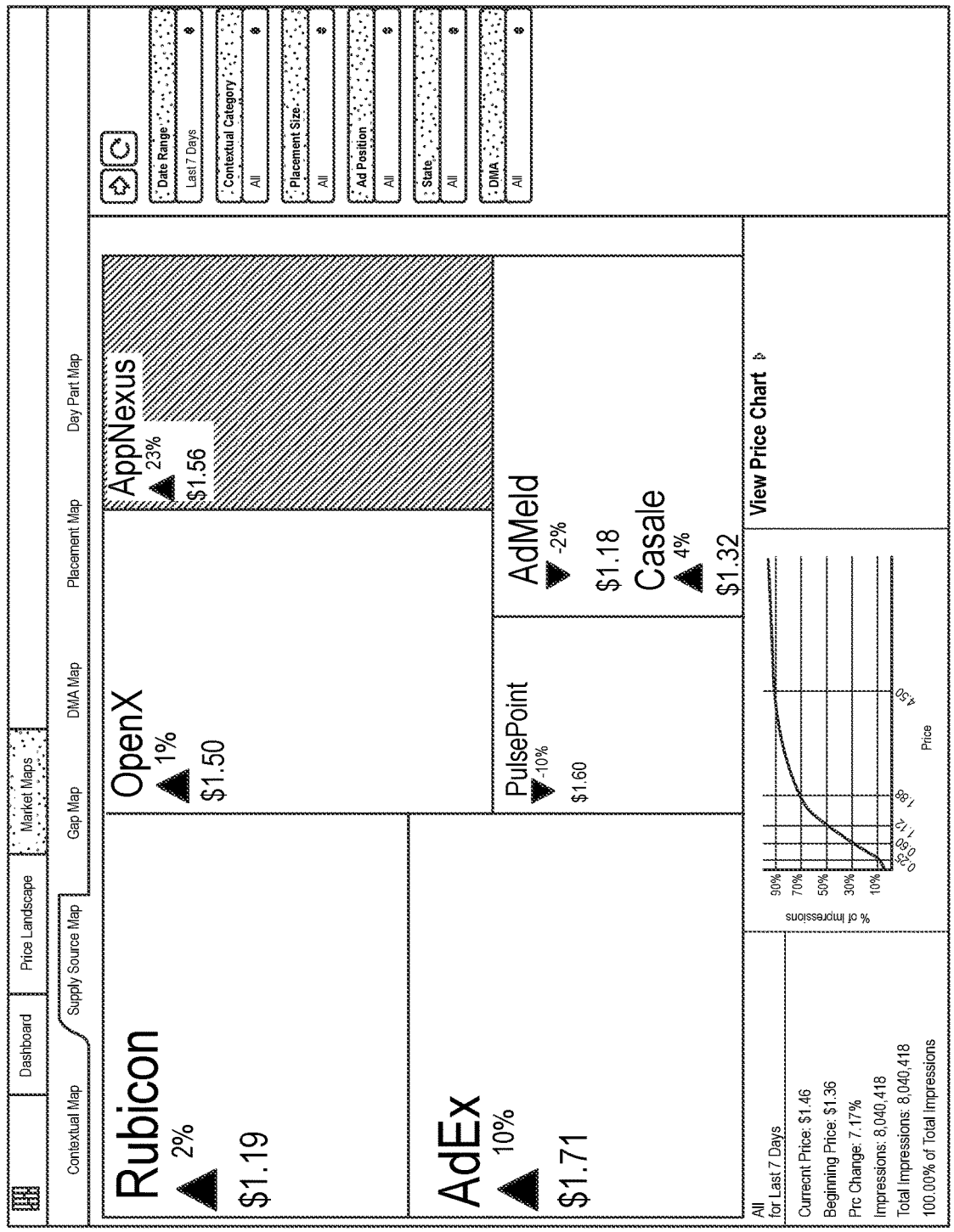
FIG 5D  Example RDA UI: Ad Market Performance

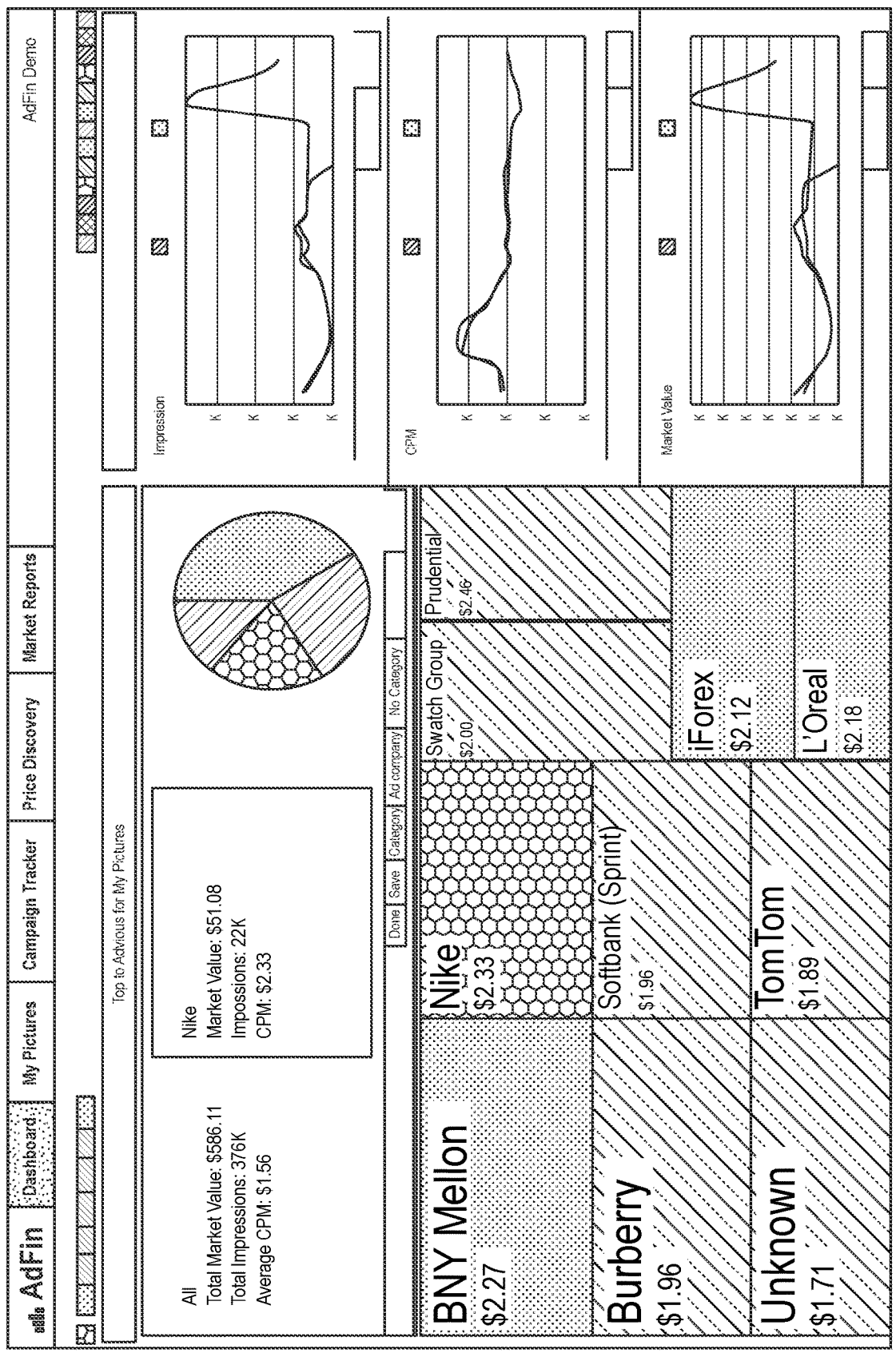
FIG 5Kii

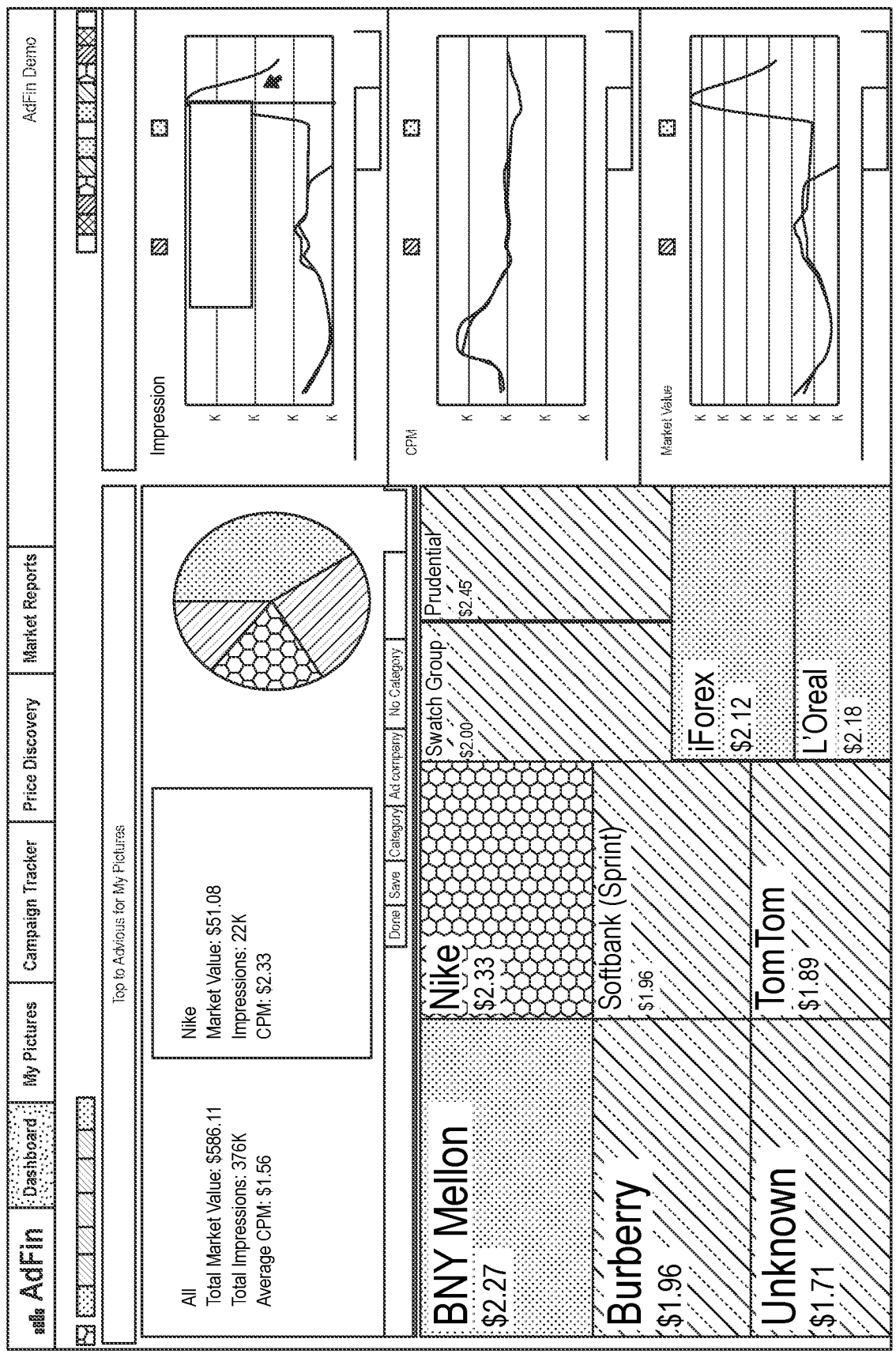
FIG 5Kiii

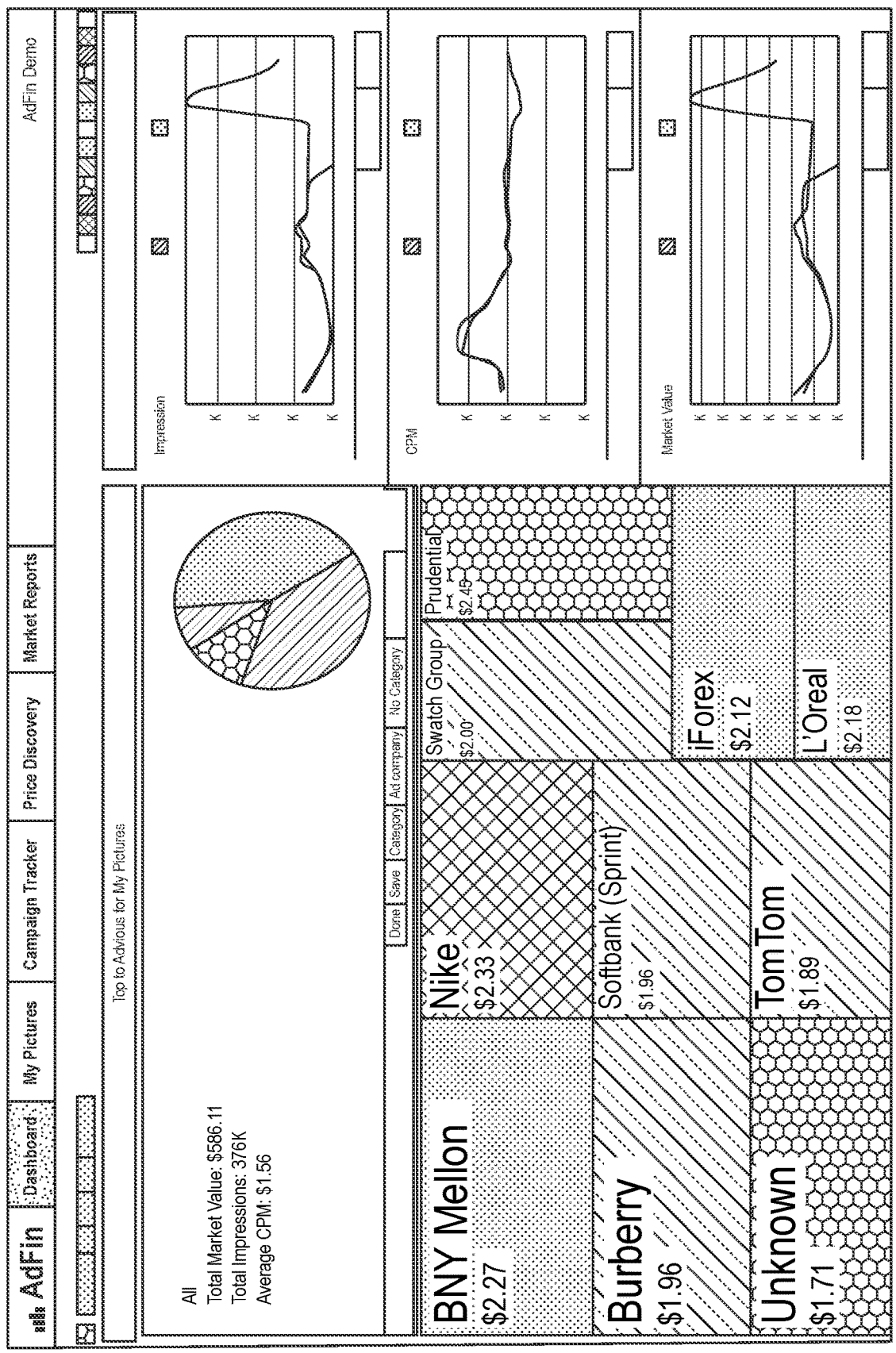
FIG 5Kiv

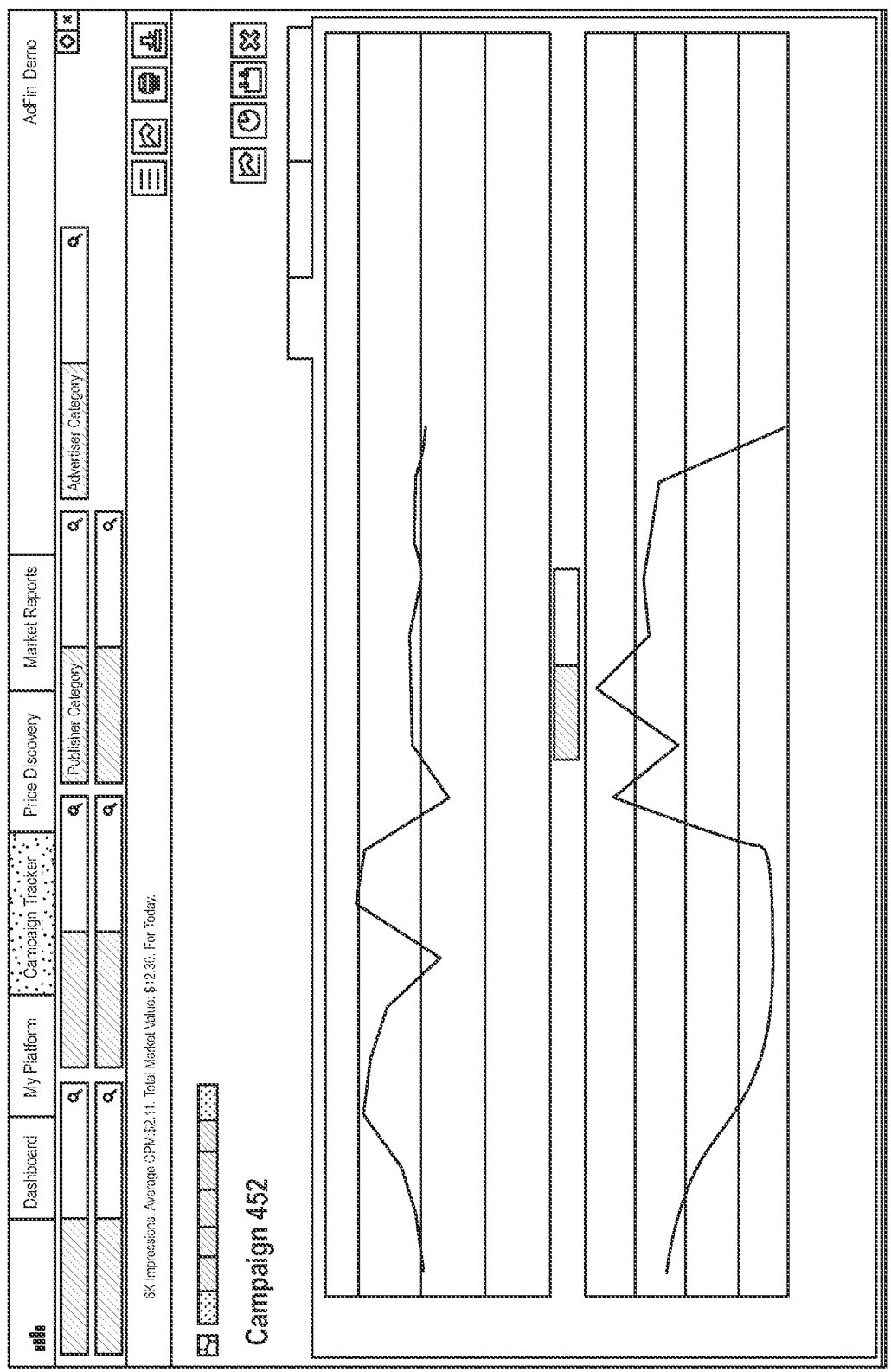
FIG 5Lii

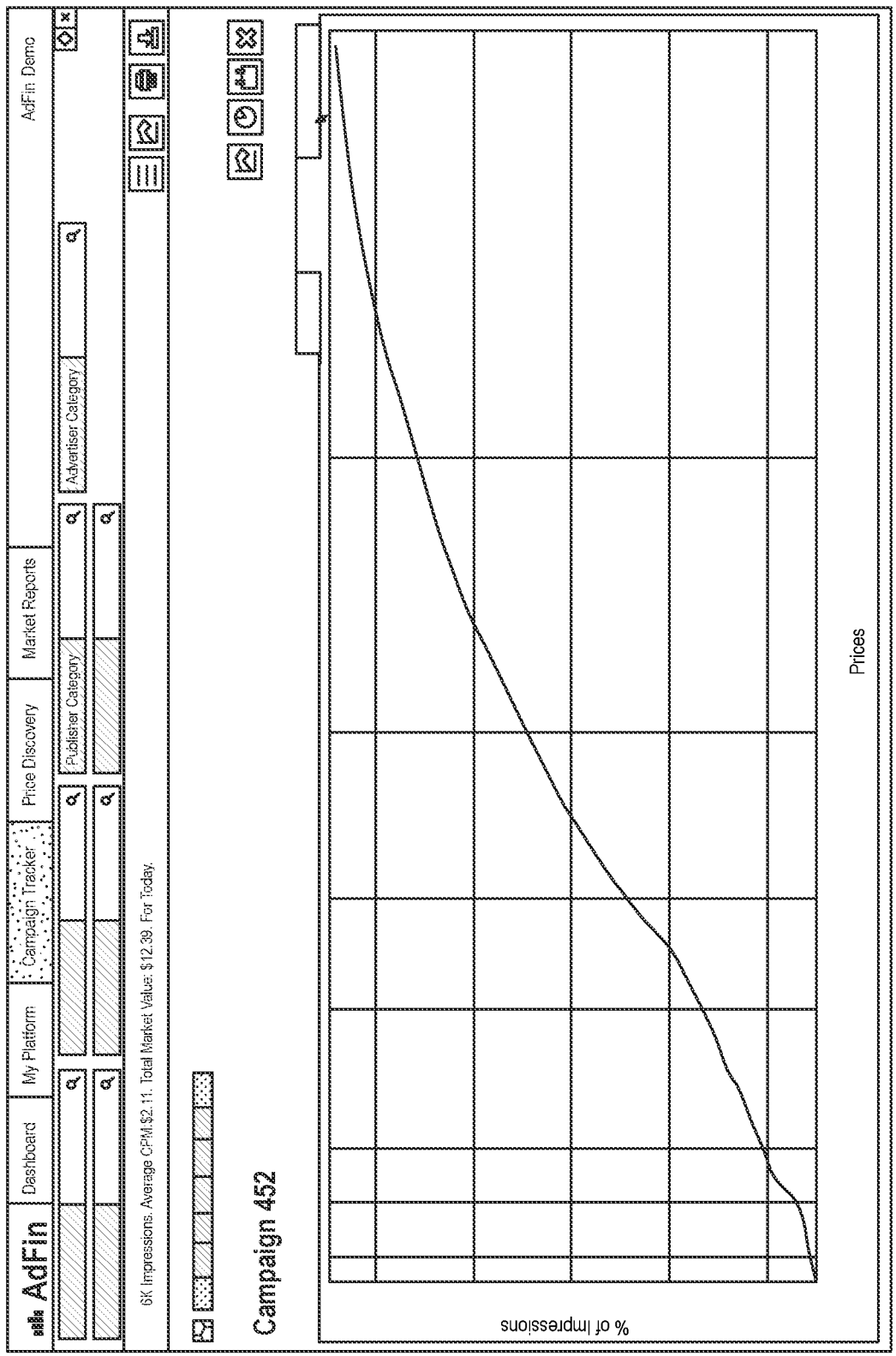
FIG. 5.iii

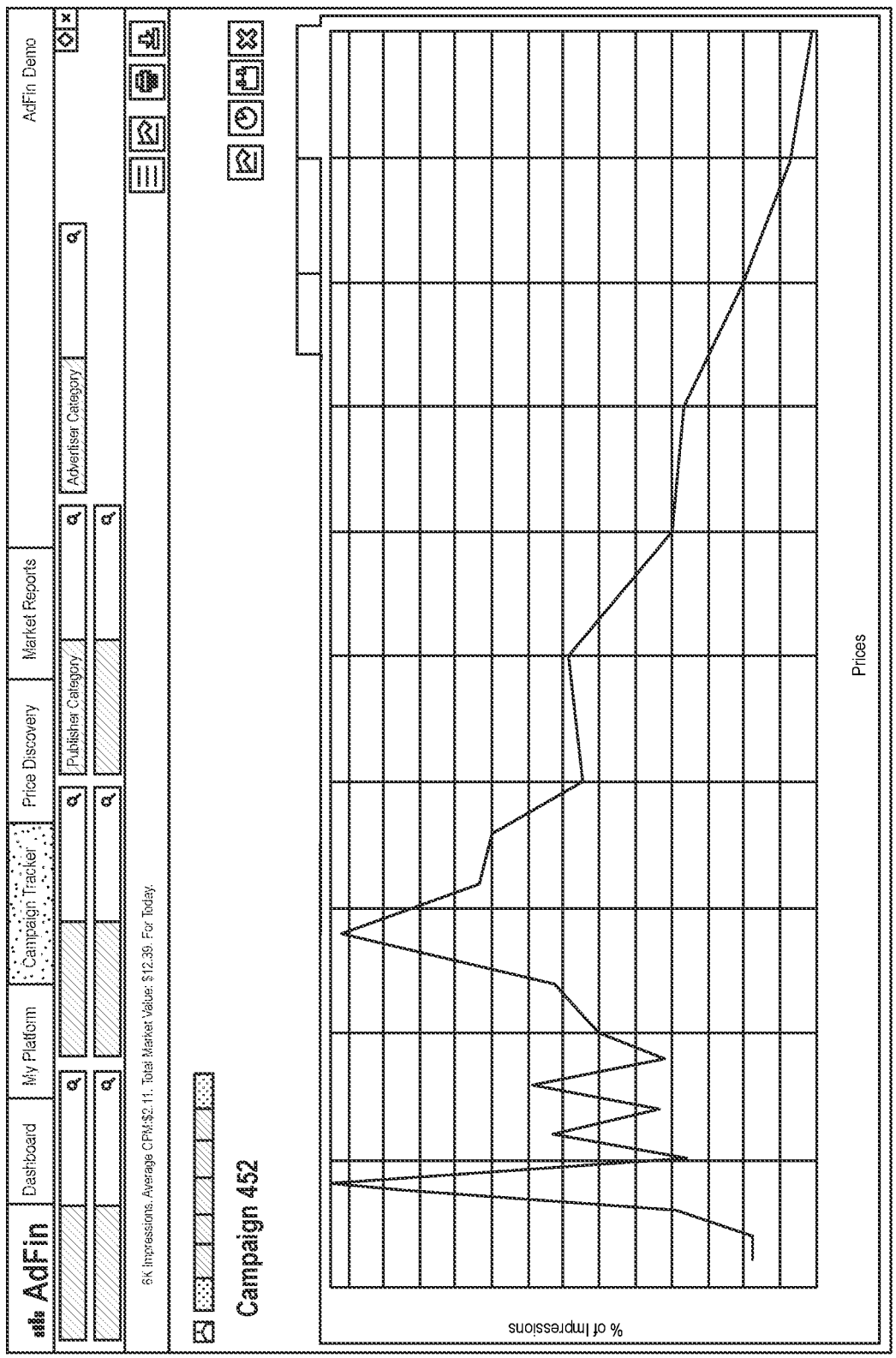
FIG 5Liv

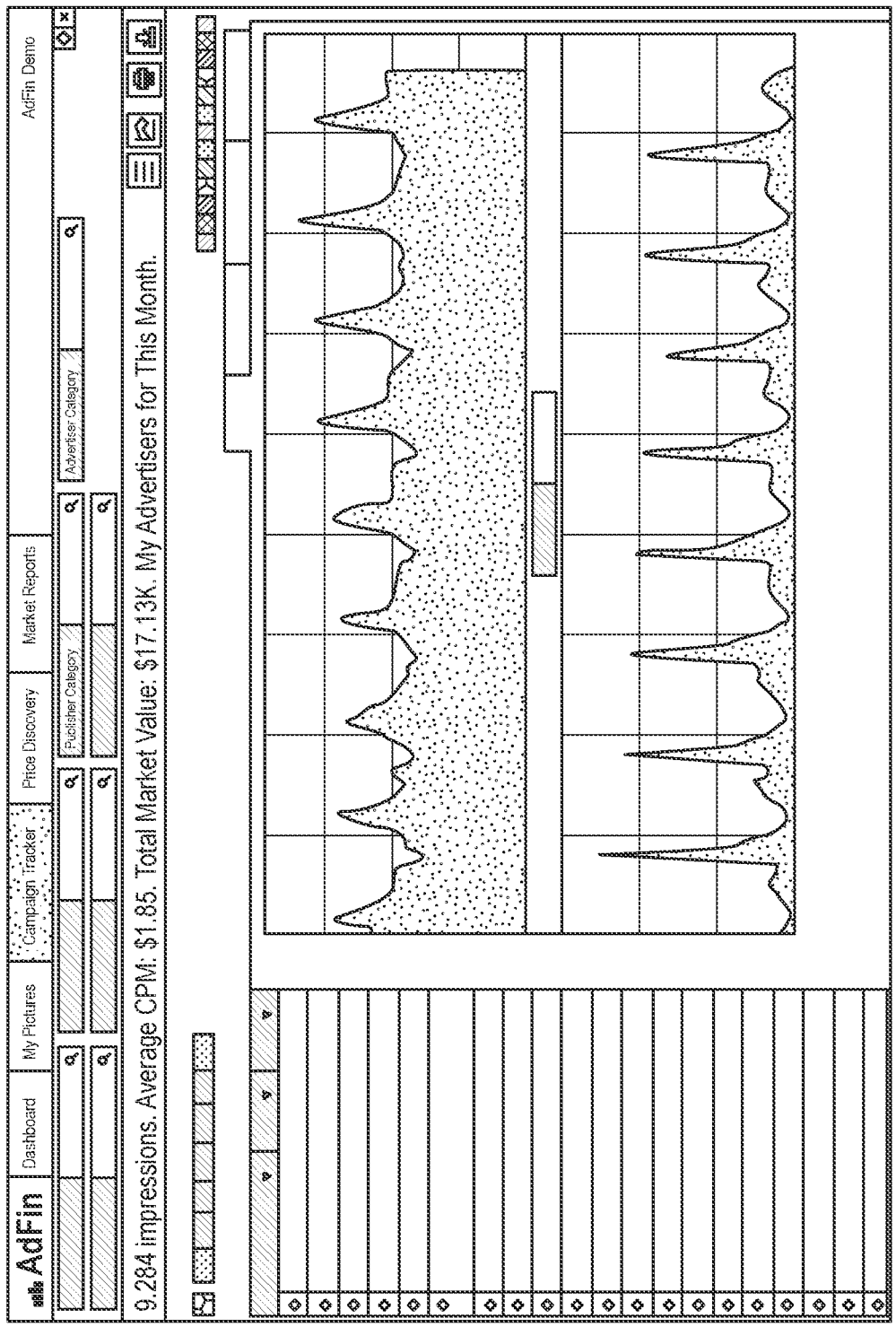
FIG. 5Lvi

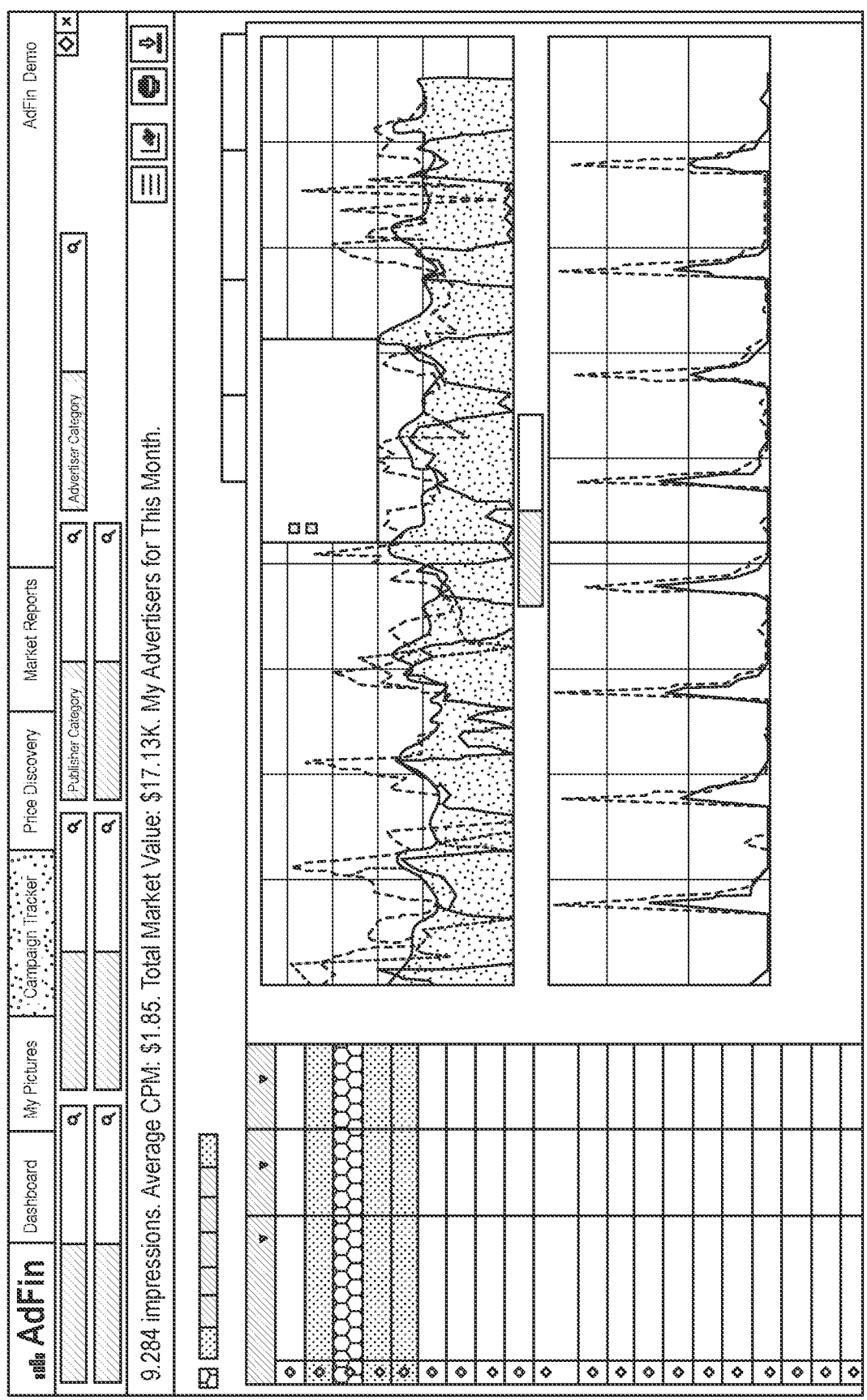
FIG 5Lvii

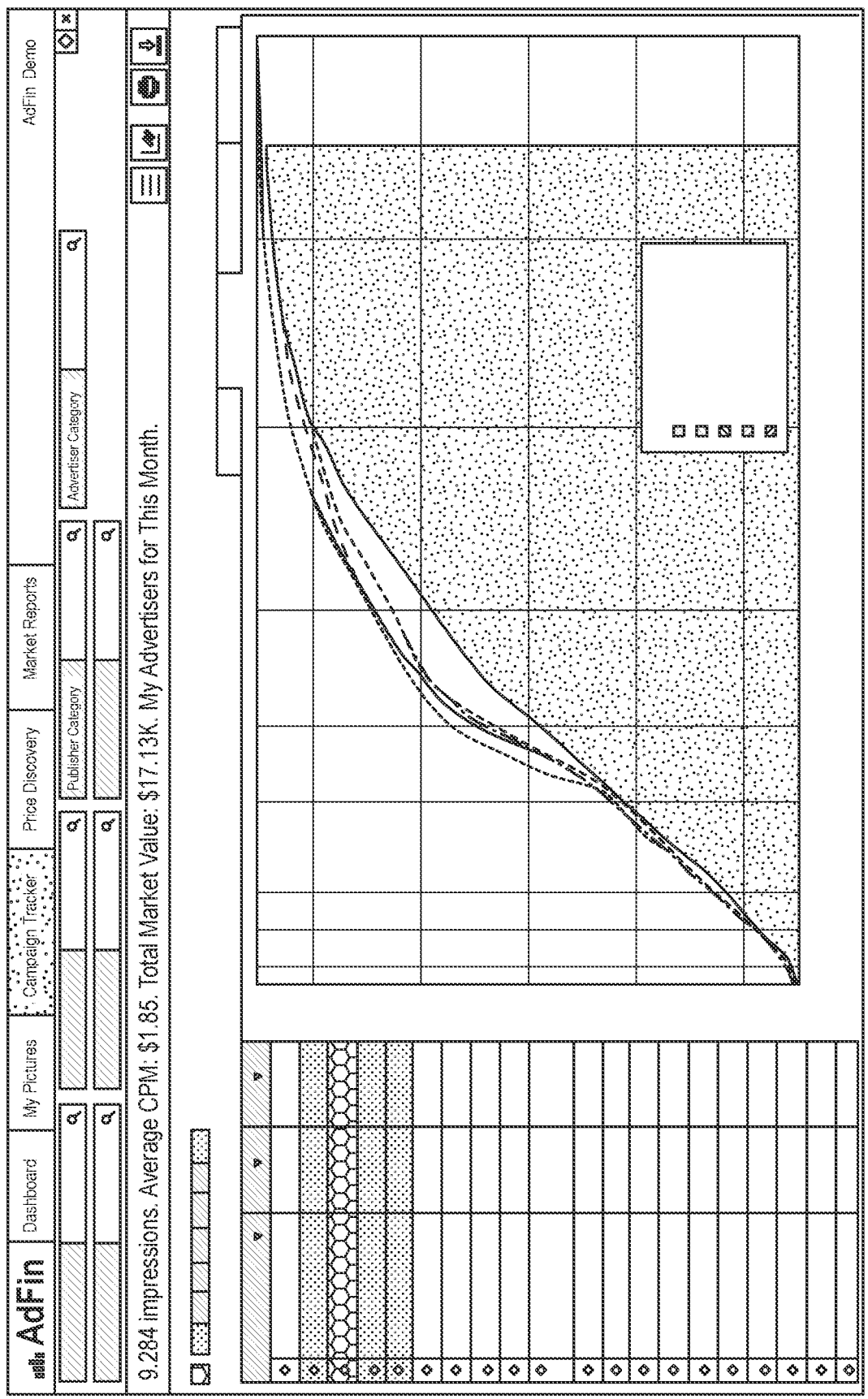
FIG 5Lviii

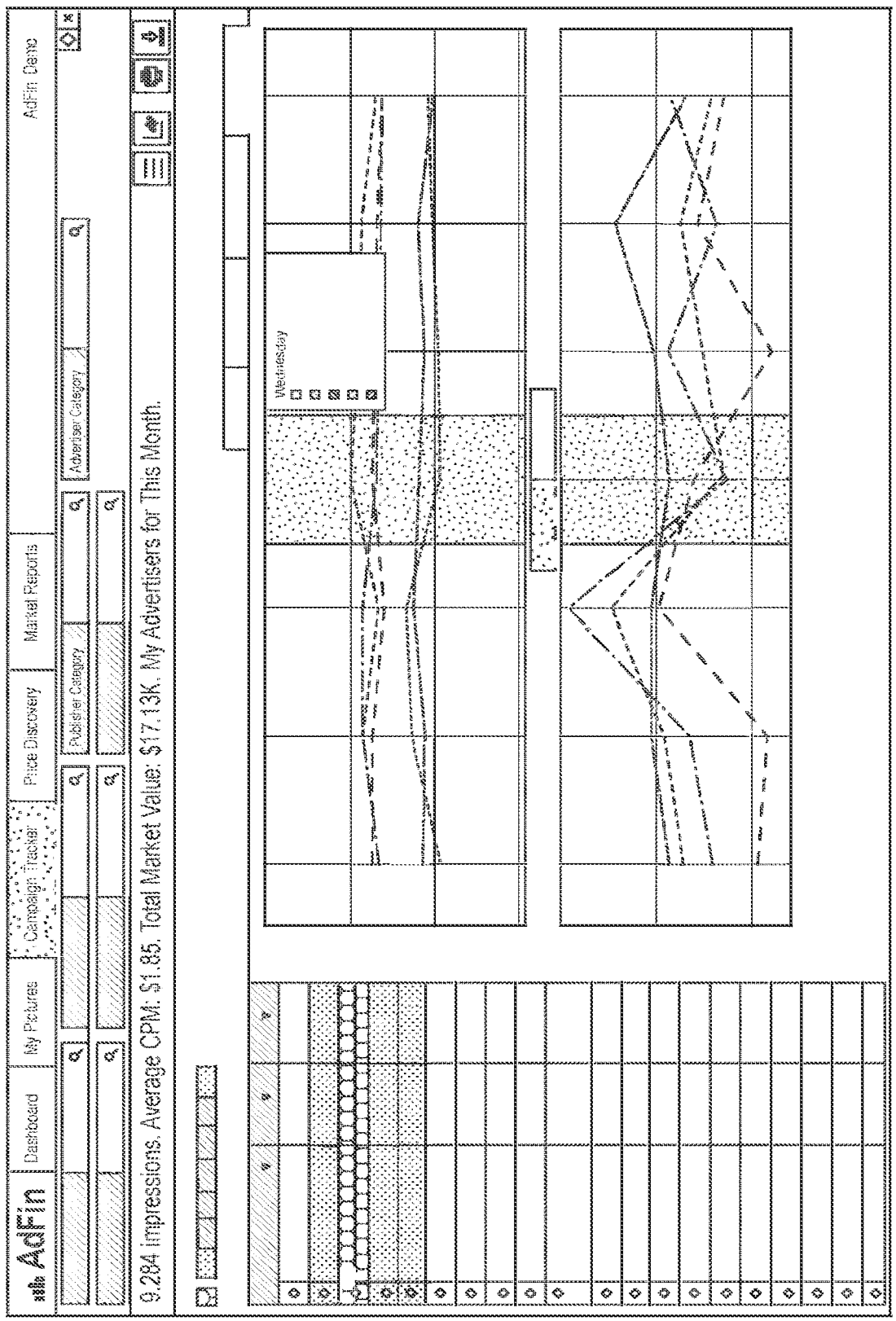
FIG. 5Lix

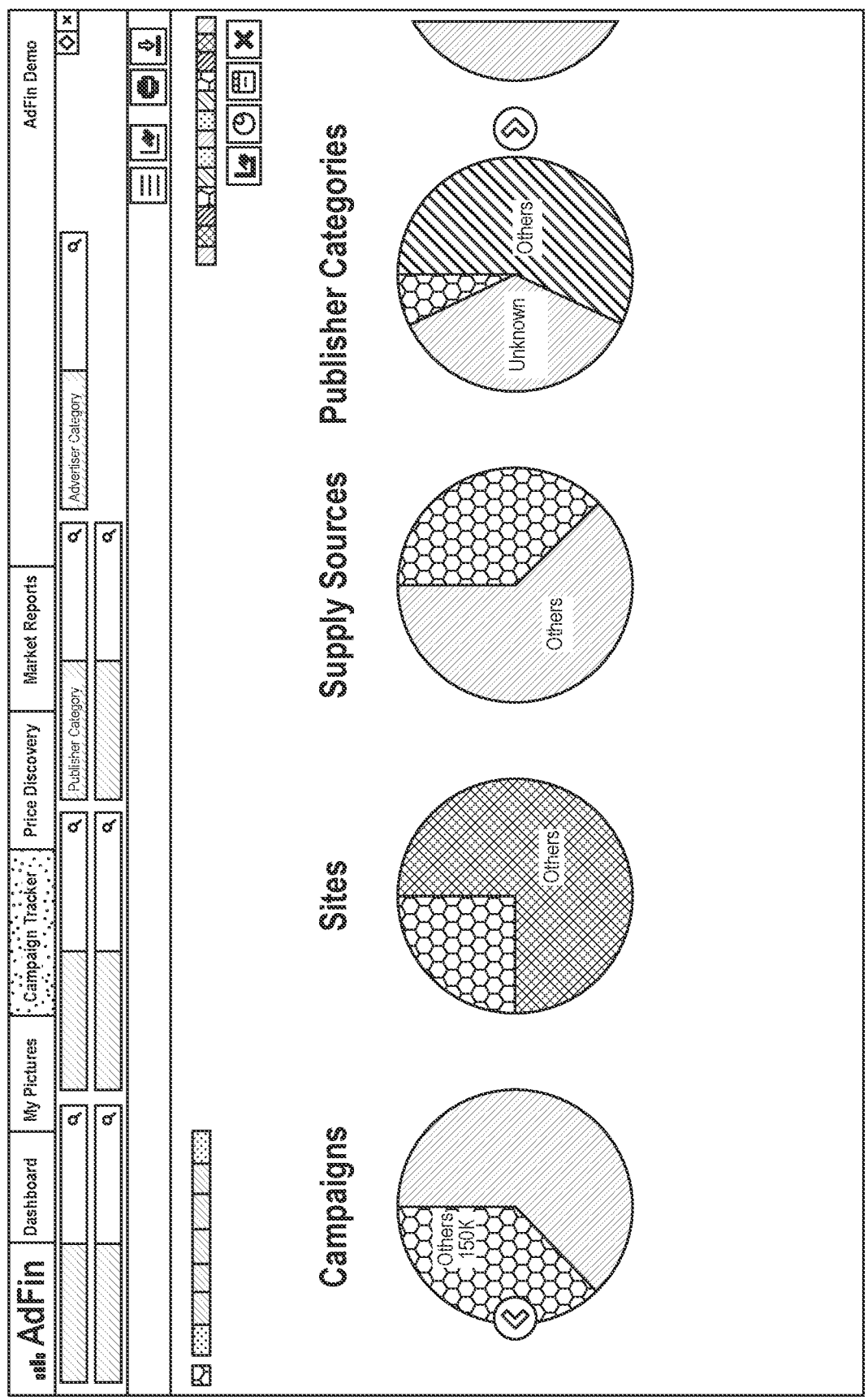
FIG 5Lxi

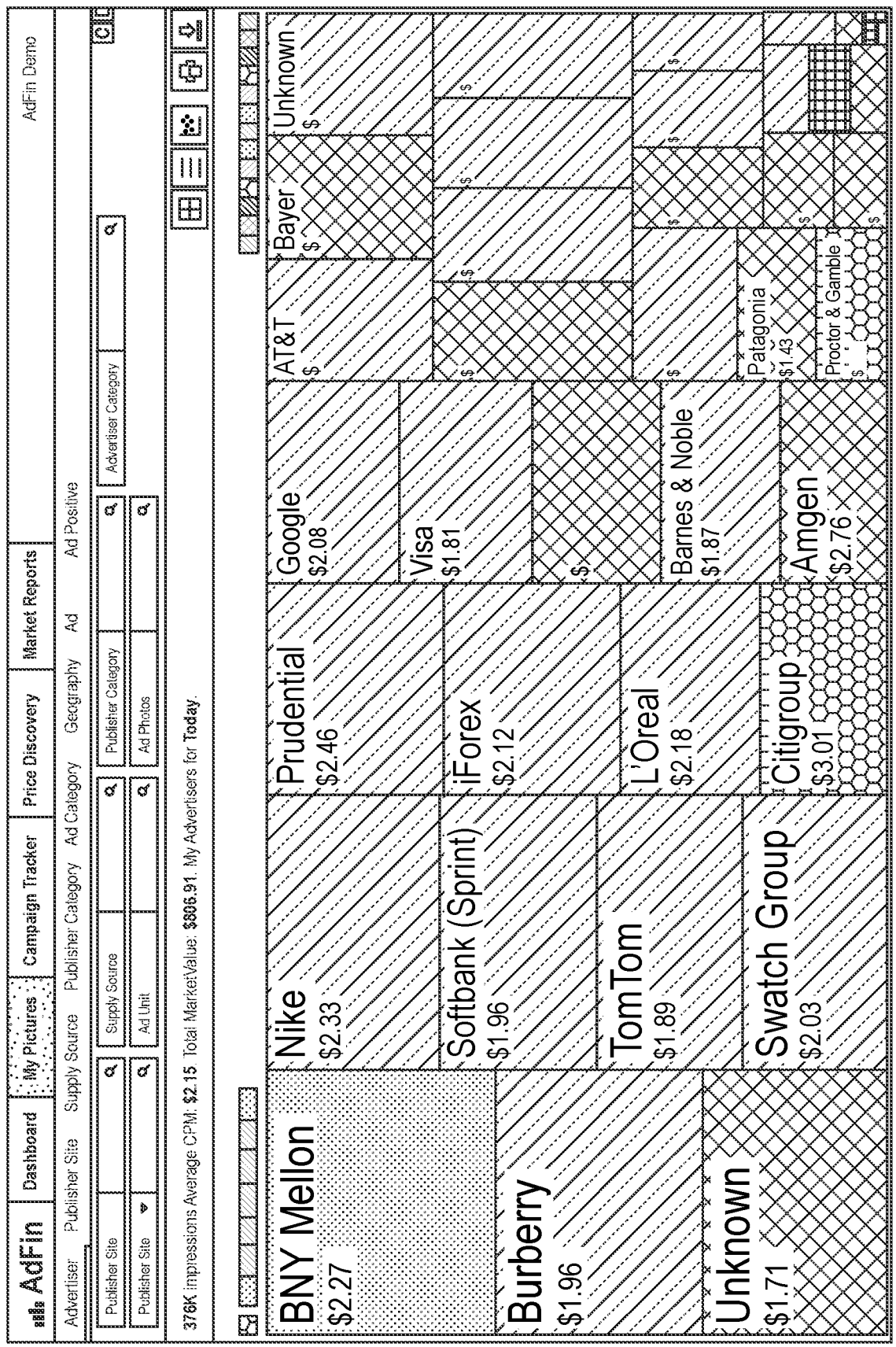
FIG. 5Mii

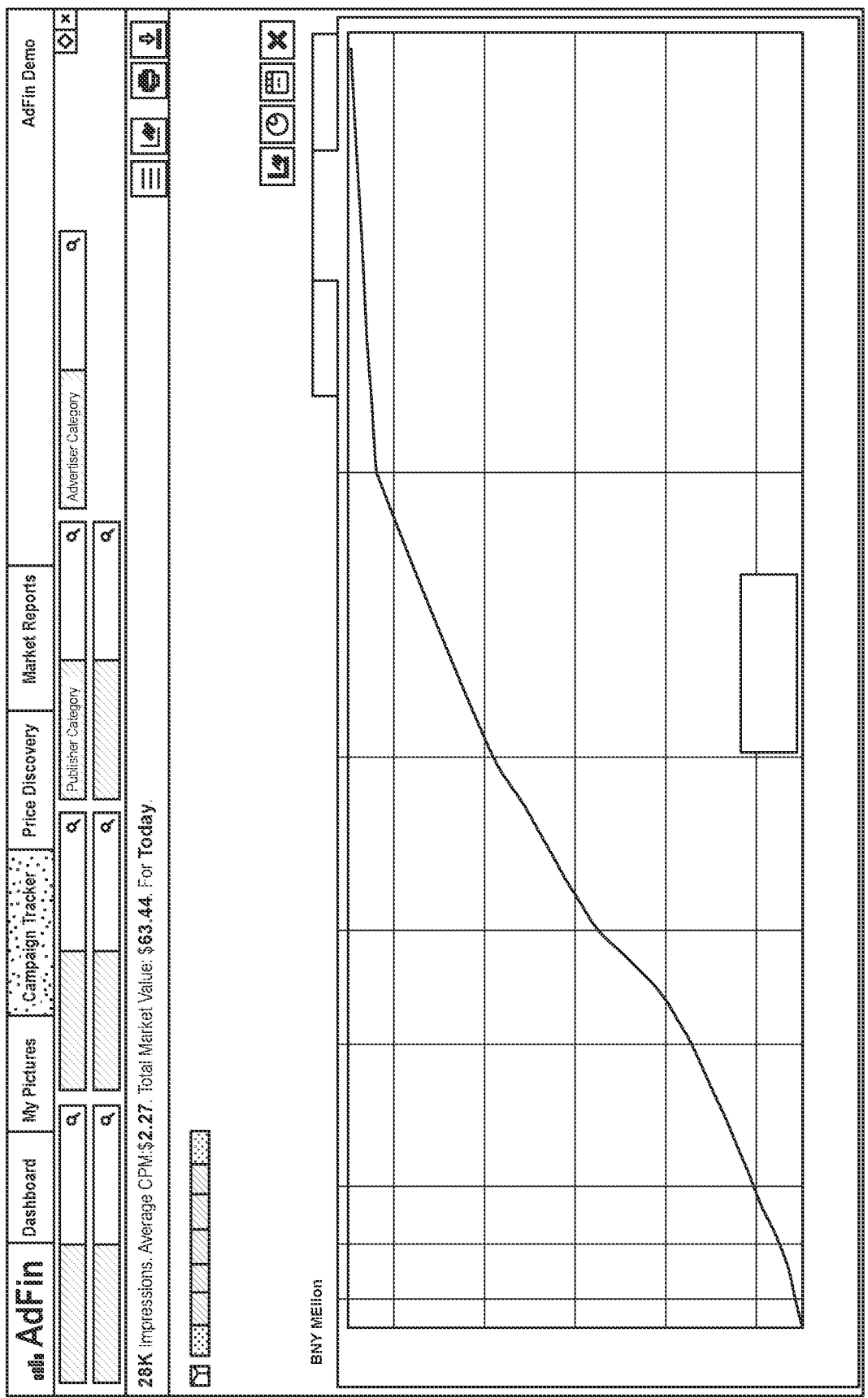
FIG. 5Mii

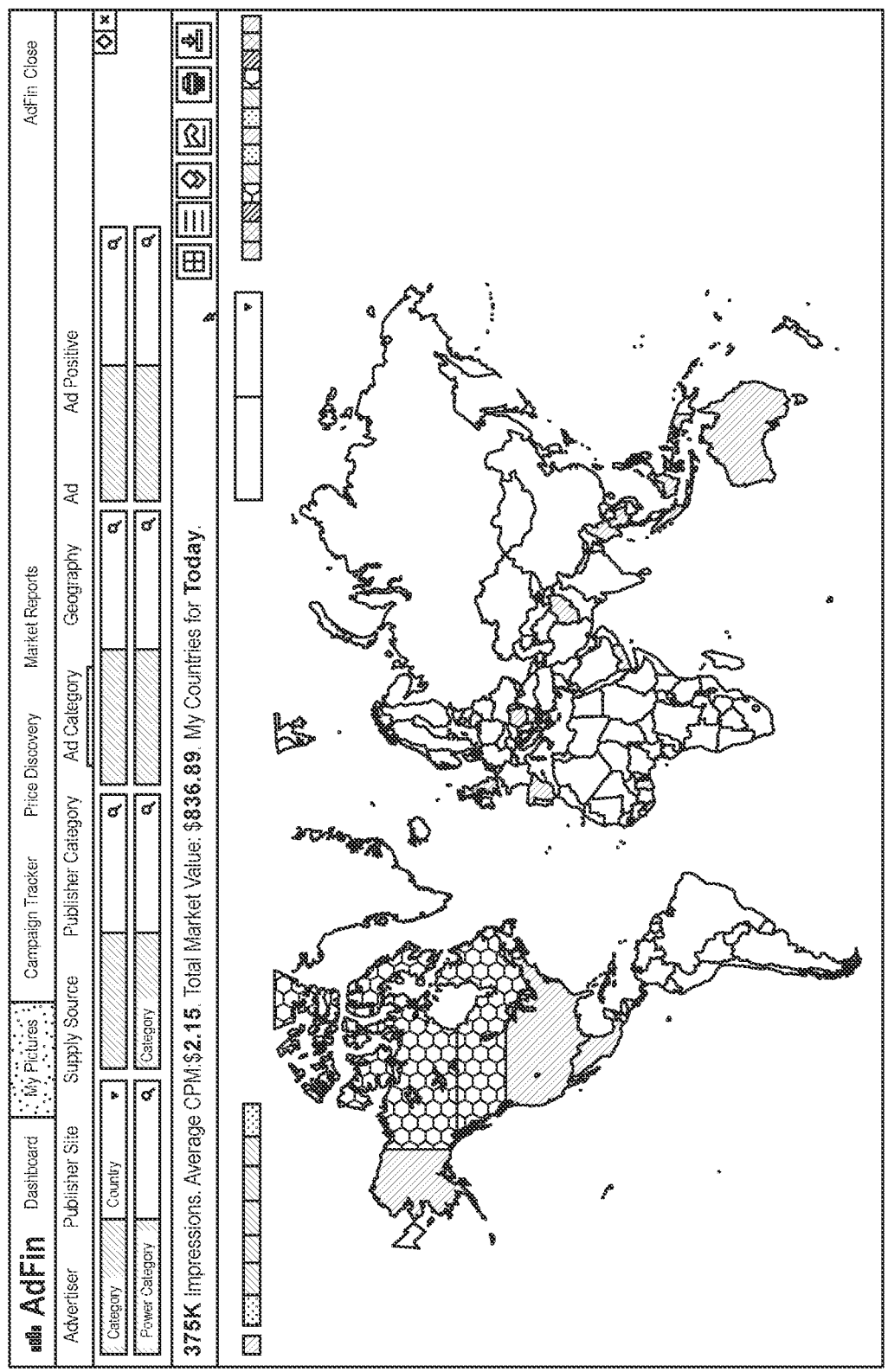
FIG 5Miii

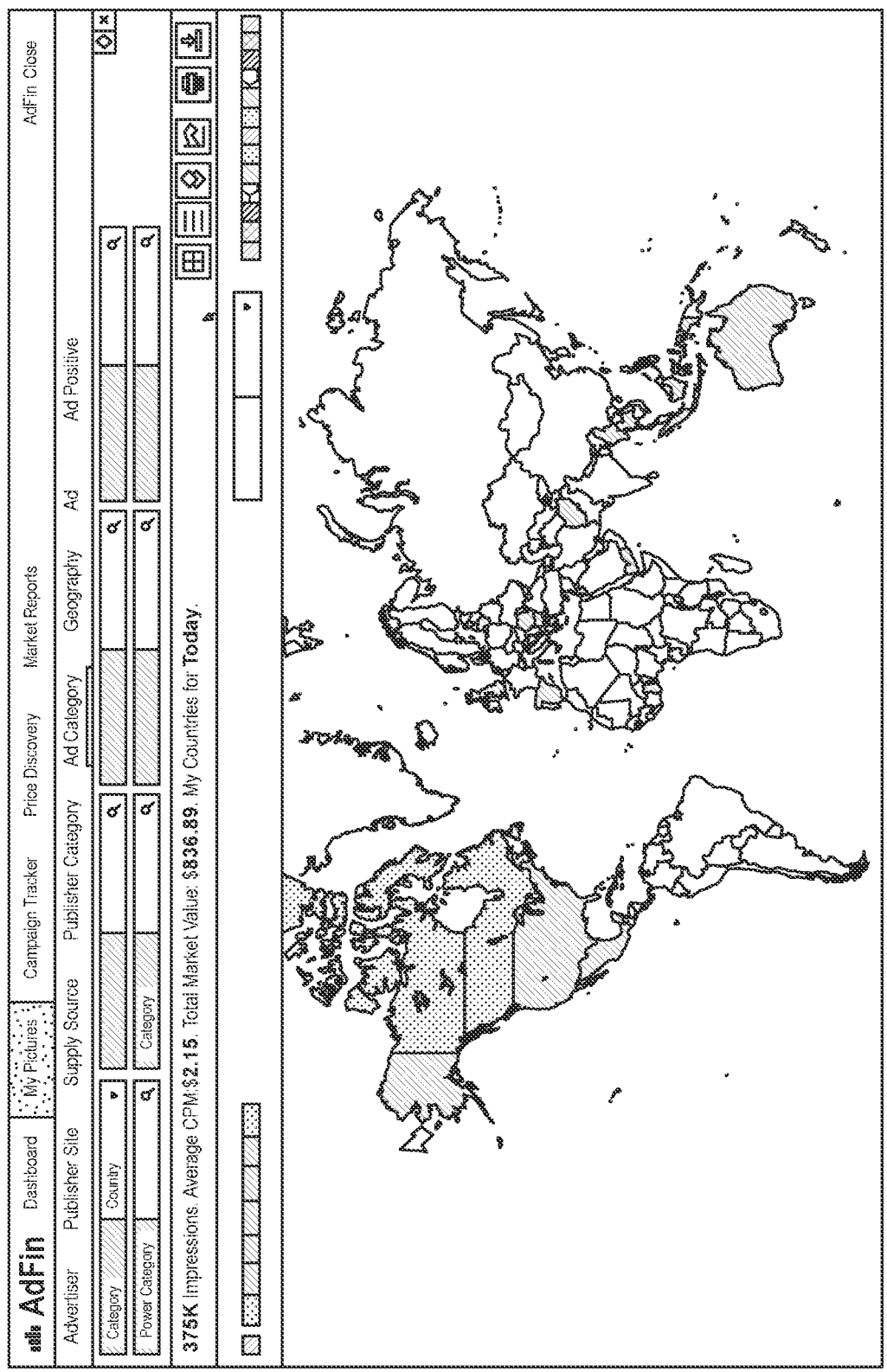
FIG 5Miv

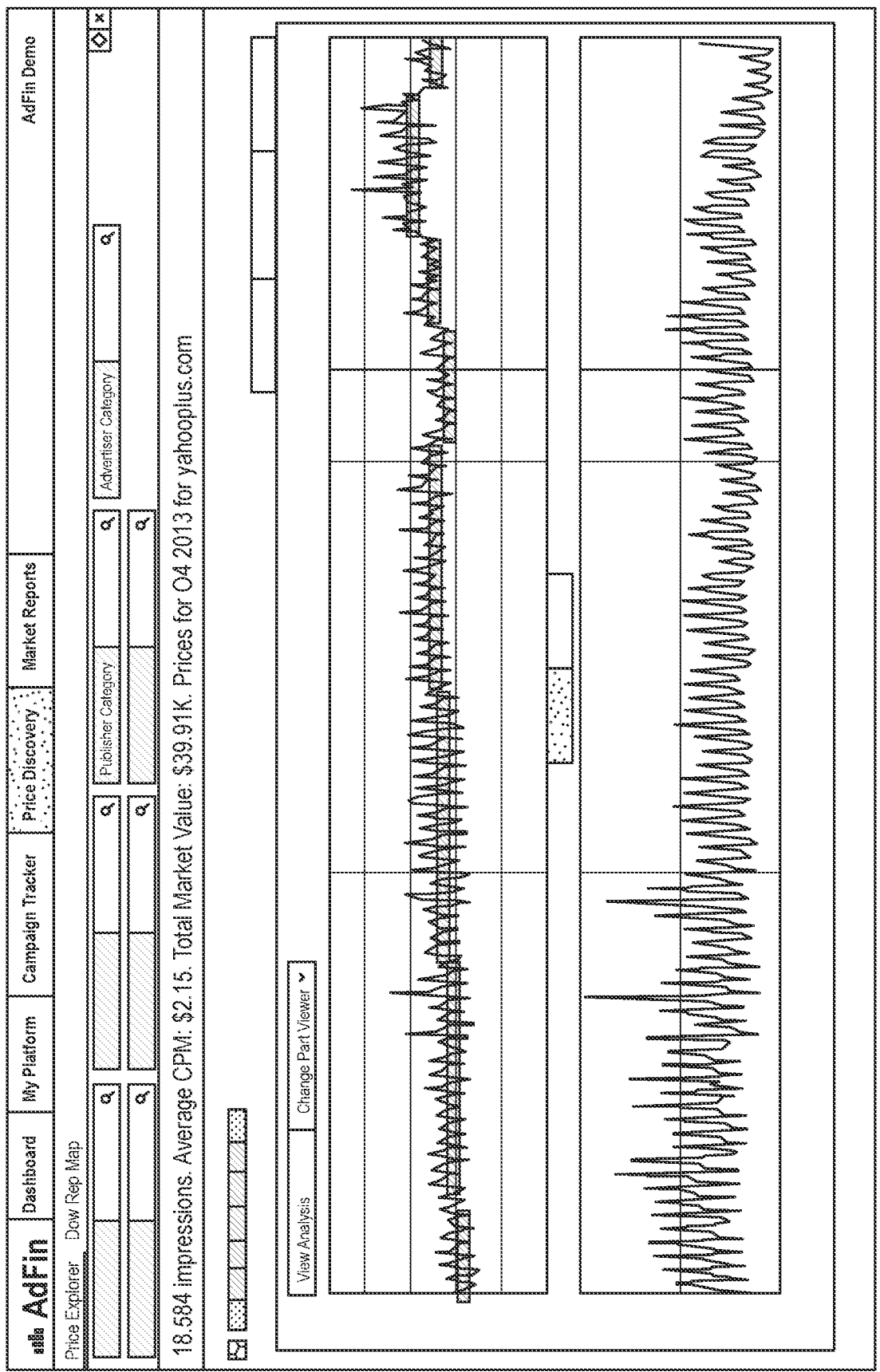
FIG. 5Niii

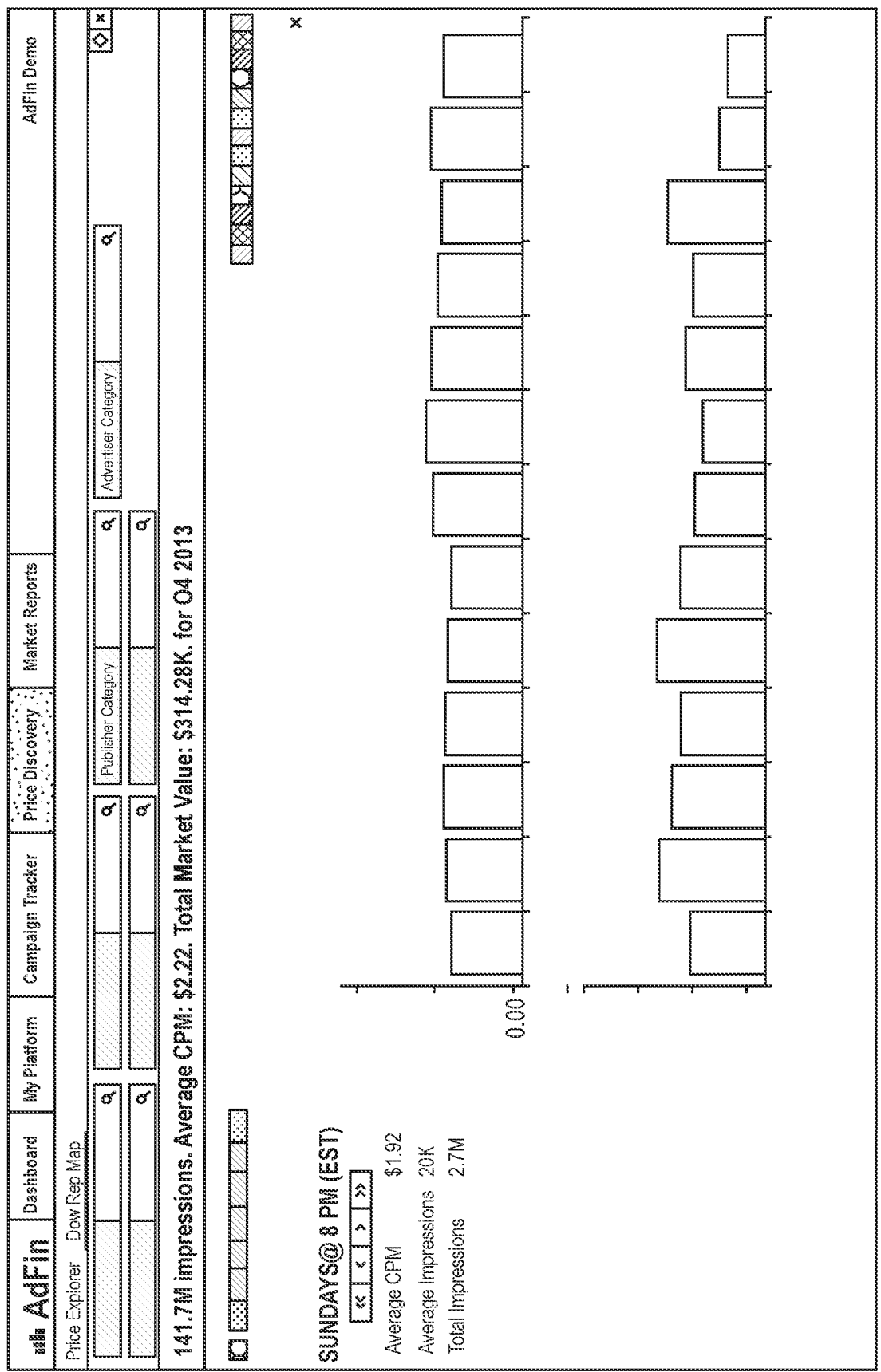
FIG. 5Niii

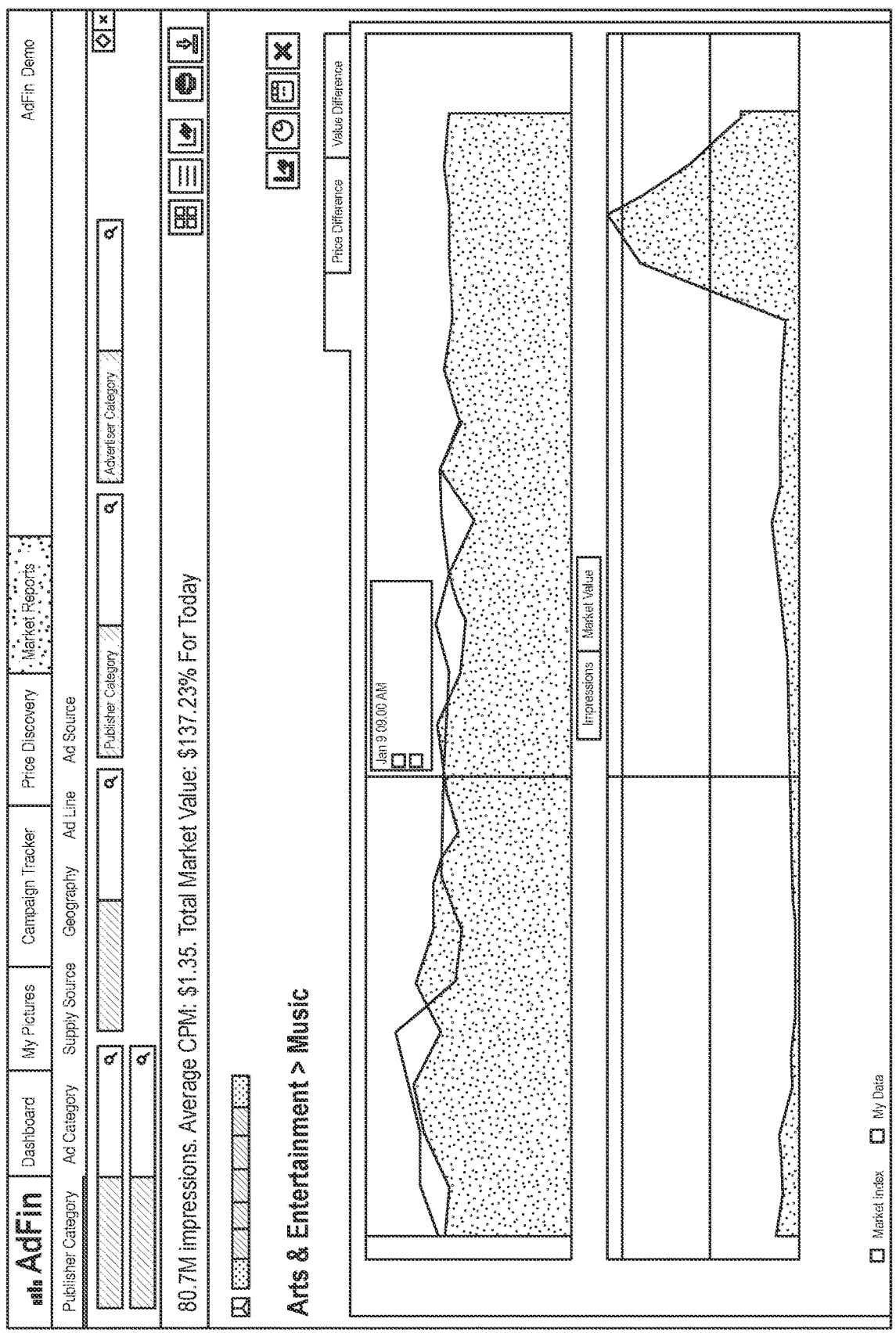
FIG 50iii

FIG 5Ovi

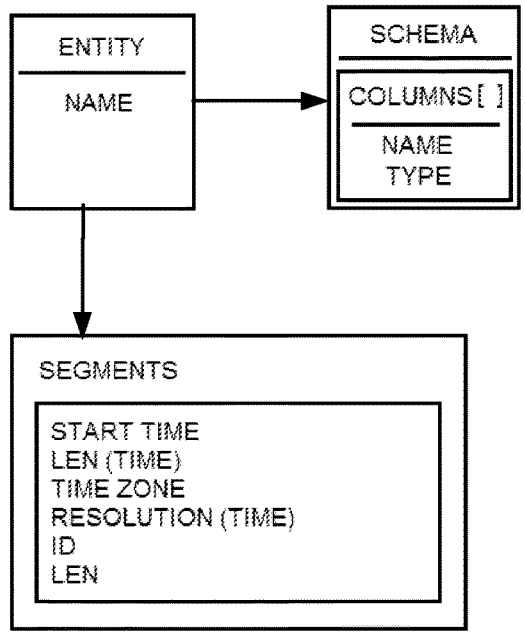
FIG. 6A – Example RDA Data Hierarchy
| TIMESTAMP | SEARCH COLUMN #1 | SEARCH COLUMN #2 | ... | VALUE COLUMN #1 | VALUE COLUMN #2 | ... |
|---|---|---|---|---|---|---|
| 1357707600 | 5 | "300 X 250" | | 1000 | 5000 | |
| 1357707600 | 6 | "300 X 250" | | 1500 | 6000 | |
| 1357707600 | 6 | "720 X 300" | | 2500 | 1000 | |
| 1357794000 | 2 | "300 X 250" | | 500 | 2500 | |
| 1357794000 | 2 | "720 X 300" | | 1500 | 2000 | |
| | | | | | | |
| | | | | | | |
FIG. 6B – Example RDA Segment Data Table

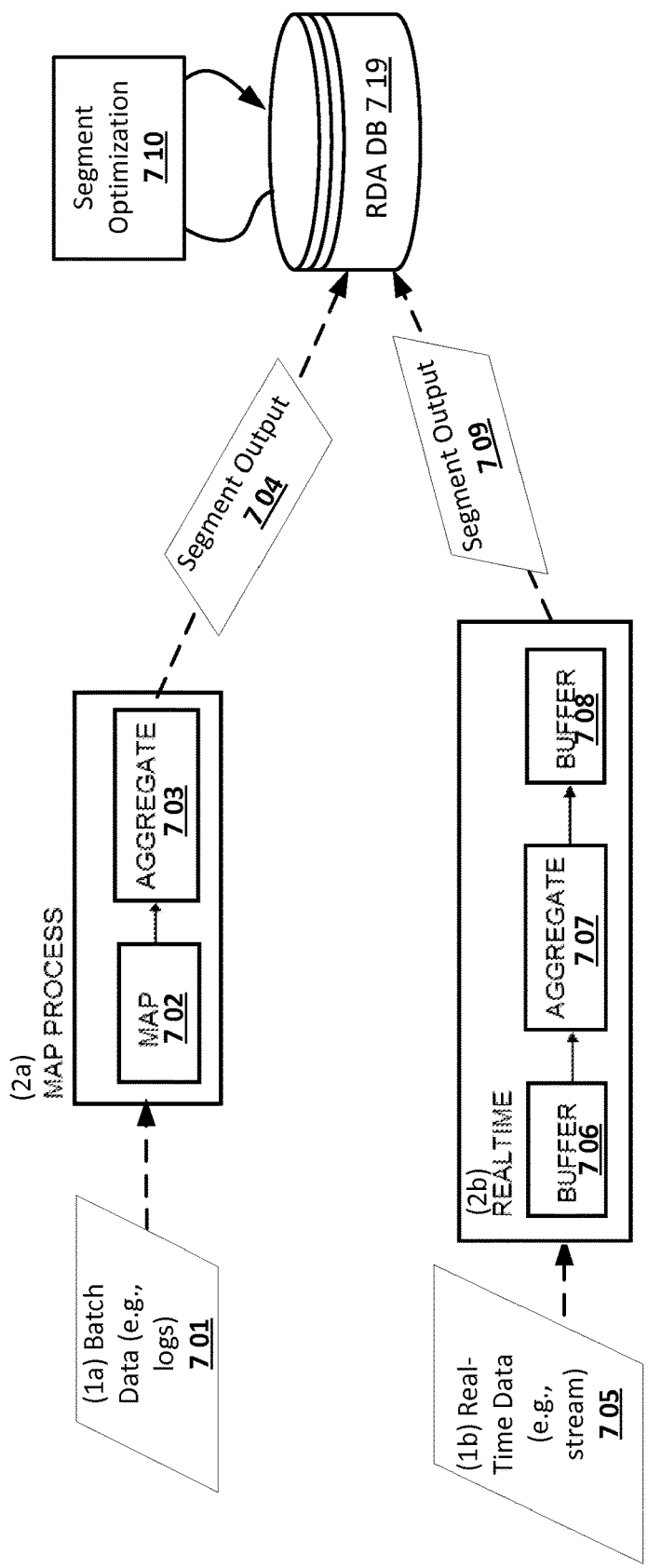
FIG. 7 – Example RDA Data Import Process

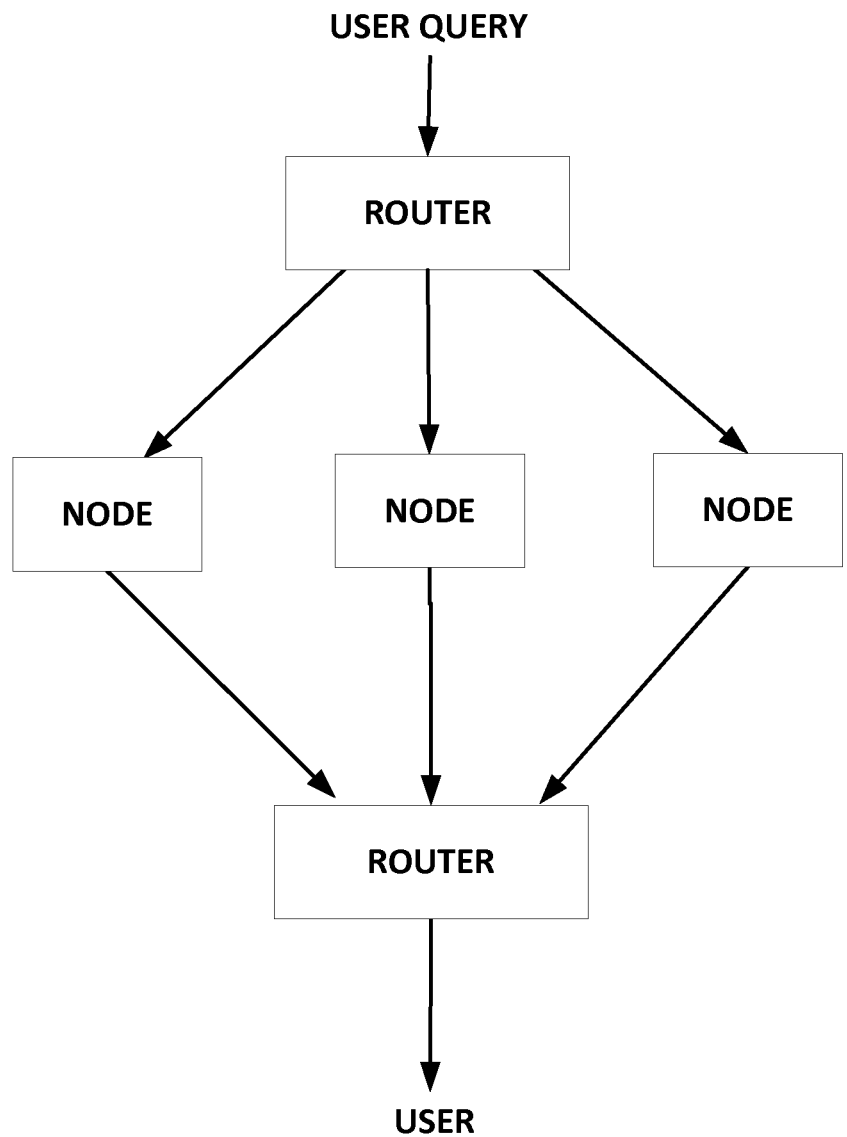
FIG. 8 – Example RDA Query Processing

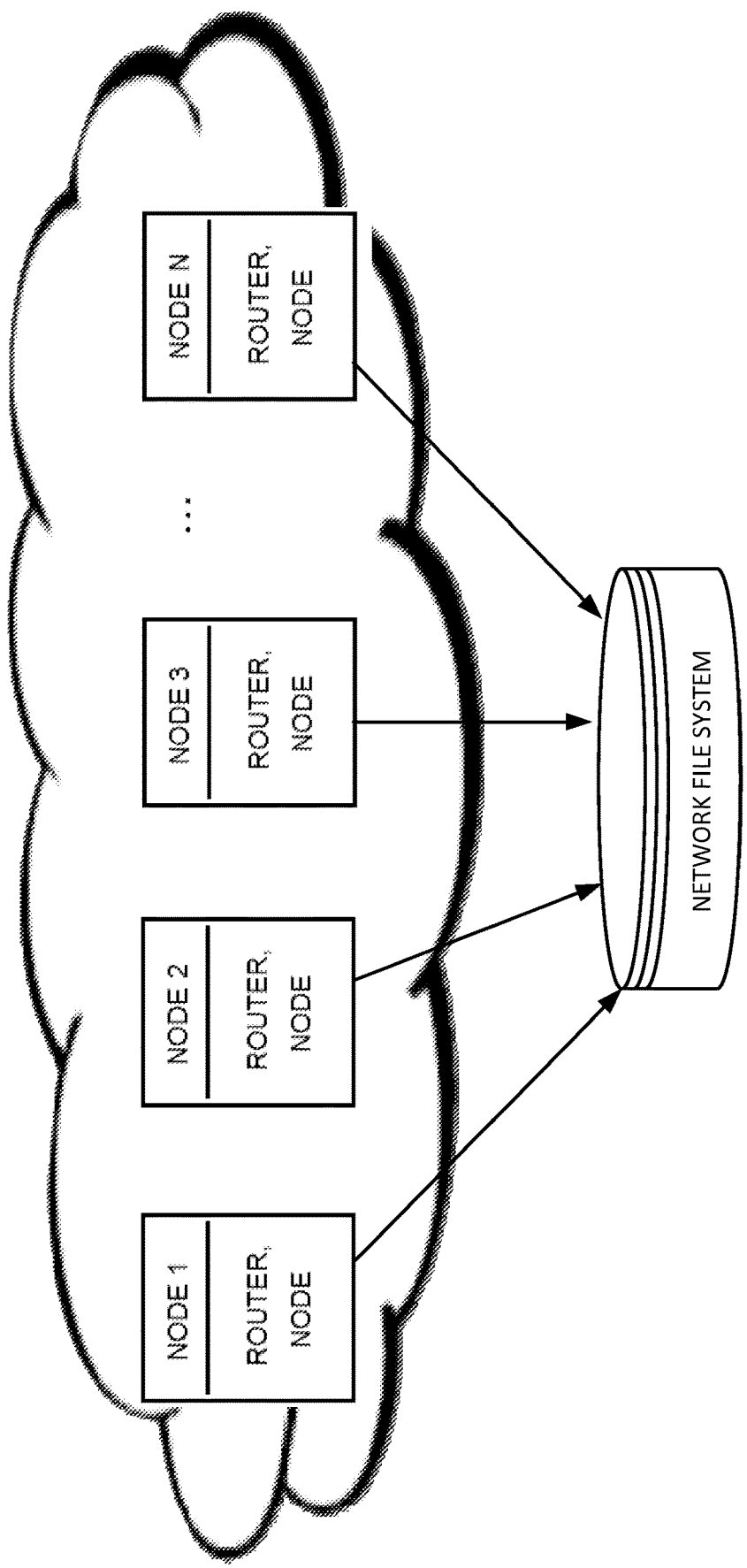
FIG. 9 – Example RDA Node Cluster

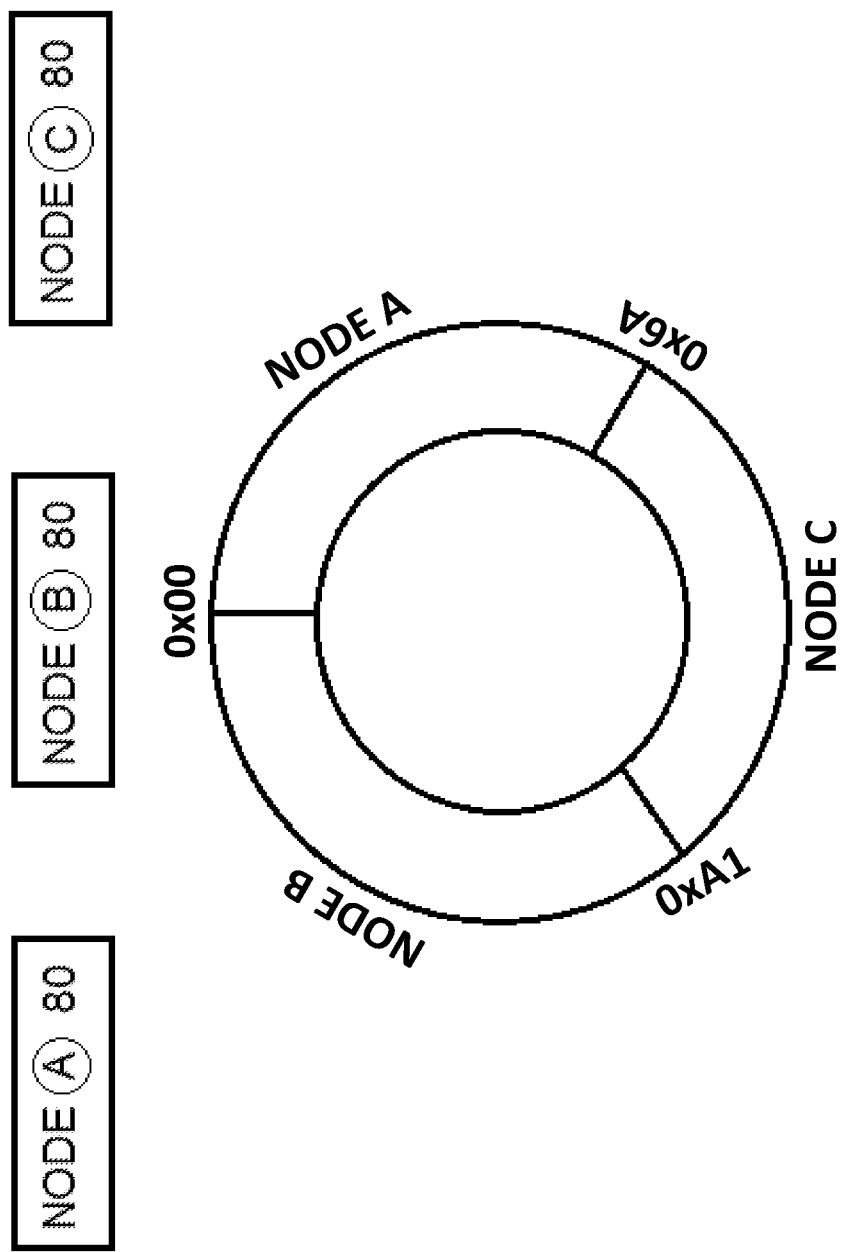
FIG. 10 – Example RDA Load Balancing

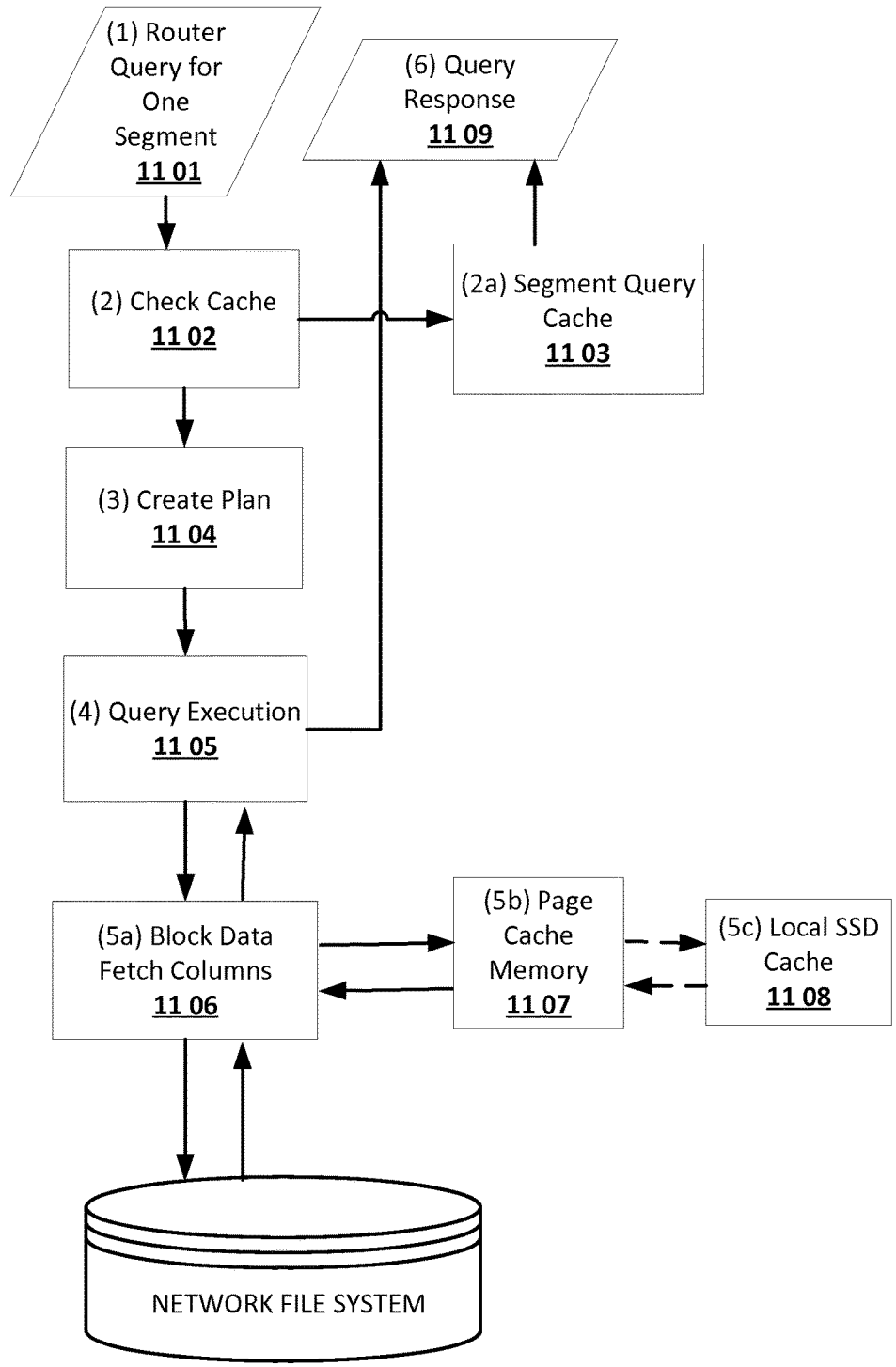
FIG. 11 – Example RDA Segment Processing

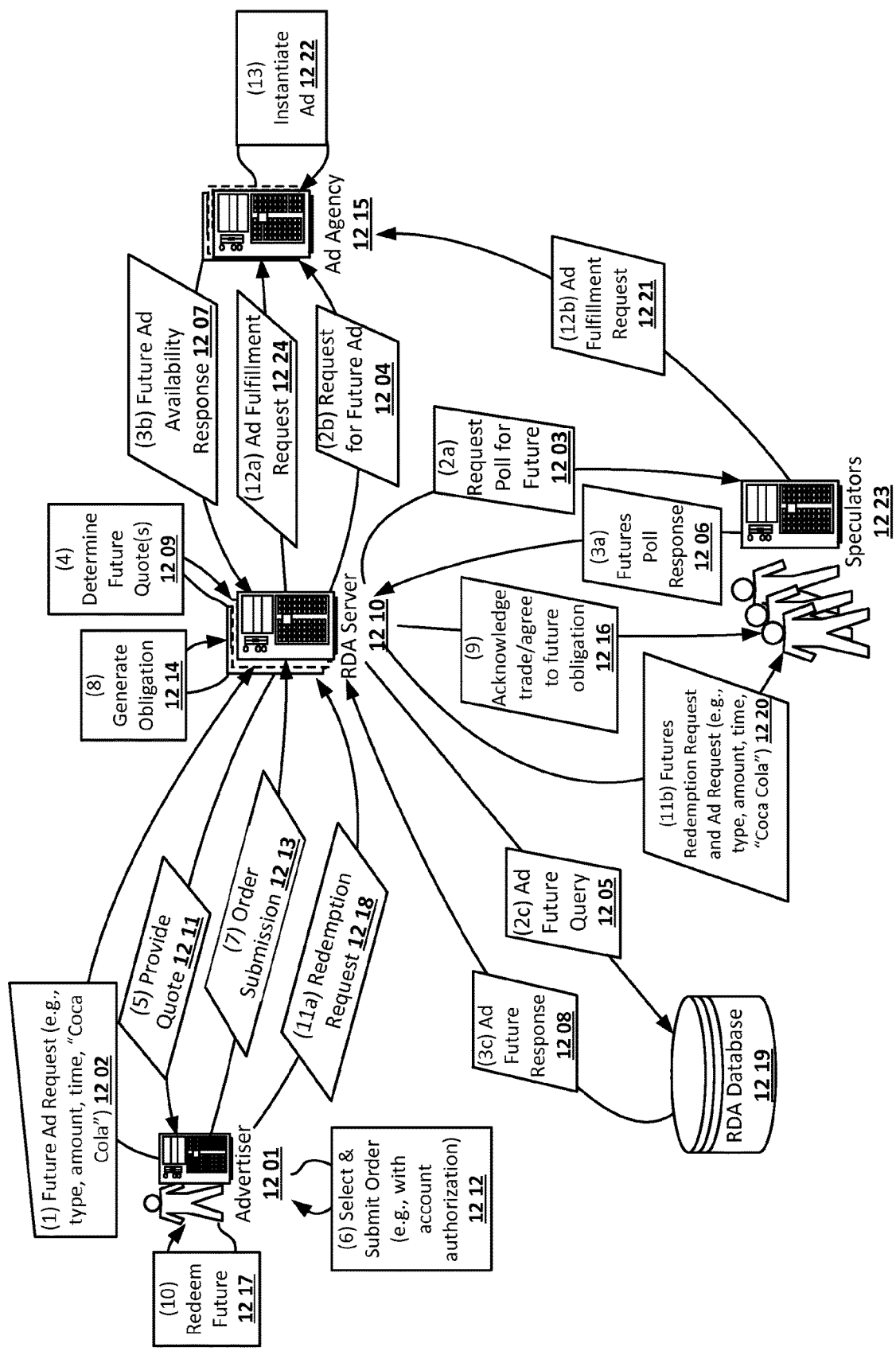
FIG 12: Example Data Flow: RDA Ad Futures

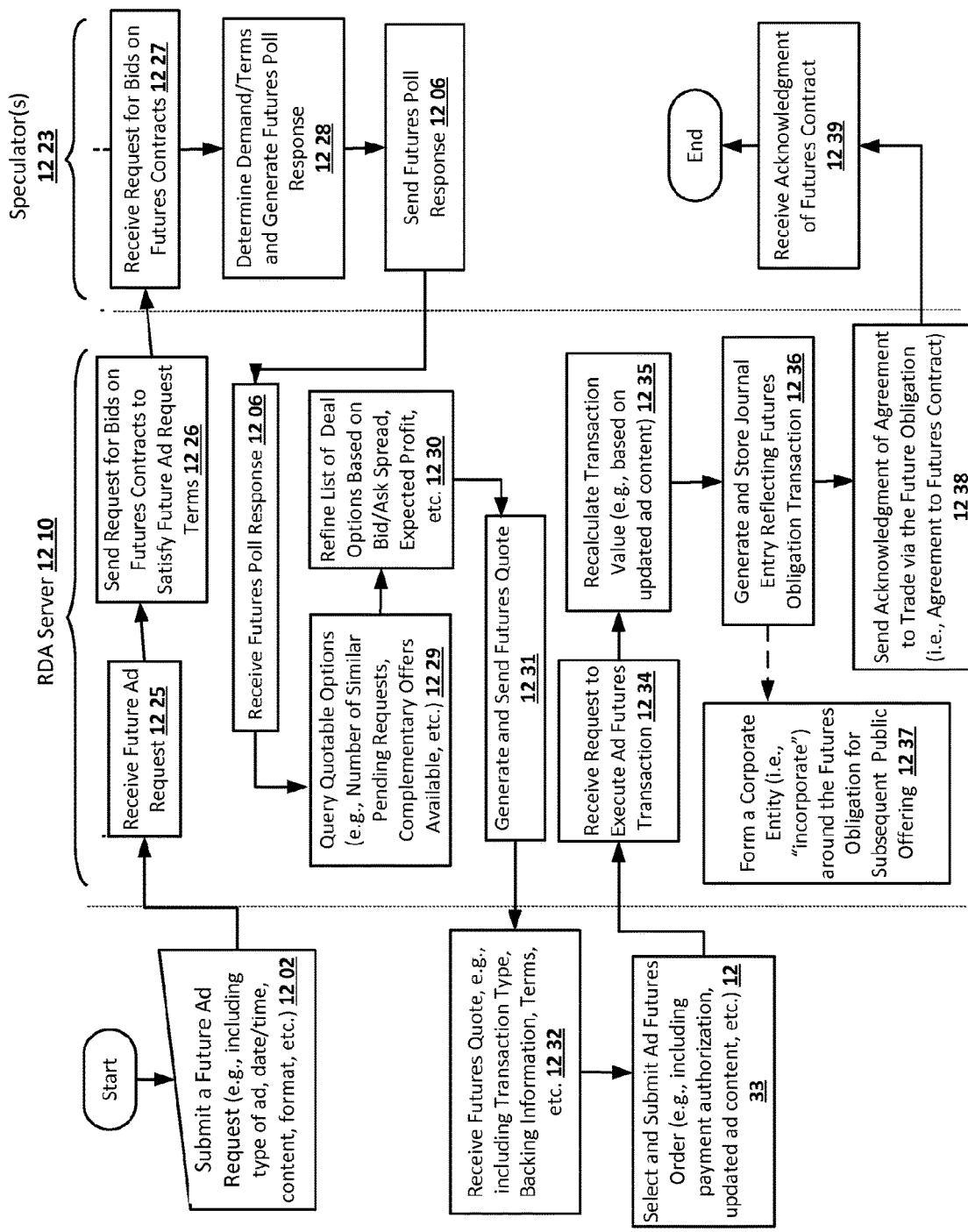
FIG 12A: Example RDA Logic Flow: Determination of Future Quote(s) and Generation of Obligations

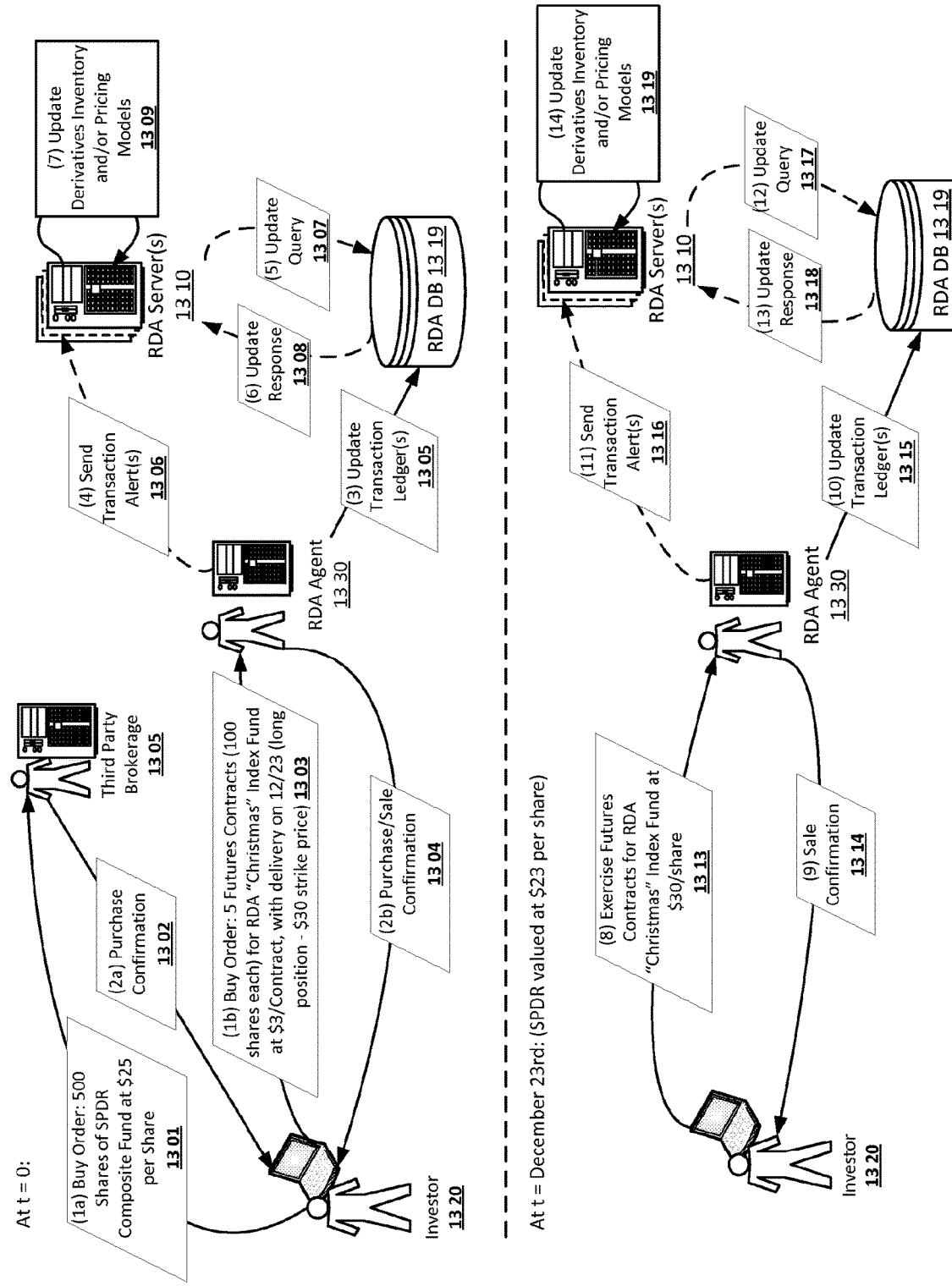
FIG 13: Example Data Flow Diagrams – Investment Hedging with RDA

US 11,068,925 B2

REAL-TIME DIGITAL ASSET SAMPLING APPARATUSES, METHODS AND SYSTEMS

CLAIM FOR PRIORITY

This application is the National Stage of International Application No. PCT/US2014/011357, filed. Jan. 13, 2014, which in turn claims priority to and benefit of U.S. Provisional Patent Application No. 61/751,929, filed Jan. 13, 2013. The entire contents of the aforementioned applications are herein expressly incorporated by reference.

This application for letters patent discloses and describes various novel innovations and inventive aspects of REAL-TIME DIGITAL ASSET SAMPLING technology (hereinafter "RDA") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

This application is a non-provisional of and claims priority under 35 U.S.C. § 119 to U.S. provisional patent application Ser. No. 61/751,929, filed Jan. 13, 2013, entitled "Real-Time Digital Asset Sampling Apparatuses, Methods and Systems,". The entire contents of the aforementioned patent application are expressly incorporated by reference herein.

FIELD

The present innovations generally address apparatuses, methods, and systems for aggregating virtual commodity bidding and transactional data, and more particularly, include REAL-TIME DIGITAL ASSET SAMPLING APPARATUSES, METHODS AND SYSTEMS ("RDA").

BACKGROUND

Content providers such as websites can host advertising spaces on their web pages, e.g., by displaying advertising content on a side column of a web page. In this way, Internet users who visit the content providers' web pages will be presented advertisements in addition to regular contents of the web pages. Advertisers such as brand name merchants who desire to promote their products and offerings via advertising must ordinarily pay an advertising fee to the content provider to obtain an advertising spot on a given web page. Advertisers can contact website operators to obtain a price estimate for such advertising.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 4A-4F provide exemplary data plots and tables illustrating aspects of ad market performance sampling (e.g., 301 in FIG. 3A) within embodiments of the RDA;

FIG. 6A provides an exemplary data hierarchy diagram according to some embodiments of the RDA;

FIG. 6B provides an exemplary segment data table according to some embodiments of the RDA;

FIG. 7 provides an exemplary data import process according to some embodiments of the RDA;

FIG. 8 provides a diagram illustrating exemplary query processing employed by some embodiments of the RDA;

FIG. 9 illustrates an exemplary node cluster according to some embodiments of the RDA;

FIG. 10 illustrates an exemplary load balancing configuration according to some embodiments of the RDA;

FIG. 11 provides a diagram illustrating an exemplary overview of segment processing as performed within some embodiments of the RDA;

FIG. 12 provides an exemplary data flow diagram illustrating ad future purchases according to some embodiments of the RDA;

FIG. 12A provides a logic flow illustrating aspects of determining quotes for future ad fulfillment and generation of related obligations, within embodiments of the RDA;

FIG. 13 provides exemplary data flow diagrams illustrating investment hedging according to some embodiments of the RDA.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The REAL-TIME DIGITAL ASSET SAMPLING technology (hereinafter "RDA") provides an advertising pricing data aggregating and analytics platform that obtains real-time advertising pricing information via bidding sampling and creates a pricing index for advertising based on attributes of advertisements. In one implementation, the RDA may present created pricing indices to users via a user terminal. In one implementation, the RDA may create various financial instruments based on the created pricing index so that a client may purchase or sell an ad index backed financial instrument via a trading exchange platform. In another implementation, the RDA may provide an analytics tool for a user to predict advertising cost and optimize advertising spending based on the user's budgets and demands.

Real-Time Digital Asset Sampling (RDA)

Figure 1A:
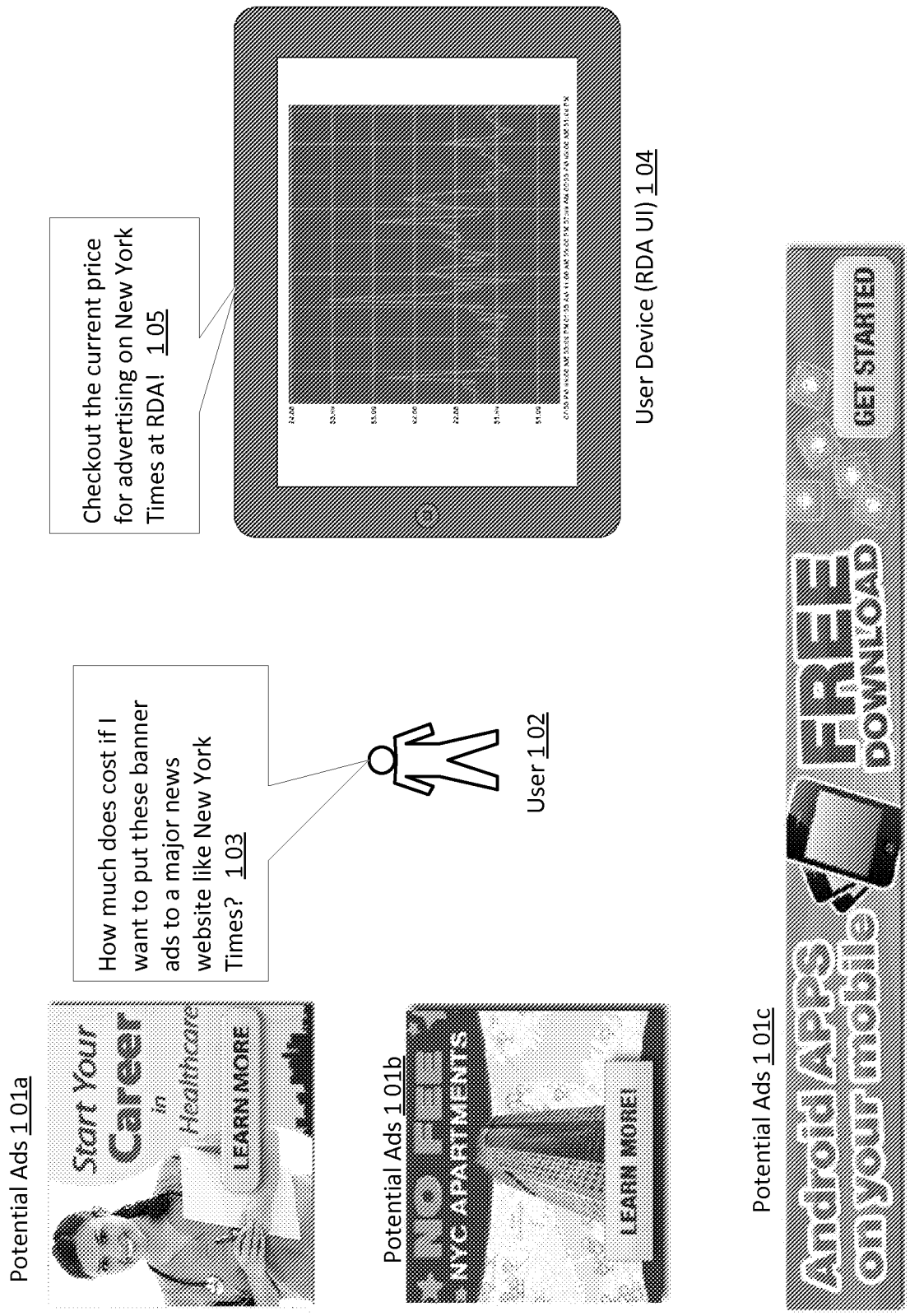
FIG. 1A provides an illustrative example showing a user obtaining advertising pricing quotes via an RDA client user interface (UI) within embodiments of the RDA.

FIG. 1A provides an illustrative example showing a user obtaining advertising pricing quotes via an RDA client user interface (UI) within embodiments of the RDA. For example, in one implementation, a user 102 (e.g., a brand name merchant, a retailer, a manufacturer, a service provider, an individual, etc.) may desire to place advertisements 101*a-c* at a content provider (e.g., a website, a social media platform, TV, radio, magazines, newspapers, billboards, etc.), and may need to know the cost of the advertisement 103. In one implementation, the user 102 may instantiate a RDA client component at a user device 104, and obtain a real-time updating pricing curve from RDA 105.

In one implementation, the advertising pricing information may be categorized by different attributes and searchable per user request. For example, a user 102 may specify interest in advertising costs on a major news website such as www.nytimes.com, and advertising pricing on such websites may be provided to the user, in some embodiments further categorized by the advertisement size, format (e.g., banner, interactive, etc.), content (e.g., audio, video, social media feeds, etc.), geographical location, date, time of day, duration, placement position (e.g., with headline article, column article, etc.), and/or the like.

Figure 1B:
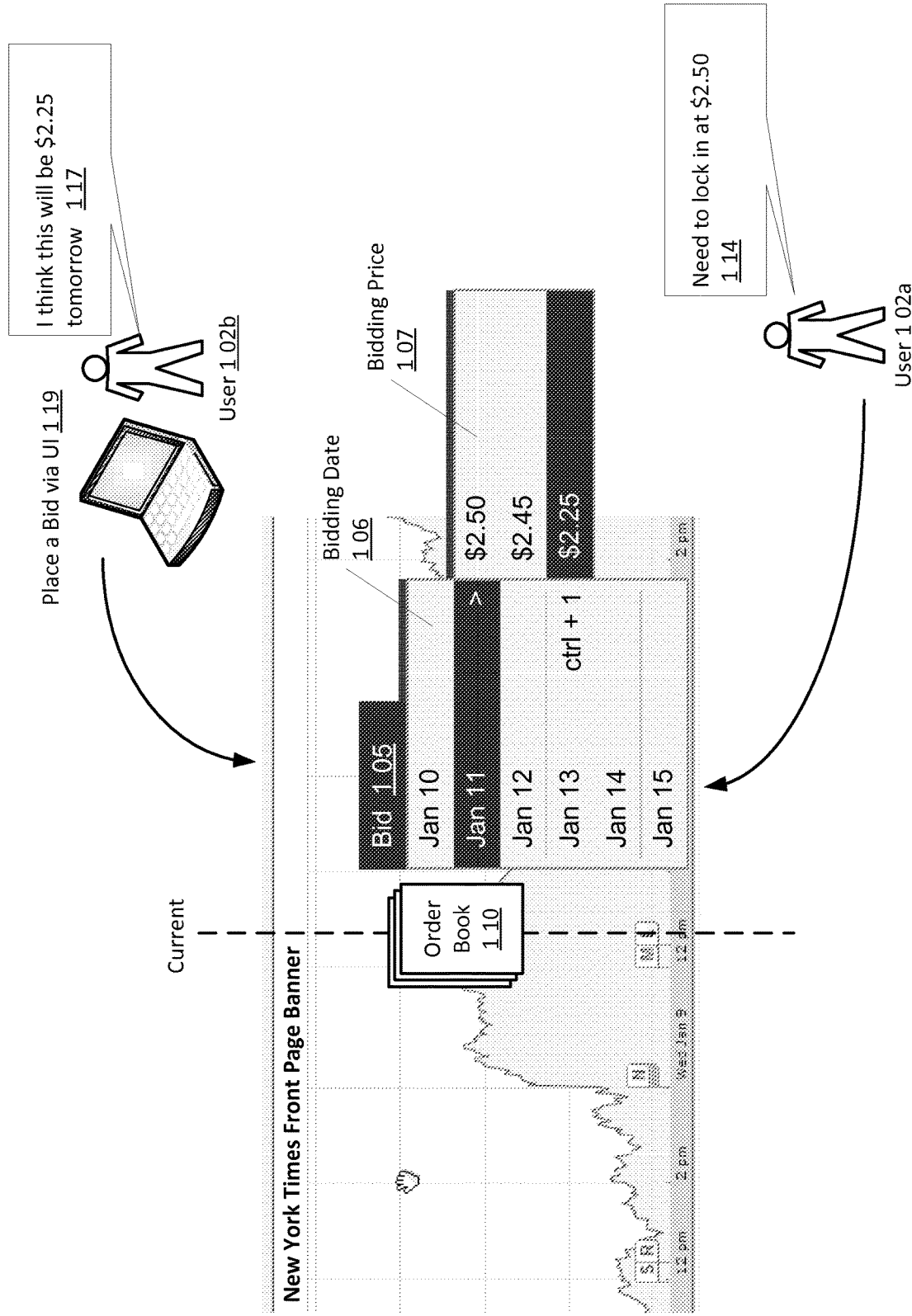
FIG. 1B provides an illustrative example showing aspects of RDA-backed financial instruments exchange within embodiments of the RDA.

FIG. 1B provides an illustrative example showing aspects of RDA-backed financial instruments exchange within embodiments of the RDA. In one implementation, the RDA may generate a pricing index for advertising categorized by one or more advertising attributes (e.g., "New York Times front page banner ads," etc.); such index may be provided to users via an RDA financial terminal so that users may purchase the advertising and/or a related generated financial instrument via an exchange platform. For example, the RDA may provide a pricing curve of advertising prices with a cut-off line showing the current pricing position. A user 102*a* may review the pricing evolution and prediction trends and determine whether to purchase at the current price, e.g., "$2.50," 114. Alternatively, another user 102*b* may project a different pricing prediction 117, and may place a bid via a UI 119 at the price of "$2.25." For example, the RDA UI may provide an order book 110 menu for the users to place a bid 105, e.g., the user may select a date 106 and a bidding price 107 to complete a bidding order.

Figure 2A:
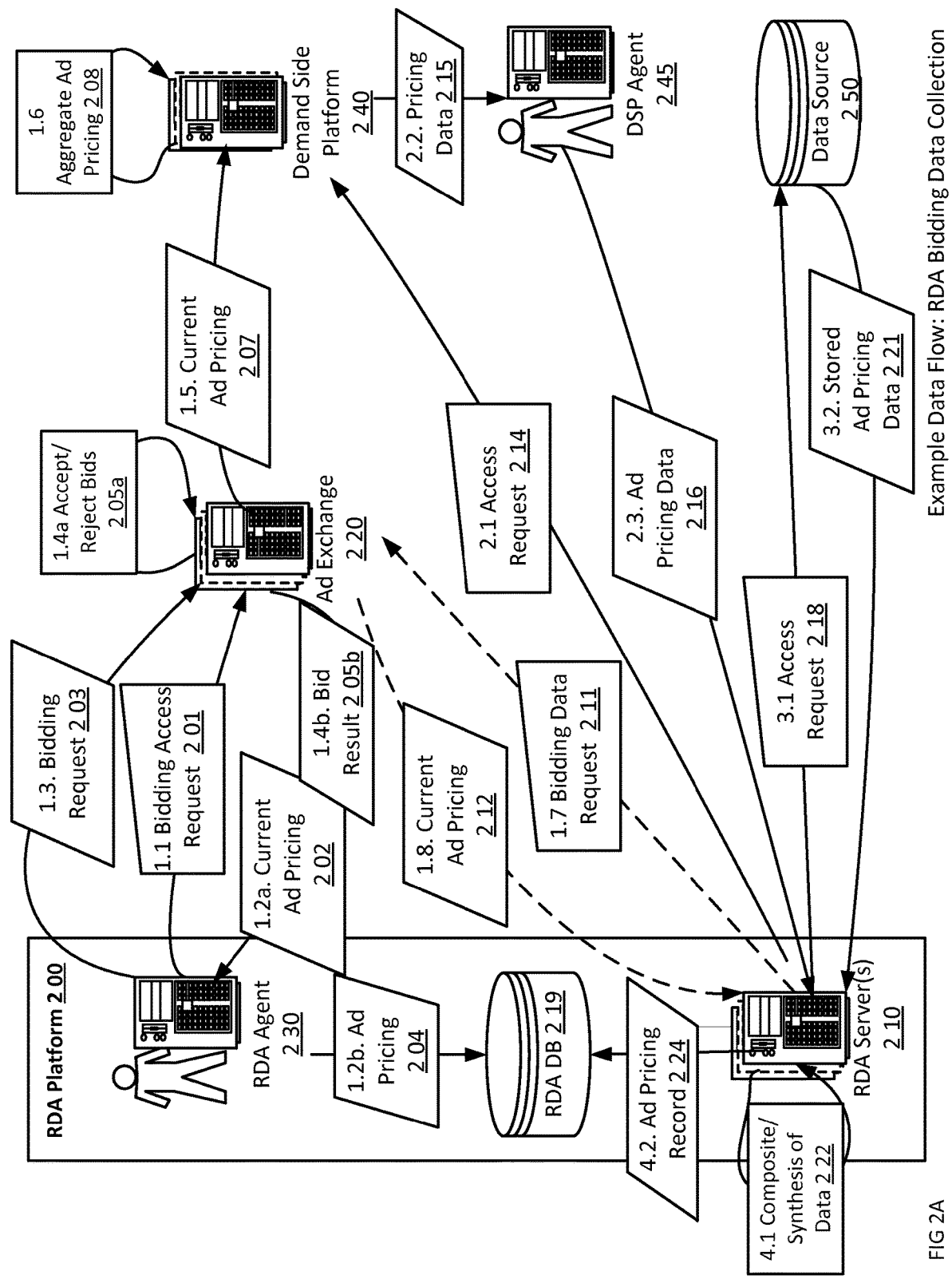
FIGS. 2A-2B provide data flow diagrams illustrating data flows between the RDA platform 200 and its affiliated entities for RDA bidding data collection within embodiments of the RDA.

FIG. 2A provides a data flow diagram illustrating data flows between the RDA platform 200 and its affiliated entities for RDA bidding data collection within embodiments of the RDA. Within embodiments, an RDA server 210, RDA agent(s) 230, an advertising exchange 220, a demand side platform (DSP) 240, DSP agent(s) 245, RDA database 219, other data sources 250, and/or the like, may interact via a communication network.

In one embodiment, RDA may obtain real-time ad bidding data updates via various data retrieval types. For example, in one implementation, a RDA agent 230, which may be a RDA employee and/or an intelligent component, may submit a bidding access request 201 to an ad exchange platform 240 (e.g., AdECN, Right Media, ContextWeb's Exchange, DoubleClick Ad Exchange, QZedia, Ayha, Adbrite, Zinc Exchange, OpenX and AppNexus, etc.). The bidding access request 201 may comprise an inquiry for the current ad pricing. For example, in one implementation, the RDA agent 230 may generate a (Secure) Hypertext Transfer Protocol ("HTTP(S)") POST message including a bidding access request for the Ad Exchange 220 in the form of data formatted according to the XML. An example listing of a bidding access request 201 to the Ad Exchange 240, substantially in the form of a HTTP(S) POST message including XML-formatted data, is provided below:

```
POST /bid_access_request.php HTTP/1.1
Host: 192.168.23.126
Content-Type: Application/XML
Content-Length: 867
<?XML version = "1.0" encoding = "UTF-8"?>
<bid_access_request>
    <session_id> 4SDASDCHUF ˆGD& </session_id>
    <timestamp>2014-02-22 15:22:43</timestamp>
    <agent_id> AI001 </agent_id>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <login_id> J.Smith001 </login_id>
    <password> XXXXXX </password>
    <status> good </status>
    <bid_access>
        <ad_attribute_1> news site </ad_attribute_1>
        <ad_attribute_2> new York </ad_attribute_2>
        ...
    </bid_access>
    ...
</bid_access_request>
```

In the above example, the RDA agent may submit a bidding access request indicating an interest in pricing information with regard to ads on "news sites" for the geo-location "New York."

In one implementation, in response to the bidding access request 201, the Ad Exchange 220 may provide the current Ad Pricing listing 202 to the RDA agent. For example, the Ad Exchange 220 may generate a HTTP(S) POST message including the ad pricing data 202 for the RDA agent 340 in the form of data formatted according to the XML. An example listing of the current ad pricing message 202, substantially in the form of a HTTP(S) POST message including XML-formatted data, is provided below:

```
POST /ad_pricing.php HTTP/1.1
Host: www.ad-exchange.com
Content-Type: Application/XML
Content-Length: 867
<?XML version = "1.0" encoding = "UTF-8"?>
<ad_pricing>
    <session_id> 4SDASDCHUF ˆGD& </session_id>
    <timestamp>2014-02-22 15:22:44</timestamp>
    <exchange_id> ECN001 </exchange_id>
    <exchange_name> AdECN </exchange_name>
    ...
    <ad_price_1>
        <ad_attribute_1> news site </ad_attribute_1>
        <ad_attribute_2> New York </ad_attribute_2>
        <bid1> $2.83 </bid1>
        ...
        <ask> $2.99 </ask>
        <rate> $2.98 </rate>
        <volume> 434,002 </volume>
        ...
    </ad_price_1>
    <ad_price_2>
        <ad_attribute_1> news site </ad_attribute_1>
        <ad_attribute_2> New York </ad_attribute_2>
```

```
            <industry> finance </industry>
            <bid1> $3.83 </bid1>
            <ask> $3.99 </ask>
            ...
            <rate> $3.98 </rate>
            <volume> 234,002 </volume>
                ...
        </ad_price_2>
    ...
    <!--optional parameters-->
    <pricing_plot>
            <ad_attribute_1> news site </ad_attribute_1>
            <ad_attribute_2> New York </ad_attribute_2>
            <time_range>
                  <start> 2014/01/01 </start>
                  <end> 2014/07/01 </end>
            <time_range>
            <plot> "ad_pricing.pdf" </plot>
            ...
    </pricing_plot>
        ...
</ad_pricing>
```

In the above example, the Ad Exchange 240 may provide ad pricing data to the RDA agent, and/or optionally provide a pricing map including the pricing bids plot in a PDF file format.

Alternatively, the RDA agent 230 may submit a bidding request 203 to obtain the most up-to-date ad pricing information. In some implementations, the RDA agent may adopt a strategy for discerning the price landscape of segments of the online display advertising market by selectively bidding on ads at the major ad exchanges (e.g., Google Ads, AdECN, Right Media, ContextWeb's Exchange, DoubleClick Ad Exchange, QZedia, Ayha, Adbrite, Zinc Exchange, OpenX and AppNexus, etc.), in order to obtain real-time updates of price and volume distributions across a wide variety of time, location, user, publisher, audience demographics, and other ad attributes, and formulate the distributions for any logical combination of these attributes (e.g. "Ad prices on Friday for men in NY making over $100K," etc.). Additional ad attributes may include geo-location of the ads, industry/publishers/industry advertisers, ad size, ad format (e.g., banner, audio, video, content synthesis, demographic synthesized ads, intended audience demographics, etc.), target audience (e.g., demographics, gender, occupation, income, education level, etc.), media channels (e.g., TV, video, mobile, search, dialogue, glasses, billboards, social, radio, print, atmospherics, weather, events, etc.), ad device types, search channels, time and duration, season, juxtaposition with regard to other content, news event types, and/or the like.

An example listing of the bidding request message 203 for "Ad prices on Friday for men in N.Y. making over $100K," substantially in the form of XML-formatted data, is provided below:

```
POST /bidding_request.php HTTP/1.1
Host: www.ad-exchange.com
Content-Type: Application/XML
Content-Length: 867
<?XML version = "1.0" encoding = "UTF-8"?>
<bidding_request>
    <session_id> 4SDASDCHUF ˆGD& </session_id>
    <timestamp>2014-02-22 15:22:44</timestamp>
    <exchange_id> ECN001 </exchange_id>
    <exchange_name> AdECN </exchange_name>
    <agent_id> AI001 </agent_id>
```
```
    <client_details>
        <client_IP>192.168.23.126</client_IP>
        <client_type>smartphone</client_type>
        <client_model>HTC Hero</client_model>
        <OS>Android 2.2</OS>
        ...
    </client_details>
    <bidding_price> $2.68 </bidding_price>
    <ad_attributes>
        <time> Friday </time>
        <frequency> weekly </frequency>
        <geo> New York </geo>
        <target_demo> men </target_demo>
        <income_lower_bound> 100,000 </income_lower_bound>
    <!--optional parameters-->
        <format>
            <type> banner </type>
            <content> audio </content>
            <size>
                <width> 600 </width>
                <height> 400 </height>
            </size>
            ...
        </format>
        <placement>
            <site> news site </site>
             headline 
            ...
        </placement>
        ...
    </ad_attributes>
        ...
</bidding_request>
```

In one implementation, in response to the bidding request 203, the Ad Exchange 220 may accept or reject the bids 205a, wherein the bidding result 205b is transferred back to RDA agent 230 who may infer the current ad pricing via the bidding process.

Within alternative implementations, the RDA server 210 may submit bidding data request 211 (e.g., in a similar format as that of bidding access request 201) to an Ad Exchange 220, and obtain the current ad pricing data 212 (e.g., in a similar format as that of the current ad pricing data 202). Various data transmission protocols may be adopted including FTP, HTTP, API calls, and/or the like.

Within alternative implementations, the RDA server 210 may submit an access request 214 to a DSP 240 for ad pricing data. For example, in one implementation, the RDA server 210 may generate an HTTP(S) POST message including an access request 214 to DSP 240 in the form of data formatted according to the XML. An example listing of an access request 214 to the DSP 240, substantially in the form of a HTTP(S) POST message including XML-formatted data, is provided below:

```
POST /access_request.php HTTP/1.1
Host: www.RDA.com
Content-Type: Application/XML
Content-Length: 867
<?XML version = "1.0" encoding = "UTF-8"?>
    <access_request>
        <session_id> server_4SDASDCHUF ˆGD& </session_id>
        <timestamp>2014-02-22 15:22:43</timestamp>
        ...
        <login_id> RDA001 </login_id>
        <password> XXXXXX </password>
        <status> good </status>
        <request>
            <data_type> ad price <data_type>
            <time_range>
                <start> 2014/01/01 </start>
                <end> 2014/07/01 </end>
            <time_range>
```

```
        <ad_attribute_1> news site </ad_attribute_1>
        <ad_attribute_2> new York </ad_attribute_2>
        ...
    </request>
    ...
</access_request>
```

In one implementation, the Ad Exchange 220 may provide current ad pricing information 207 (which may take a form similar to that of pricing data 202) to a DSP 240, wherein the DSP may aggregate ad pricing 208 from various Ad Exchanges 220. In one implementation, the pricing data 215 may be provided to the DSP agent 245, who may in turn provide the pricing list 216 (e.g., in a similar format as that of 202) to the RDA server 210.

Alternatively, the RDA server 210 may periodically, constantly, or intermittently send access requests 218 (e.g., including login credentials such as those shown in access request 214) to a data source 250 to retrieve stored ad pricing data 221. Such data sources may comprise an online database, vendor data service, cloud, and/or the like. Various data transmission protocols may be adopted including HTTPS, FTP, API calls, and/or the like.

In one implementation, the RDA agent 230 may store the obtained ad pricing data 204 at a RDA database 219, and the RDA server 210 may perform composite/synthesis of the obtained pricing data 222, e.g., generate analytics, indices, etc., and may store the ad pricing record 224 in the RDA database 219.

Figure 2B:
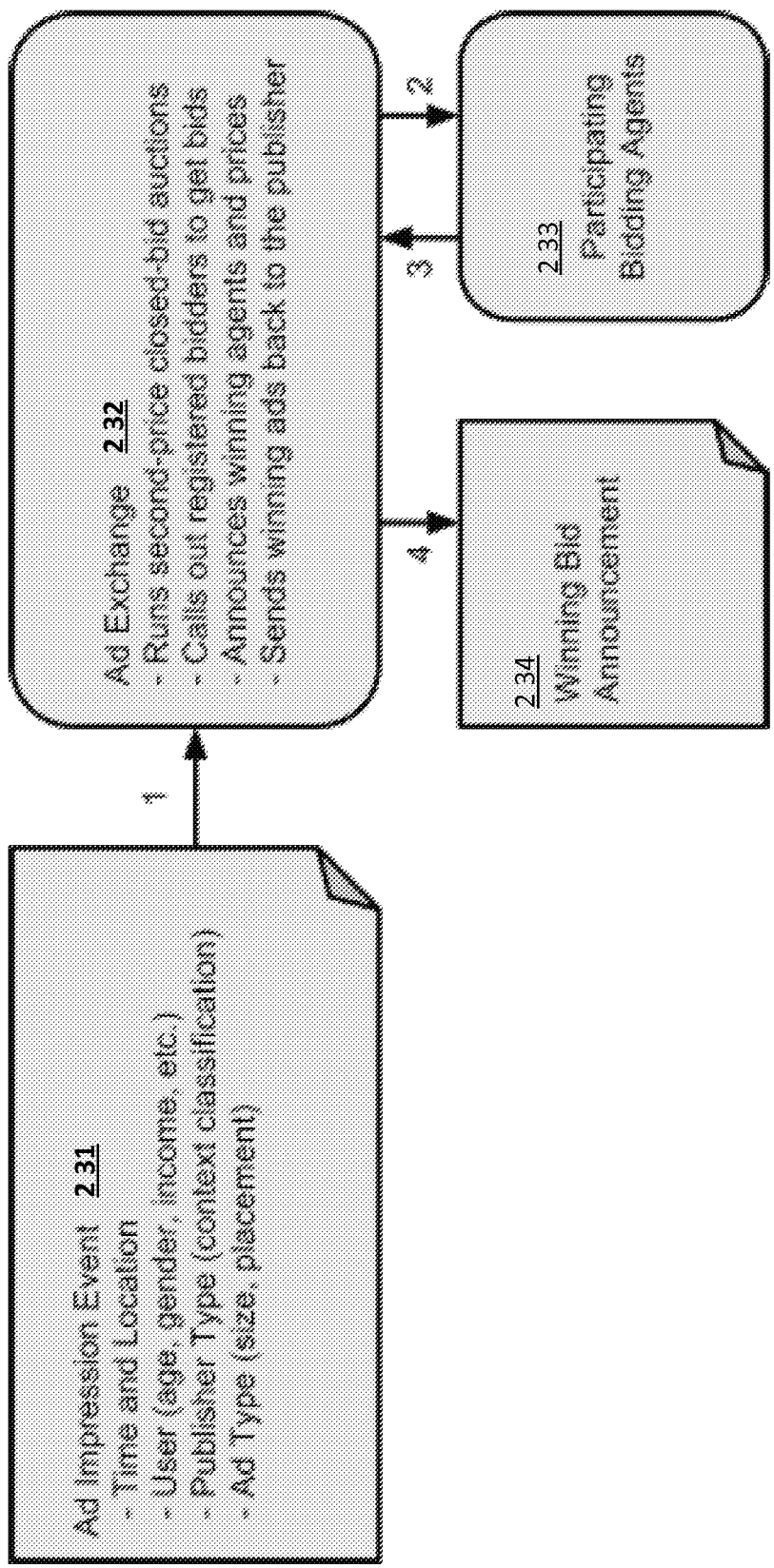

FIG. 2B provides exemplary data message diagrams illustrating data flow between RDA agents and other affiliated entities for RDA bidding data collection within embodiments of the RDA. Within embodiments, the Ad Exchange 232 may receive details about an ad impression event 231 (e.g., from various ad channels including a website, domain, TV, radio, bill board, etc.), including information such as the time and location, audience (age, gender, income, etc.), publisher type (e.g., context classification), ad type (e.g., size, placement), and/or the like. An example listing of an ad impression event message 231 substantially in the form of XML-formatted data, is provided below:

```
POST /ad_impression_event.php HTTP/1.1
Host: www.ad-exchange.com
Content-Type: Application/XML
Content-Length: 867
<?XML version = "1.0" encoding = "UTF-8"?>
<ad_impression_event>
    <session_id> 4SDASDCHUF ˆGD& </session_id>
    <timestamp>2014-02-22 15:22:44</timestamp>
    <exchange_id> ECN001 </exchange_id>
    <exchange_name> AdECN </exchange_name>
    <source> www.mynewsdaily.com </source>
    <agent_id> AI001 </agent_id>
    <ad_attributes>
        <time> Friday </time>
        <frequency> weekly </frequency>
        <geo> New York </geo>
        <target_user>
            <age> 20 above </age>
            <gender> men <gender>
            <income> 10,000 </income>
            ...
        </target_user>
        <publisher>
            <type> news site </type>
            <url> www.mynewsdaily.com/sports </url>
            <context_classification>
                <key_term_1> basketball </key_term_1>
                <key_term_2> Nicks </key_term_2>
                <key_term_3> MSG </key_term_3>
                ...
            </context_classification>
        <ad_type>
            <format> banner </format>
            <content> audio </content>
            <size>
                <width> 600 </width>
                <height> 400 </height>
            </size>
            ...
            <placement> side column   </placement>
            ...
        </ad_attributes>
        ...
</ad_impression_event>
```

In one implementation, upon receiving the ad impression event message 231, the ad exchange 232 may run second price closed bid auctions, e.g., with a sub-second response time, for each incoming ad impression from publishers, content providers, etc. The Ad Exchange 232 may call out registered bidders to submit their bids 233 that serve to fulfill the advertising campaigns of their clients. In one implementation, upon participating bidding agents 233 submitting their bids, the Ad Exchange 232 may provide winning bid announcement 234, which may comprise a message transmitted to the participating bidding agents, indicative of the current ad pricing. An example listing of a winning bid announcement message in response to the above exemplary ad impression event 231 substantially in the form of XML-formatted data, is provided below:

```
POST /win_bid.php HTTP/1.1
Host: www.ad-exchange.com
Content-Type: Application/XML
Content-Length: 867
<?XML version = "1.0" encoding = "UTF-8"?>
<win_bid>
    <timestamp>2014-02-22 15:22:44</timestamp>
    <exchange_id> ECN001 </exchange_id>
    <exchange_name> AdECN </exchange_name>
    ...
    <ad_attributes>
        <time> Friday </time>
        <frequency> weekly </frequency>
        <geo> New York </geo>
        <target_user>
            <age> 20 above </age>
            <gender> men <gender>
            <income> 10,000 </income>
            ...
        </target_user>
        <publisher>
            <type> news site </type>
            <url> www.mynewsdaily.com/sports </url>
            <context_classification>
                <key_term_1> basketball </key_term_1>
                <key_term_2> Nicks </key_term_2>
                <key_term_3> MSG </key_term_3>
                ...
            </context_classification>
        <ad_type>
            <format> banner </format>
            <content> audio </content>
```

-continued

```
    <size>
        <width> 600 </width>
        <height> 400 </height>
    </size>
    ...
    <placement> side column </placement>
    ...
</ad_attributes>
...
<winning_bid> $2.98 </winning_bid>
...
</win_bid>
```

Figure 3A:
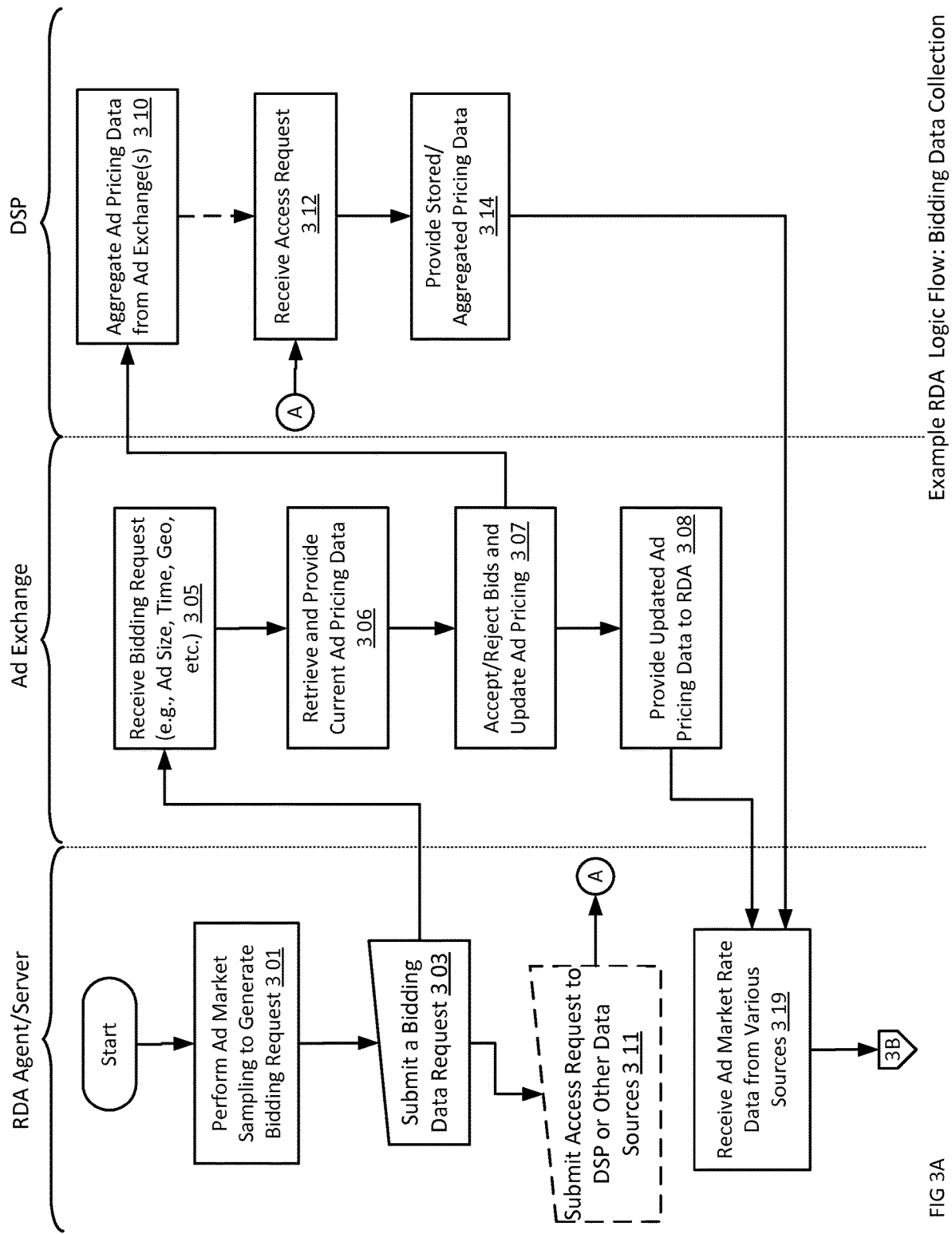
FIG. 3A provides a logic flow illustrating aspects of advertising bidding data collection within embodiments of the RDA.

FIG. 3A provides a logic flow illustrating aspects of advertising bidding data collection within embodiments of the RDA. Within embodiments, a RDA agent (e.g., an intelligent robot terminal agent or an individual agent, etc.) and/or the RDA server may perform advertising market sampling to generate bidding request 301. For example, the RDA agent may submit a bidding data request 303 (e.g., see 203 in FIG. 2A) to an ad exchange platform, which may in turn receive the bidding request including information as to the advertisement size, industry, channel, format, geo-location, time of placement, and duration, and/or the like, 305. Further implementations of the ad market sampling are discussed in FIGS. 4A-4F.

In one implementation, the ad exchange platform may retrieve and provide current advertising pricing data 306 in response to the bidding request, and accept or reject the submitted bids based on the current bidding. In one implementation, the ad exchange may update the current ad pricing 307 based on the received bids, e.g., an accepted ad bid may change the current price. In one implementation, the ad exchange may send the updated ad pricing data to RDA server and/or the RDA agent 308.

In another implementation, the ad exchange may send the updated ad pricing data to the DSP platform, which may in turn aggregate ad pricing data from various ad exchanges 310. Within implementations, an RDA agent and/or the server may submit an access request to the DSP and/or other ad pricing data source 311 in order to access pricing data (e.g., see 214 or 218 in FIG. 2A). Upon receiving such access request 312 at the DSP, the DSP may provide the stored and aggregated ad pricing data to the RDA server 314.

In one implementation, the RDA server may receive, e.g., at 319, ad market pricing data from various sources (e.g., from one or more ad exchanges via bidding sampling and/or directly, from DSP aggregation, from periodically updating with other data sources, etc.), and may perform analytics for data composite formation and synthesis, such as generating pricing prediction analytics, generating ad pricing indices, and/or the like.

Figure 3B:
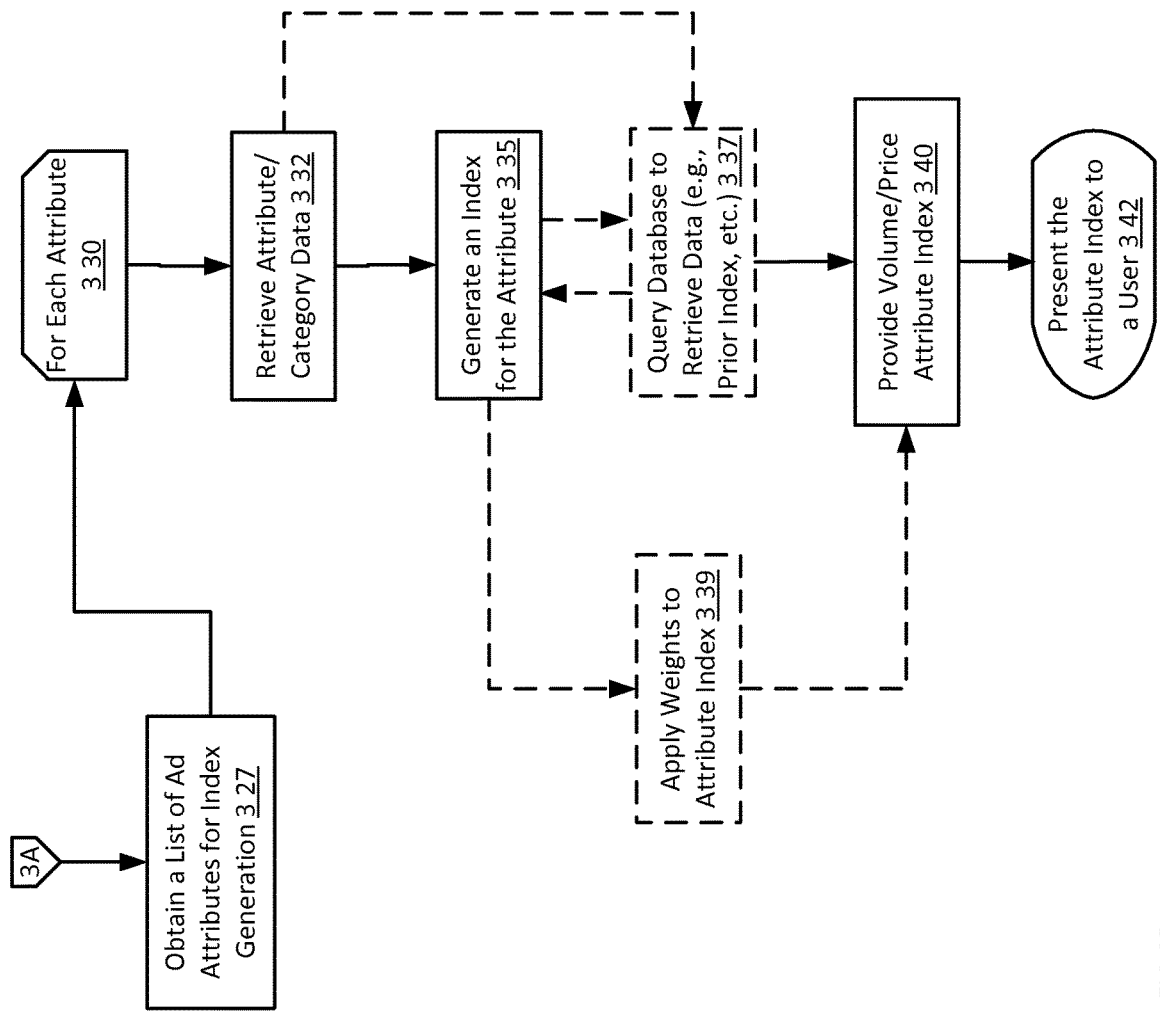
FIGS. 3B-3C provide logic flows illustrating aspects of creating ad pricing index within embodiments of the RDA.
Figure 3C:
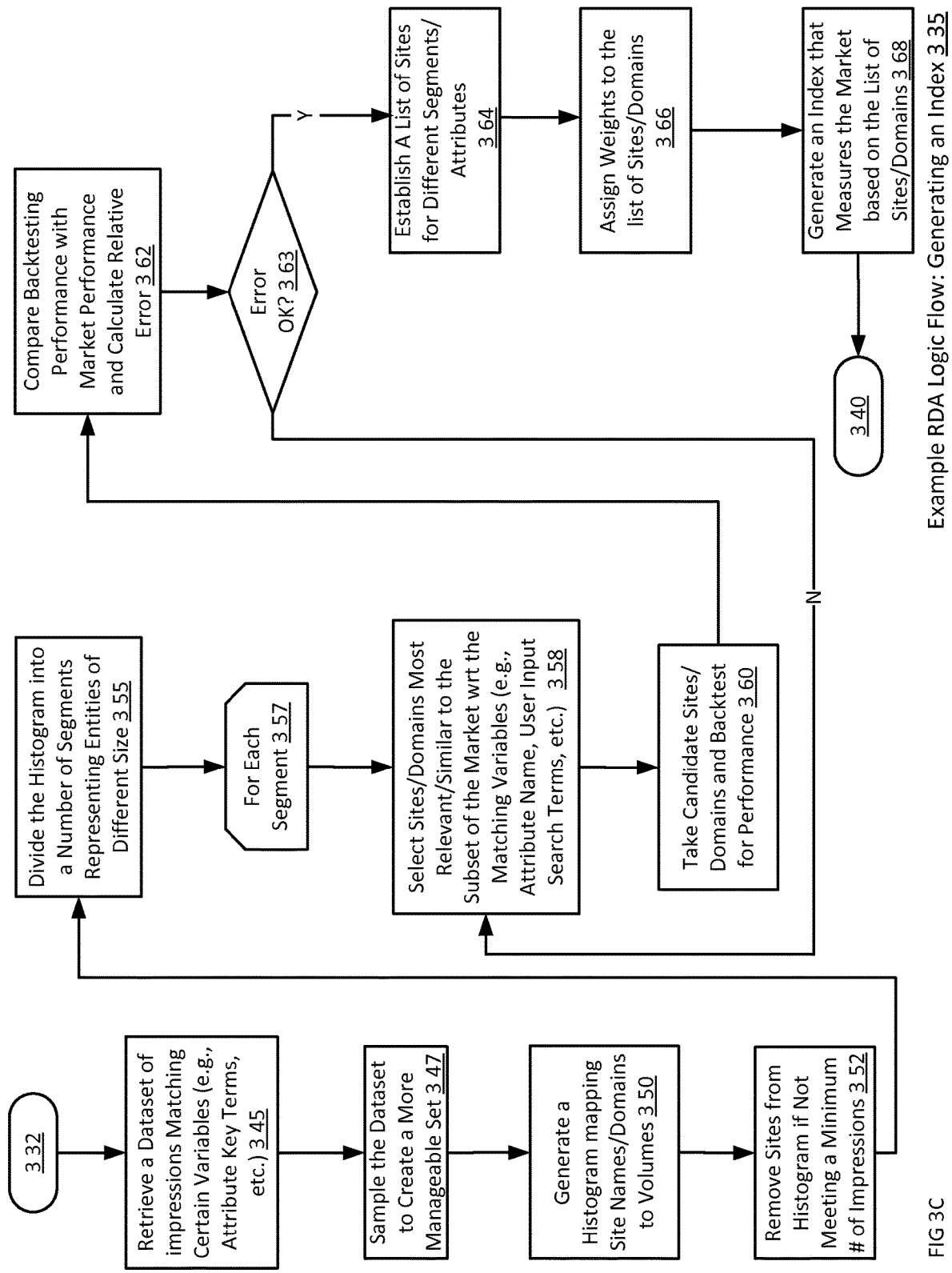

FIGS. 3B-3C provide logic flows illustrating aspects of creating an ad pricing index within embodiments of the RDA. Continuing on with the data composite formation and synthesis of ad pricing data obtained at 319, in one implementation, the RDA may (e.g., at 327) obtain a list of ad attributes for index generation. For example, the ad attributes may include geo-location of the ads, industry/publishers/industry advertisers, ad size, ad format (e.g., banner, audio, video, content synthesis, demographic synthesized ads, intended audience demographics, etc.), media channels (e.g., TV, video, mobile, search, dialogue, glasses, billboards, social, radio, print, atmospherics, weather, events, etc.), ad device types, search channels, time and duration, news events, and/or the like.

For each attribute 330, the RDA may retrieve pricing data associated with ads having the same or similar attribute and/or category 332, e.g., by querying a database to retrieve data (e.g., for prior index, ad pricing data, etc.) 337. In one implementation, the RDA may generate an index for the ad attribute (e.g., at 335), and may optionally apply weights to the generated attribute index at 339, as further discussed in FIG. 3C. The RDA may provide the volume/price attribute index 340 and present it via a user interface 342 (e.g., see FIGS. 5A-5J).

FIG. 3C provides a logic flow diagram illustrating aspects of generating an index 335 within embodiments of the RDA. Continuing on from obtaining ad pricing data associated with an ad attribute/category at 332, the RDA may retrieve data from a database of impressions matching certain variables (e.g., attribute key terms, user input search terms, etc.) 345. For example, if a user enters a search term for "sports industry," ad pricing data associated with the search term may be retrieved.

In one implementation, the RDA may optionally sample the dataset to create a more manageable dataset for further analysis 347. For example, the sampling may be based on timestamps (e.g., every 20 minutes, etc.), geo-location (e.g., per zip code), domain names, and/or the like. The RDA may generate a histogram of the sampled set, mapping ad hosting sites/domains to volumes 350. In one implementation, the RDA may remove ad hosting sites from the histogram if such hosting sites fail to meet a minimum number of impressions 352. In this way, the RDA may retain only hosting sites that accurately reflect, or contribute to an accurate approximation of, the ad market performance.

In one implementation, the RDA may divide the processed histogram into a number of segments, with each segment representing advertising entities of different sizes (e.g., large entity, medium entity, and small entity, etc.) 355. For each segment 357, the RDA may, at 358, select ad hosting sites/domains that are most similar to the subset of the market with regard to the matching variables (e.g., attribute name, user input search terms, etc.). In one implementation, the RDA may take candidate sites/domains and perform data analysis of their performance in ad markets 360. For example, if a user asks for an ad pricing index for the "sports industry," the RDA may select representative sites such as "www.espn.com," "www.nba.com," and/or the like. RDA may compare the backtesting performance of candidate sites/domains with market performance data, and calculate a relative error 362.

If the relative error exceeds a tolerant level 363, RDA may re-select candidate sites at 358, e.g., by expanding the selection with more candidate sites/domains. Otherwise, if the error is tolerable, RDA may establish a list of candidate sites for the segment 364, which may be used as representatives of the attribute to generate the related pricing index. In one implementation, the RDA may optionally assign weights to the list of sites/domains 366 in index generation. For example, such weights may be obtained via statistical regression based on prior market performance data, e.g., sites/domains that follow market performance more closely may be assigned with higher weights, etc.

In one implementation, the RDA may generate an index that measures the market under the attribute based on the list of sites/domains 368, e.g., by taking a weighted sum, a normalized sum, and/or the like. In one implementation, the resulting index may comprise numeric values for ad volume and prices. Alternatively, the index may comprise a data range indicating possible variation of ad volume and prices at an indicated timestamp.

In further implementations, the RDA may create a variety of financial instruments based on the ad pricing index. For example, the RDA may create a pricing matrix for a list of financial instruments based on the market stream/volume and auction data. Such financial instruments may include, but are not limited to, Securities, Derivatives (e.g., puts, calls, spreads, etc), Futures, Forwards, Options, Swaps, Industrial Index, Bet/Market pricing, Debt instruments, and/or the like.

FIGS. 4A-4F provide exemplary data plots and tables illustrating aspects of ad market performance sampling (e.g., 301 in FIG. 3A) within embodiments of the RDA. Within some implementations, the RDA may model volume and pricing distributions based on realistic assumptions about the market by analyzing the collected ad bidding data (e.g., see 319 in FIG. 3A).

For example, in one implementation, RDA may perform a sampling algorithm by assuming an ad exchange model, bidding agents and associated price distributions. Within some implementations, each ad impression (e.g., see 231 in FIG. 2B) processed by the exchange is associated with a variety of categorical and numeric attributes that may be broadly classified into the following categories: time, location, user, publisher type, and ad type, and/or the like. In one implementation, each impression event 231 may be represented by a tuple of attribute groups $G=(A_1, A_2 \ldots, A_m)$, where each $A_i$ in its turn contains one or more actual attributes $a_{ij}$. Each attribute and group may be set to a special null value $\Omega$ in addition to all its intrinsic values, which denotes absence of information about that entity. The rationale for organizing attributes into a two level hierarchy is that attribute groups may be largely independent from each other, whereas individual attributes within each group can be dependent (e.g. ad size/placement may be independent from user attributes under most circumstances, whereas user age and income are dependent).

Within alternative implementations, the ad exchange may assume that bidding agents each bid the price they are willing to pay for the impression in question, and the winner gets to pay the next highest price plus fees. Bidding agents may represent intermediary players rather than the actual advertisers, which can result in additional auctions performed by these agents to determine the top bidders within their influence. This introduces new levels of complexity and uncertainty to the formal analysis of advertising markets [2, 7], and provides further rationale for applying statistical learning techniques to study the dynamics of these markets.

In one implementation, one approach to modeling the ad prices for different attributes requires specifying a conditional probability distribution $P(\omega|G)$, wherein $\omega$ denotes the winning price (expressed as CPM) and G denotes a given list of attributes. To give a complete view of the market, it is sufficient to specify the probability $P(\omega|G)$ for each combination of attributes G and each $\omega$ within reasonable bounds. Alternatively, given that the number of combinations of all attributes under any realistic assumptions is very high (e.g., in billions), a simplified representations of the price model that approximates the above distribution may be described with far fewer parameters.

In one implementation, the $P(\omega|G)$ distribution may help identify ads with given attributes, e.g. what is the percentage of ads in a given price range, what is the likelihood of winning an ad with a given bid value, or how much should one bid to win X % of the time. The special value $\Omega$ may be used in G to leave attribute requirements blank, thus asking questions about some but not all attribute groups, e.g. what is the price of ads in N.Y. In one implementation, the time of the impression may be fully or partially incorporated into G, which means that our model may also answer time specific queries and represent seasonal variations of prices on different timescales, e.g. variations of prices over days of the week. Thus, based on the above definitions, the RDA may specify a parametric model for representing the price distribution $P(\omega|G)$, develop a market sampling strategy for learning the parameters of the model, and/or estimate the scale and cost of the sampling procedure under realistic conditions.

In one implementation, the RDA may formulate a pricing model for a single ad exchange, with the assumption that the same model may be applied to all major ad exchanges with minor modifications. The RDA may also analyze price distributions, with the understanding that other numerical variables (e.g. impressions per unit time, bids per impression) can be modeled in a similar fashion and the sample size determination procedure can be applied to these variables with some modifications.)

Figure 4A:
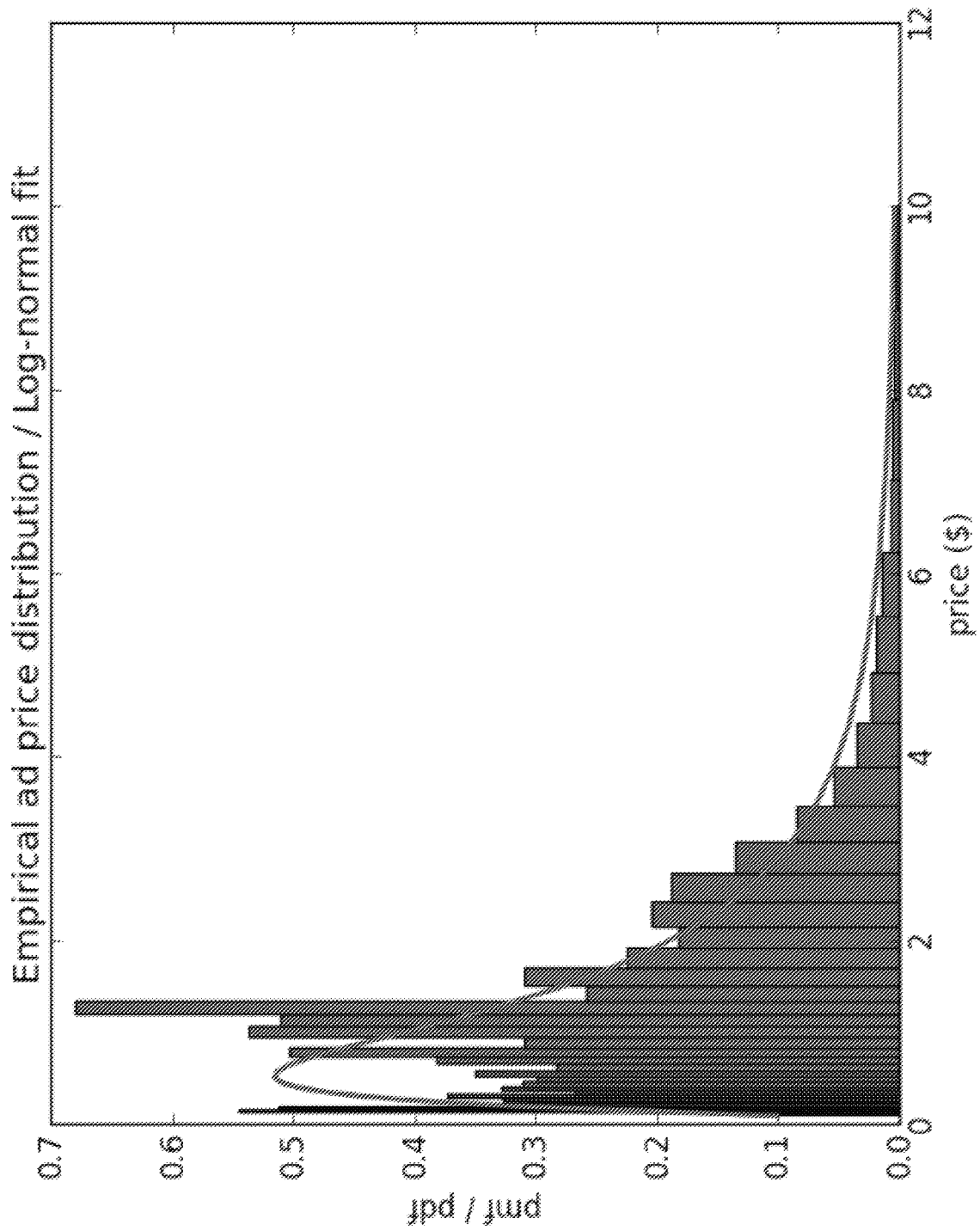

For example, a realistic parameterization of the conditional distribution $P(\omega|G)$ for a specified list of attributes G may exhibit a lognormal distribution, parameterized by the underlying Normal distribution's mean and variance, which is a common first approximation for positive quantities that emerge in various markets and social systems. FIG. 4A shows an exemplary data plot of an empirical distribution of ad prices over a given hour, along with the corresponding lognormal fit (which in this example is Log–N($\mu$=0.249, $\sigma^2$=0.869)).

Within implementations, the RDA may obtain a limited amount of ad impression data through partnering firms, as well as via simulation tools that may assist in generating or identifying price formation patterns at exchanges under various market conditions. Such data as well as the simulations may be adopted to design the models and explore their statistical properties.

In some embodiments, a wide variety of commercially-available statistical analysis software tools may be employed in simulating information relevant to the RDA's processes, including SPSS Statistics, SAS, Stata, Statplus, Minitab, MATLAB, Mathematica, Maple, SOFA Statistics, Statistics Online Computational Resource (SOCR), and/or the like. Market research techniques such as regression (e.g., linear, multiple linear, etc.), discriminant analysis, analysis of variance (ANOVA), multiple ANOVA (MANOVA), t-testing (e.g., one-sample, paired samples, two independent samples, etc.), cluster analysis, factor analysis, and/or the like may be employed in the analysis of aggregated data and/or the forecasting of future advertising marketplace behaviors. In some embodiments, missing data from aggregated datasets may be classified as 'missing completely at random' (MCAR), 'missing at random' (MAR), or 'not missing at random' (NMAR). Strategies for handling missing data may be employed by the RDA, and such strategies may be selected, for example, according to the missing data's classification type. Instances of MCAR data may occur without a discernible pattern, and may, depending on the embodiment, be remediated through listwise deletion, pairwise deletion, and/or hot deck/cold deck imputation. Instances of MAR (i.e., the missingness of variable A is related in some way to other variable B) and NMAR data (i.e., the missingness of variable A is related in some way to its own value), on the other hand, may be dealt with using techniques such as recursive imputation, increasing sample size, elimination of a variable. rephrasing the query, or by subdividing the data into smaller groups for comparison, whereby at least one group is not missing data.

In some embodiments, the RDA may refine its pricing/volume models (e.g., to compensate for sources of skew or other inaccuracies) by setting rules which modify the impact that certain data points are permitted to have. For example, when trading/purchase volumes of an asset (e.g., an advertisement, a derivative of an index thereof, etc.) fall below a certain threshold, inflection points (e.g., "spikes") in the data may be ignored or assigned a reduced significance.

FIG. 4B shows exemplary data plots illustrating the price distribution obtained from a simulation of ad exchange activity, showing that the shape of the data follows a general lognormal curve. The left pane of the data plots shows the prior distribution assumed by agents in the simulation before running the RDA pricing model, and the right pane shows the gradual convergence of the posterior distribution to its final form after simulating an exchange for a period of one hour. In further implementations, both the simulated distribution (FIG. 4B) and the empirical price distribution (FIG. 4A) may be obtained with a mixture of two or more lognormals.

In one implementation, upon choosing a parametric model for our price distributions, the RDA may iteratively train and test the model on real market data sampled from the major exchanges over a period of time, until a desired level of accuracy across the various attribute groups is reached, e.g., until the selected attribute in the list has a significant effect on the distribution, and, in case it does, the RDA may determine in what way it modifies the price distribution. In one implementation, the RDA may optionally make several additional assumptions in formulating a rough estimate of the costs and scale associated with market sampling which may be replaced by more sophisticated ones. For example, the RDA may set constraints on the allowed effects of attribute groups on price distributions and may be stated as indicated below.

As a first assumption, according to some embodiments, there is a well defined and empirically established price distribution for the entire market:

$$P(\omega)=P(\omega|\Omega, \ldots, \Omega))=\text{Log-}N(\mu=\mu_o, \sigma^2=\sigma_o^2)$$

A second assumption may be that, for any fixed list of attribute groups $G=(A1, \ldots, Am)$, there are well defined and empirically derivable functions, Fi, for each attribute group with the following properties:

$$F_i(\Omega)=0; \quad\quad\quad (a)$$

$$P(\omega|(A1, \ldots, \Omega, \ldots Am))=\text{Log-}N(\mu=\mu^*,\sigma^2=\sigma_o^2)=> \quad (b)$$

$$P(\omega|(A1, \ldots, \Omega, \ldots Am))=\text{Log-}N(\mu=\mu^*+F_i(A_i), \sigma^2=\sigma_o^2)$$

In the above assumptions, the first assumption is basically a statement about a lognormal prior distribution of the prices when no additional information is known about the attributes. This can be easily estimated from empirical data, and its first approximation is provided in FIG. 4A. The second assumption limits the ways that knowledge of an attribute can modify the posterior price distribution. The limitation may be equivalent to stating that knowledge of an attribute group's value can only have an additive effect on the mean log price of the ad, wherein this effect is assumed to be independent of the values of all other attribute groups.

Within some implementations, the second property may reduce the problem of learning the price model to learning the set of functions $\{F_i\}$. Within some implementations, the RDA may take the additive log price effect a step further, to infer the following property:

$$E(\log(w)|A_1, \ldots, A_i, \ldots, A_m) = \mu_0 + \sum_{i=1}^{m} F_i(A_i)$$

which may be explained by studying common bidding patterns in the current market place. For example, bidding algorithms may look up a list of multipliers for the bid price, each corresponding to a value of an attribute or a group of related attributes. For example, a bidding strategy for a particular advertising campaign may express its emphasis on entertainment and fashion websites by setting large multipliers for those particular values of the publisher context attribute. Bids are then calculated by applying the list of multipliers to a starting value that is either constant for the strategy or determined by factors not modeled here (e.g. frequency, pacing, budget considerations). This multiplicative effect of attribute values on prices, taken in aggregate, corresponds to the additive effect on the mean log price in the above formula.

In one implementation, the RDA may define a market sampling procedure and make quantitative statements about its scale and costs under various scenarios for the scope and desired accuracy of the models. For example, the RDA may adopt basic sample size determination methods for normal distributions under a Bayesian framework. In such an example, the RDA may first define the list of attribute groups and individual attributes. FIG. 4C provides an exemplary list of attributes with their value types and counts.

In one implementation, each attribute group may be treated as a separate variable Ai with a set of Ni values spanning possible combinations of the individual attributes, together forming the attribute space of the problem. Several scenarios of limiting the attribute space for reasons of efficiency and sampling cost reduction may be considered: e.g., from complete information to a very limited subset containing only the essential attributes with their most frequent values.

FIG. 4D provides exemplary scenarios of 'sampling cost' reduction within embodiments of the RDA. For example, as shown in FIG. 4D, the RDA may consider scenarios A, B, C, and D for further analysis (T1, T2, T3, and T4 are intermediate cases). The scenarios have the following attribute limitations:

A: No limitations, entire attribute space from FIG. 4C is included;

B: Cities are excluded, and U.S. locations are modeled only by Designated Marketing Area (DMA) and State;

C: In addition to the constraints set forth in scenario B, day of month is also excluded, and time is modeled only by weekday and hour; and D: In addition to the constraints set forth in scenario C, only the most frequent DMA, User Interest, and Ad Types are considered.

Within some implementations, the above scenarios may be combined or modified (e.g. by limiting the user demographic and time attributes), or more attributes/attribute groups may be added in order to construct more complex scenarios (e.g. attributes for the domain, media type, and/or external factors). The total number of attribute groups may be also the number of functions {Fi}needed to fully specify the model. The functions may be represented as lookup tables from Ni values of the attribute group to numbers specifying the expected hourly volume and currently estimated effect on log price. For example, the largest table may be the time lookup (6000+ values in A), which is far more manageable than dealing with all the combinations of attributes directly ($2.5 \times 10^{12}$ values in A). To determine the minimum sample size required to estimate each Fi to a given level of accuracy e, the RDA may introduce two more parameters: desired significance level $\alpha$, and the desired power of the test $1-\beta$. These two parameters may be converted to corresponding z-scores $z_\alpha$, $z_\beta$ and are used in the following formula for determining sample size:

$$S(\varepsilon,\alpha,\beta)=\sigma_o^2(z_\alpha+z_\beta)^2/\varepsilon^2,$$

wherein $\sigma_o^2$ is the variance of the log of the prior iteration and is known by the prior assumption. The values of $\alpha$ and $\beta$ can, for example, be conservatively set to correspond to 95% confidence intervals and 80% power to detect the effect of Fi, which yields a sum of z-scores of 2.8, obtaining:

$$S(\varepsilon,\alpha,\beta)=(2.8\sigma_0)^2/\varepsilon^2$$

The accuracy level $\varepsilon$ may be interpreted as the smallest nonzero value of Fi to detect using the collected samples. Since Fi represents an additive effect of an attribute on the log price, the minimum detectable effect should be set to a value significantly less than one. In one implementation, the RDA may set $\varepsilon$ to 0.05 across all attribute groups, but this may not always have a strong theoretical justification, and in some embodiments could require adjustment, e.g., based on initial results. Setting $\varepsilon=0:05$ permits detecting a difference of $0.10 near the mean $1.98 ($\varepsilon=0.025$ detects a difference of $0.05). With our initial approximation of $\sigma_o=0.932$, the sample size formula yields:

$$S(\varepsilon,\alpha,\beta)=(2.8\cdot 0.932)^2/0.05^2 \approx 2700$$

The above estimate may be used to find the total number of samples required to get the first approximation of the display advertising price landscape on a single exchange. In one implementation, the RDA may instantiate the market sampling process on a continuous or iterative basis, and this number may be interpreted as the total number of samples per sampling period:

$$N(\varepsilon, \alpha, \beta) = S(\varepsilon, \alpha, \beta) \cdot \sum_{i=1}^{m} n_i \approx 2700 \cdot \sum_{i=1}^{m} N_i$$

If one period of the sampling process takes H hours to run (e.g., in one embodiment, it should run for two or more months to be able to detect effects of days on log prices, in which case $H \geq 1400$), the average number of samples that need to be collected on an hourly basis is given by:

$$n(\varepsilon,\alpha,\beta,H)=N(\varepsilon,\alpha,\beta)/H \leq N(\varepsilon,\alpha,\beta)/1400$$

FIG. 4E provides an example list showing the estimates of N for scenarios A, B, C, D from FIG. 4D. The sample size may depend on the desired accuracy level and the attribute space being modeled, but realistic estimates lie between hundreds of thousands to tens of millions for each individual exchange. In order to estimate the costs of this process for each scenario, the RDA may need to specify a bidding strategy that allows for the acquisition of a representative set of sample impressions for every attribute group. In addition to the size of the sample, the distribution of samples in time must also be taken into account, with an objective of relative uniformity for the entire period.

Exchanges can be classified according to their degree of visibility of winning bids. If the winning bids and prices are broadcast to all participating agents, the exchange may be classified as 'fully observable.' An exchange may also be 'partially observable.' For fully observable exchanges, the RDA may bid a low positive constant $\delta$ to win at a certain low, but nonzero rate, which may be determined by the specific business relationship with the exchange in question. Bidding zero or never winning a bid may result in problems over a period of time, however bidding low may overcome these complications.

For partially observable exchanges, RDA may need to win at a rate of at least S ($\varepsilon$, $\alpha$, $\beta$)/H per hour across the range of prices for each value of each attribute group, in order to form a realistic picture of the effect of the attribute(s). In addition to the above requirement for rate, the RDA may bid to win within a certain quantile q of the price distribution $P(\omega(A1, \ldots, \Omega, \ldots Am))$, e.g., >50%), in order to accurately reconstruct the price distribution conditional on Ai. In one implementation, the RDA may combine the two rate requirements and bid at the highest rate.

In one implementation, RDA may follow the following bidding formula: $B(q, n, h, Q)=Q$ (max(n/h, q)), where q=desired quantile to win at, e.g. 75%; n=desired number of wins per hour of impressions with $A_i$; h=expected number of impressions with $A_i$ in an hour; Q=quantile function for the current estimate of $P(\omega|(A1, \ldots, \Omega, \ldots Am))$.

The quantile function may be different for every value of each attribute group, but on average the bid may be near the corresponding quantile of the prior distribution $P(\omega)$. Given the above typical values for n, h, and the corresponding 75% percentile of the prior distribution (estimated as Log-N ($\mu=0.249$, $\sigma^2=0.869$), see FIG. 4A), the formula yields an average bid of $2.4 CPM. The 90% percentile under the same assumptions raises the average bid to $4.2 CPM.

In one implementation, if there are L ad exchanges to sample, and all of those are fully observable ("$L_{obs}$"), FIG. 4F provides the total one period cost of sampling the entire marketplace, under the scenarios A,B, C, D from FIG. 4C, and with corresponding hourly and total sample sizes from FIG. 4E. The costs are reported in two columns: upper bound, which is based on our bid and is thus the highest figure we can spend, and expected cost, computed as the conditional expectation of the winning price w given the bid b: $P(\omega|(\Omega, \ldots, Ai, \ldots \Omega), \omega<b)$.

In one implementation, the number of exchanges may be kept constant at L=7, whereas the number of fully observable exchanges is yet unknown and may change in the future. For example, when $L_{obs}=0$ and $L_{obs}=3$, which will give a decent idea of how full observability affects the sampling costs. The data is presented for accuracy parameter e=0:05, a realistic value of $0.50 CPM for the minimum bid 6, and two possible values for the bid quantile q: 75% and 90%.

In further implementations, the RDA may incorporate floor prices and other ad hoc constraints, model secondary effects of on price distributions other than the mean Ai log price effect, use mixtures of lognormals to parameterize the price distributions conditional on Ai, combine segments that prove to be sufficiently similar, and/or design probabilistic models capturing the dependencies between attributes and groups. In further implementations, the RDA may consider flexible and sophisticated sample size calculations for determining sample sizes under various criteria, including more rigorous effect size detection under a Bayesian framework. These methods become especially relevant for more complex probabilistic models. In a further implementation, the RDA may develop bidding strategies that can be more flexible, efficient, and responsive to changes in the market conditions (e.g. periodic changes in impression volume) based on machine learning and time series analysis methods to detect outliers and change points in the price and volume patterns, which can be useful in its own right and will help make the market models more accurate and robust against fluctuations. In a further implementation, the RDA may optimize the process of data collection and model updates, iteratively, with market dynamics and variability. In further implementations, the RDA may take into account dependencies between ad exchanges in the evaluation, analysis and/or modeling of ad price distributions and/or other numerical variables, such as impressions per unit time, bids per impression, etc.

Figure 5A:
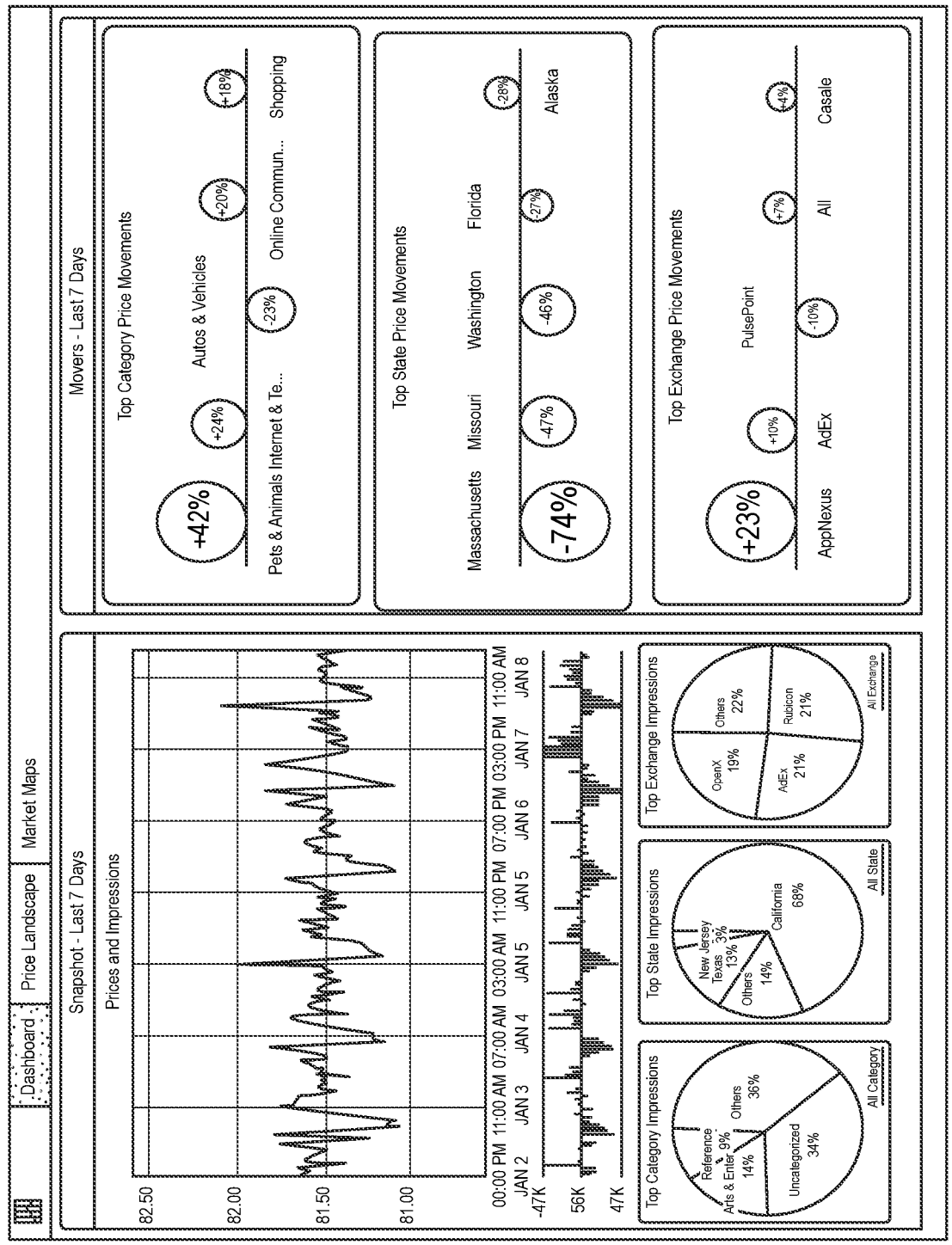
FIGS. 5A-5O provide exemplary user interface (UI) diagrams illustrating client component UI of the RDA within embodiments of the RDA.
Figure 5B:
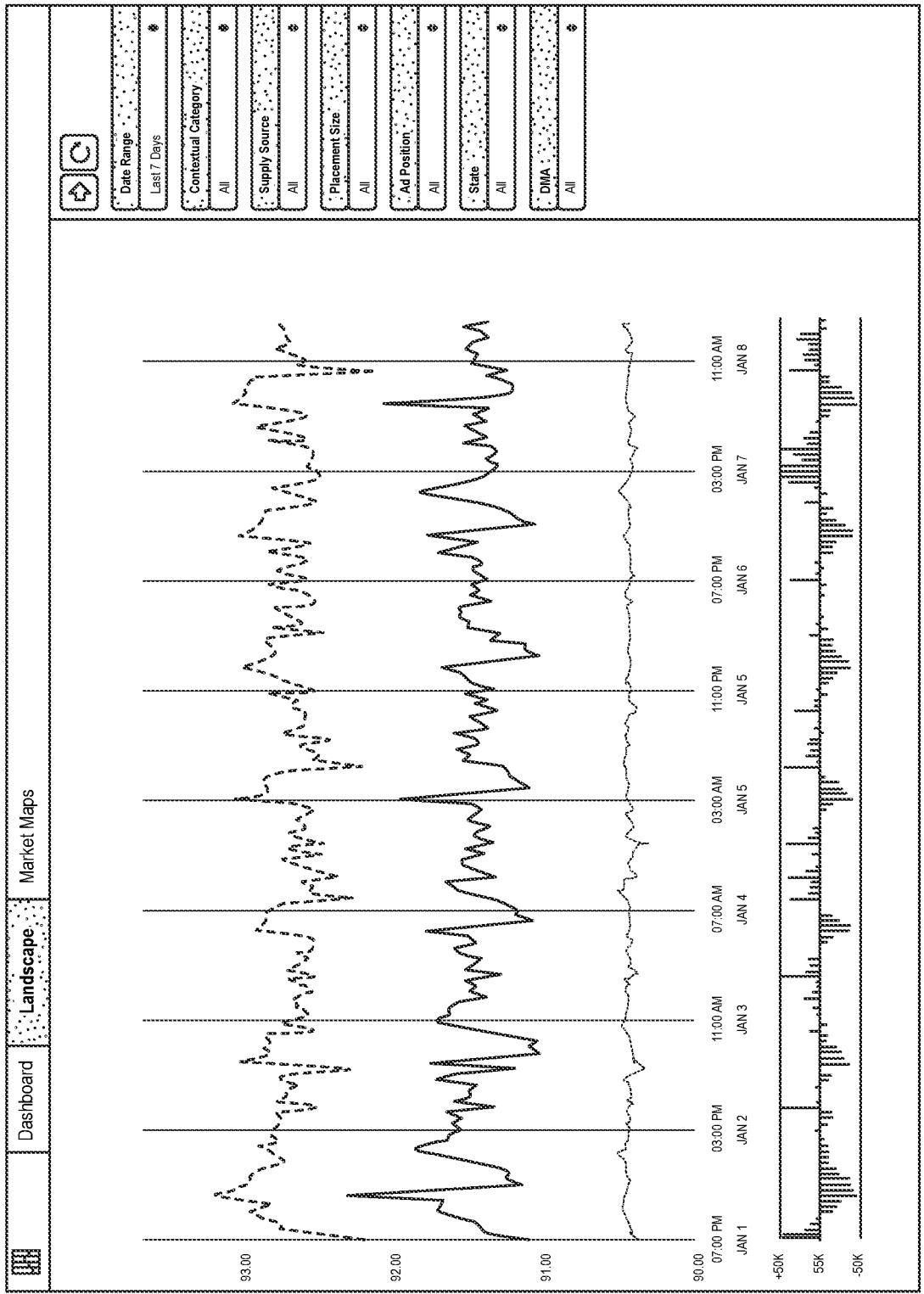
Figure 5C:
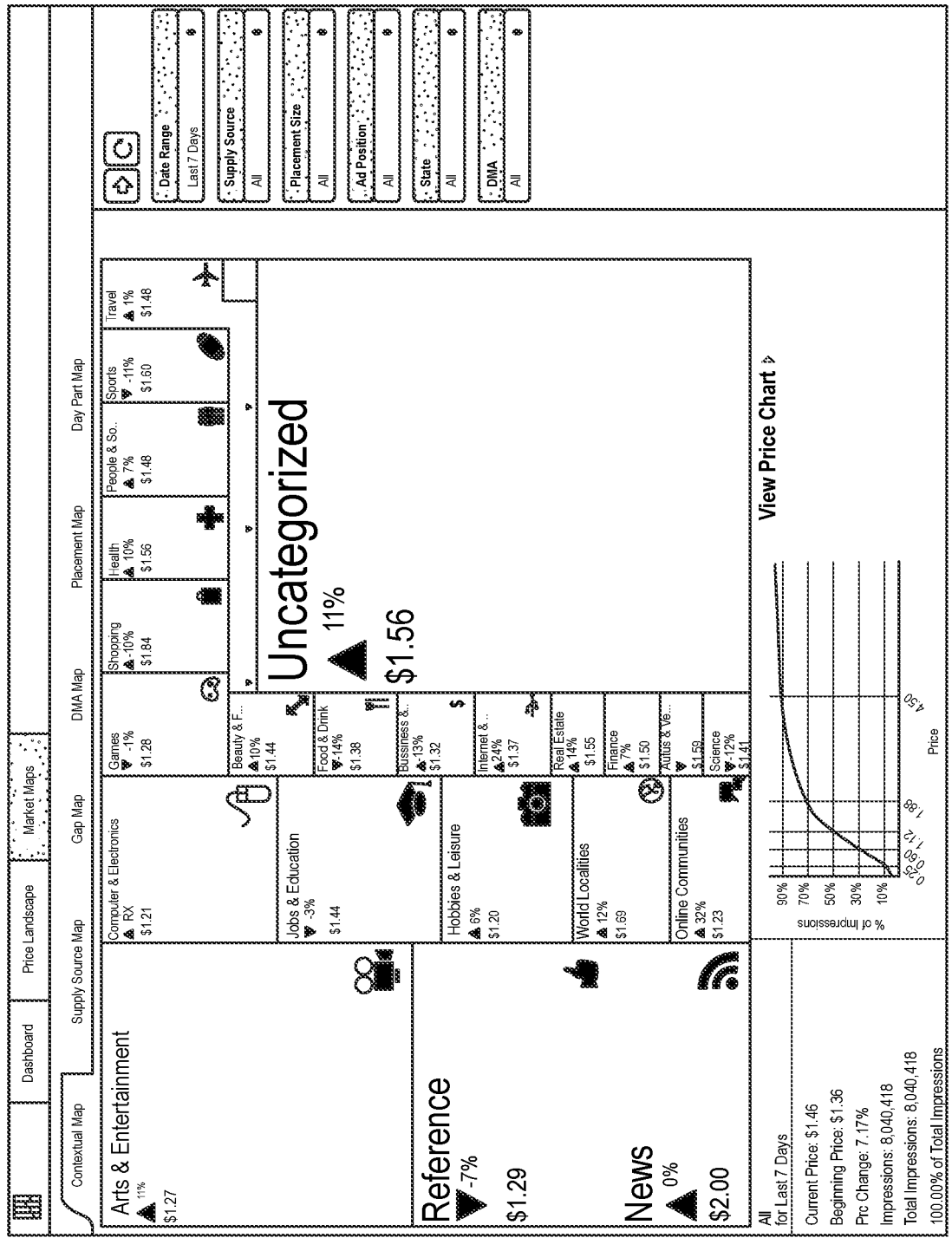
Figure 5E:
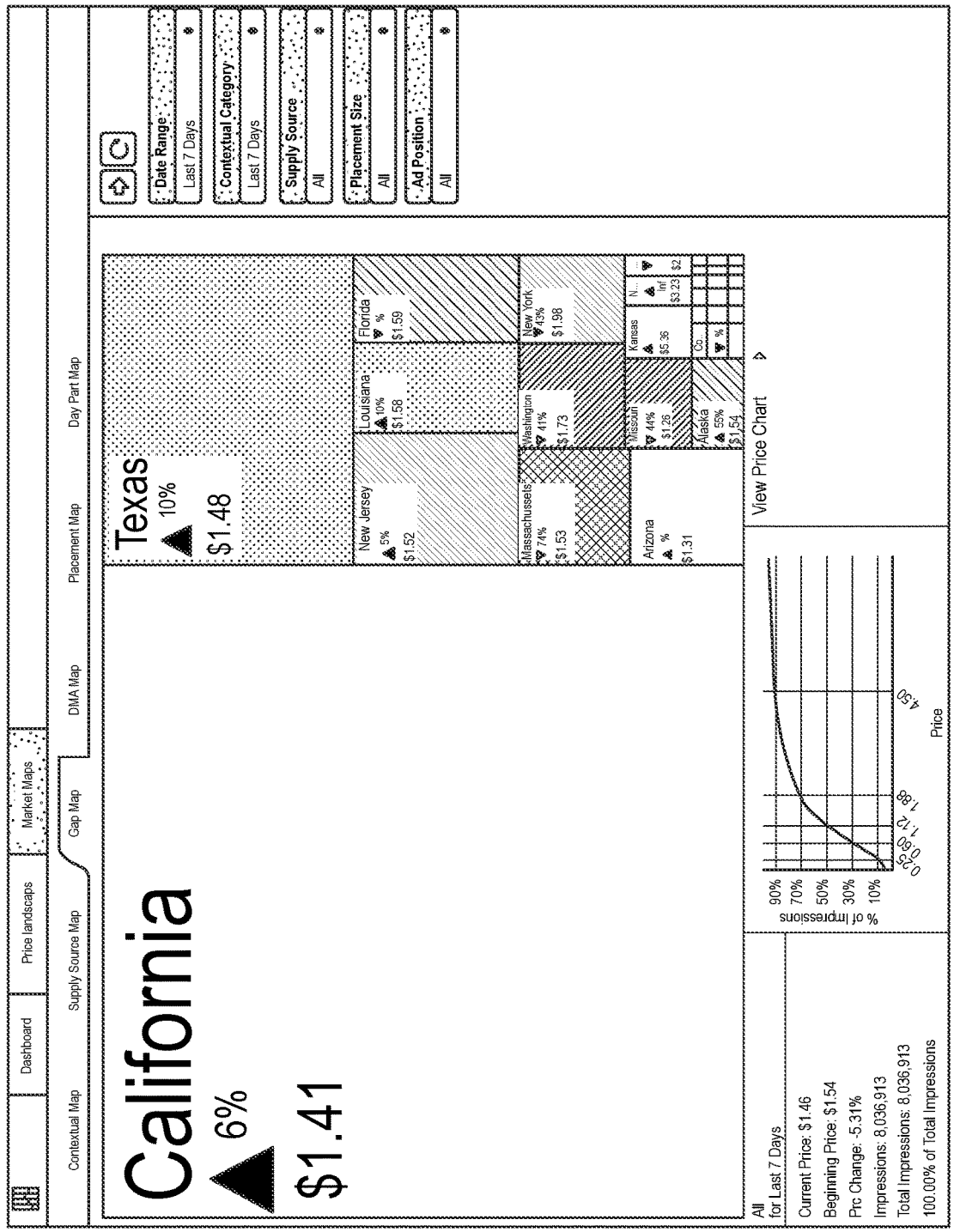
Figure 5F:
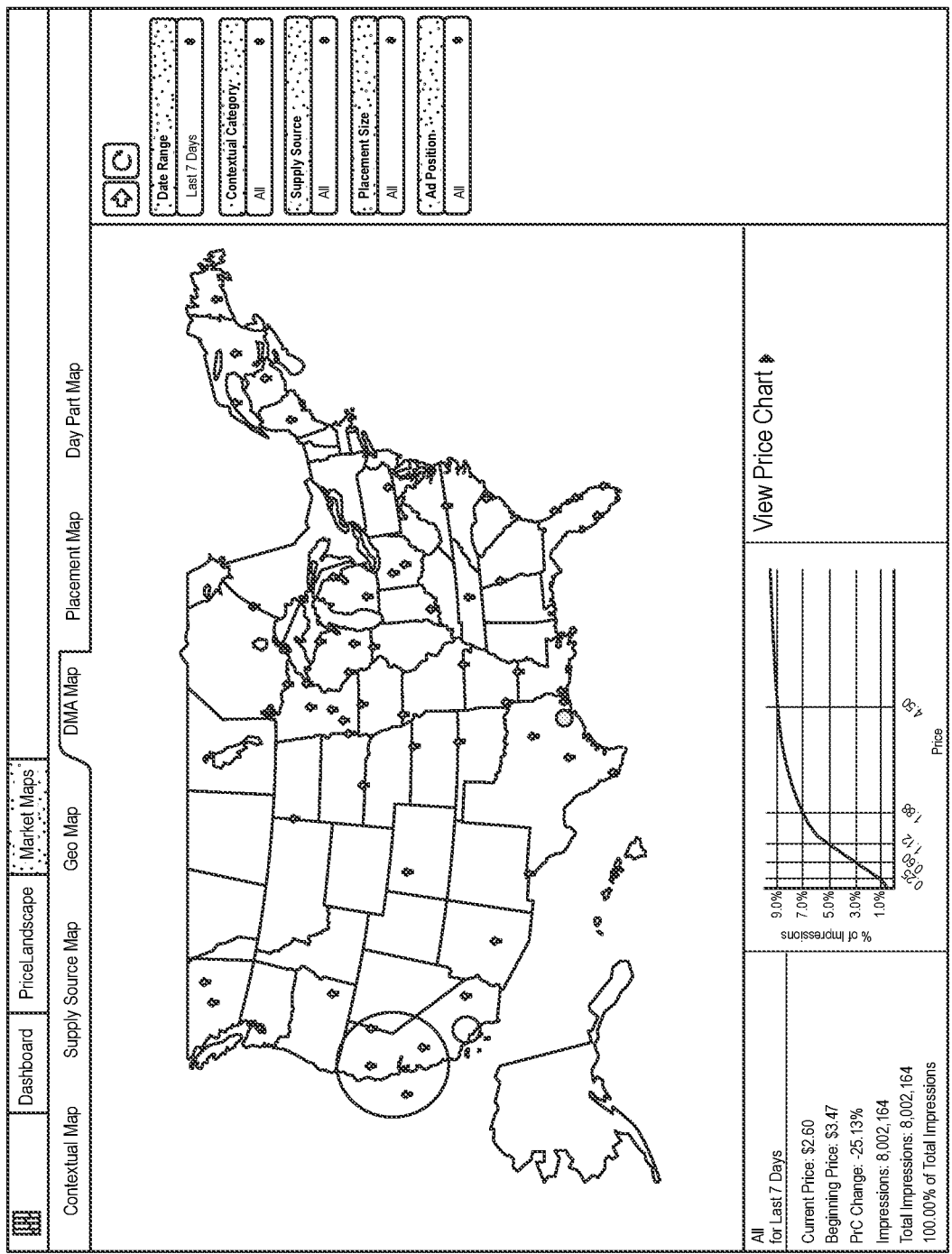
Figure 5G:
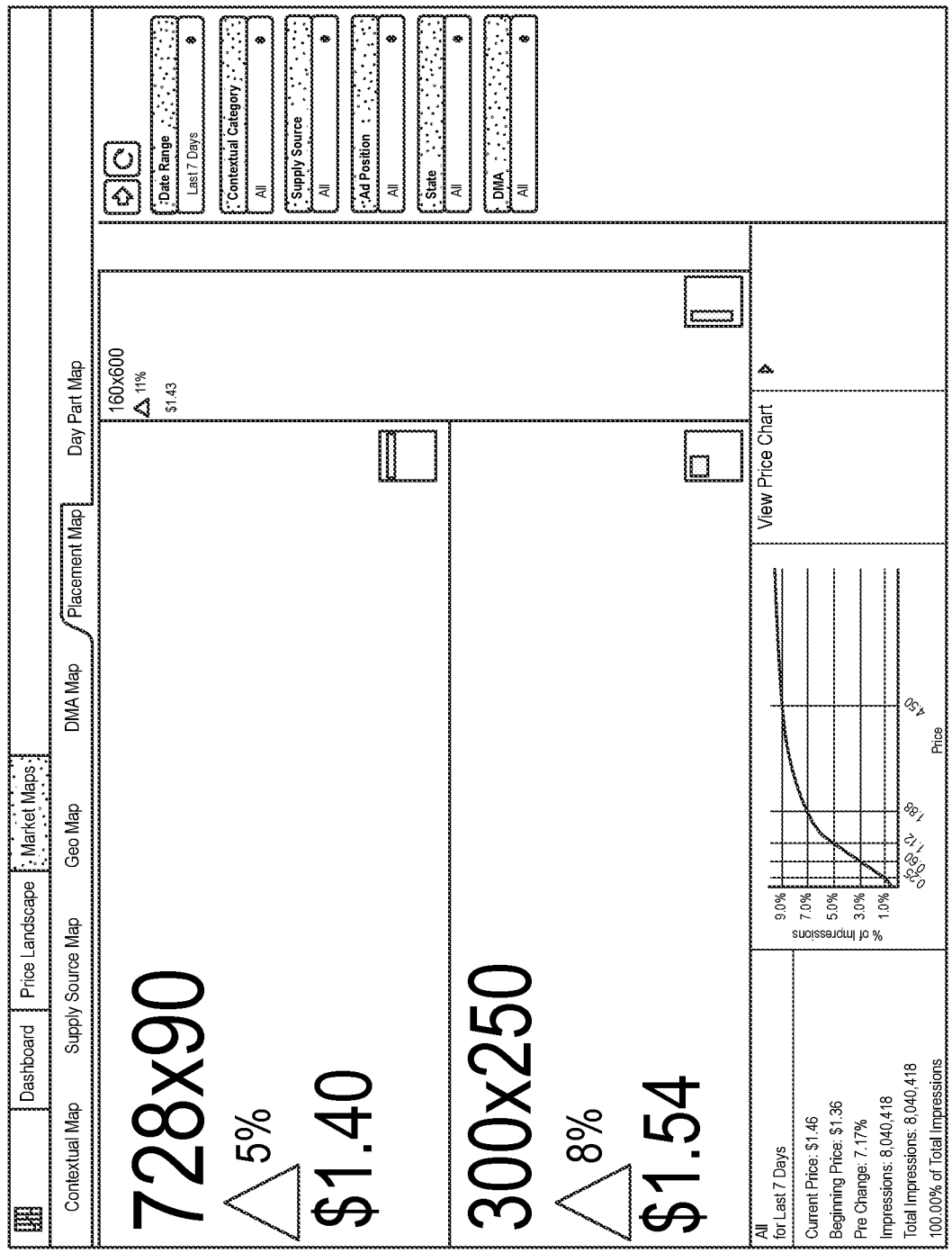
Figure 5H:
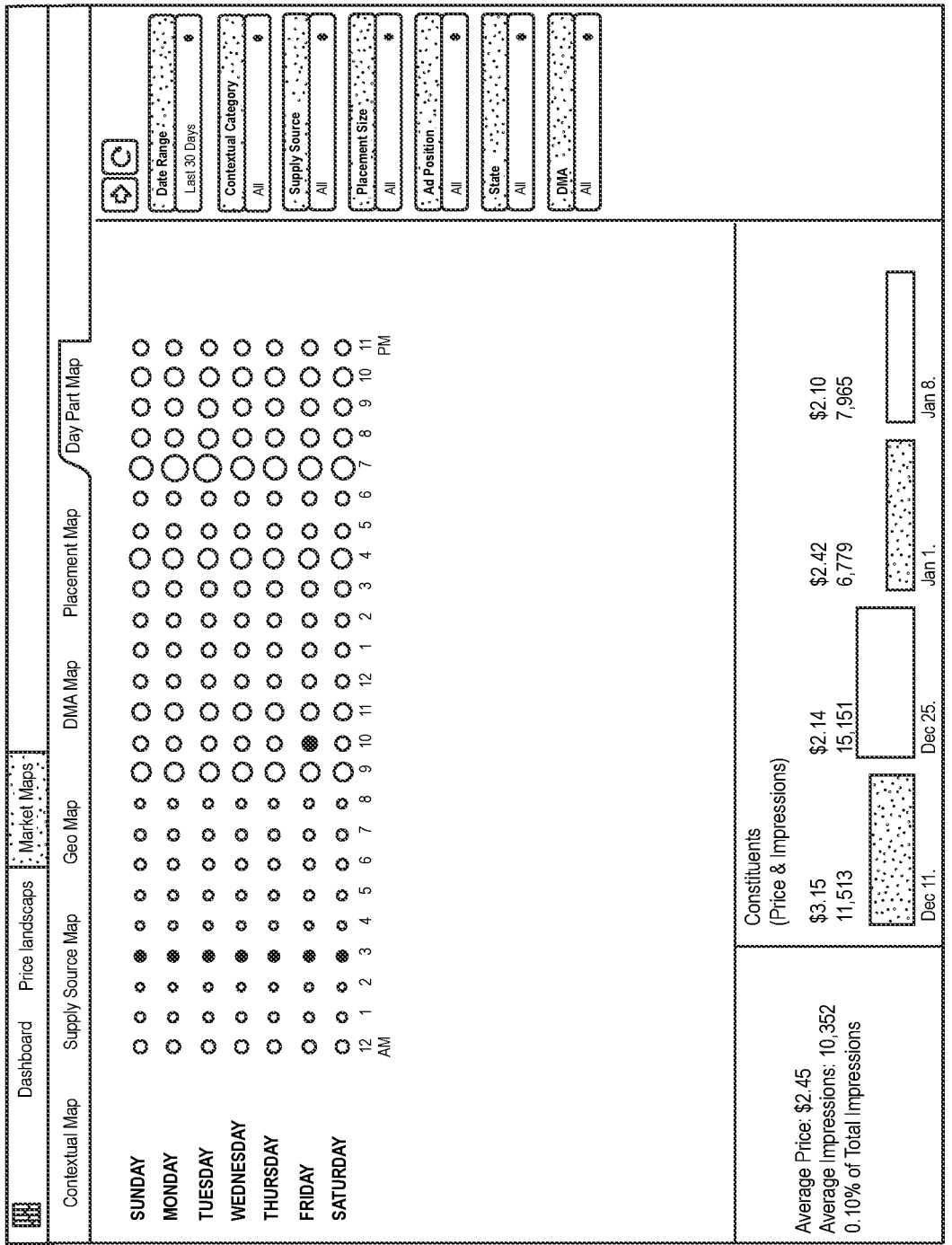
Figure 5I:
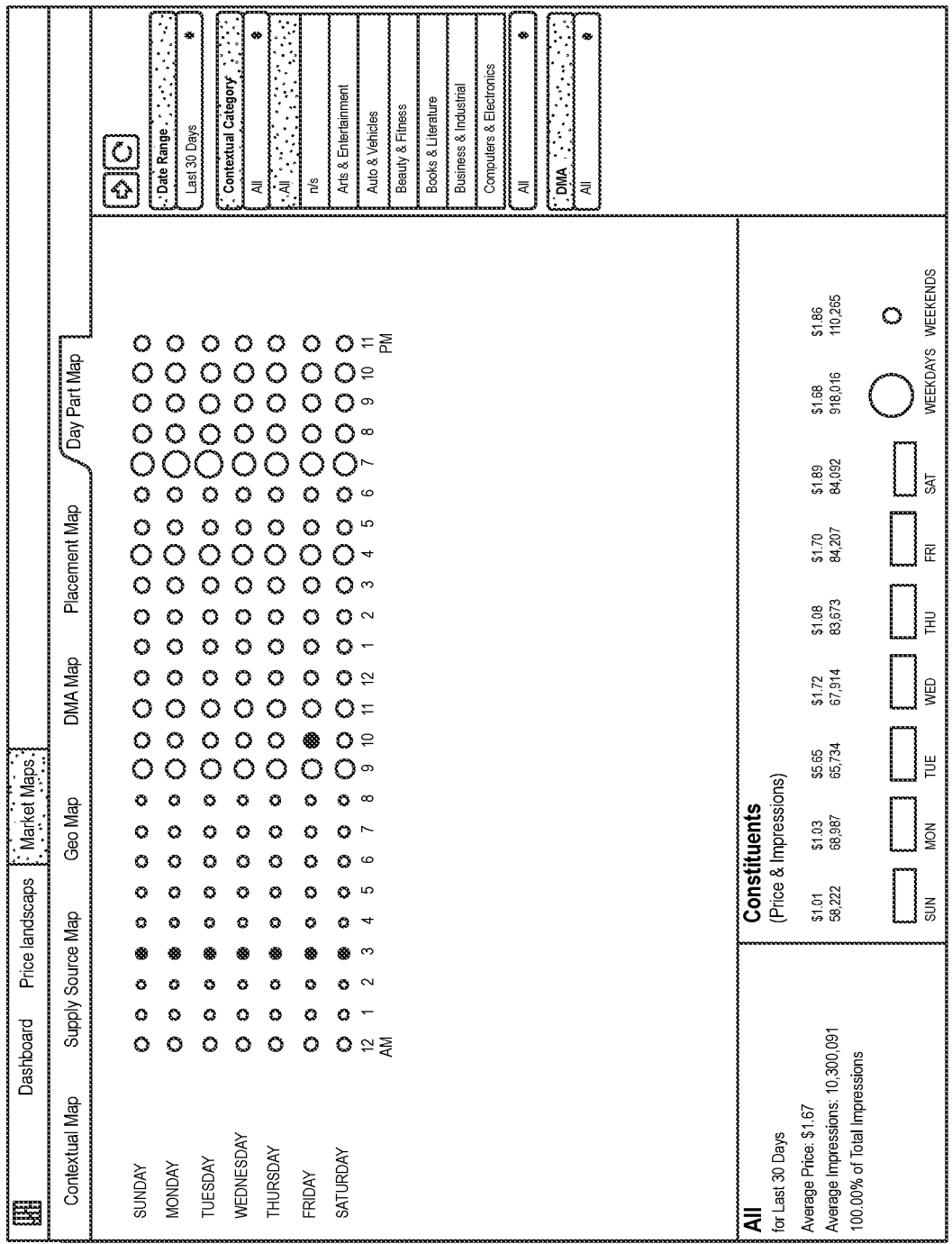
Figure 5J:
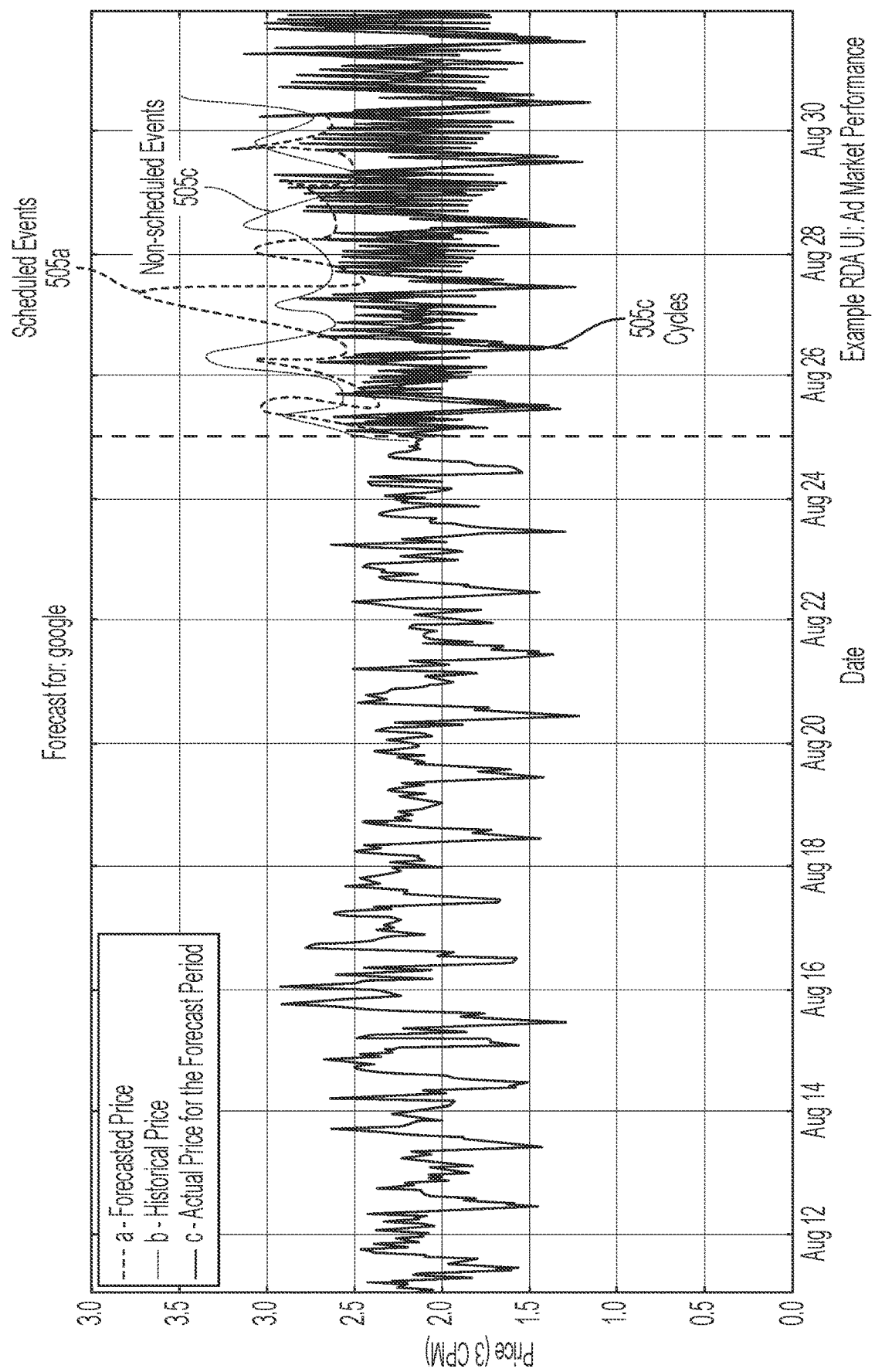
Figure 5K:
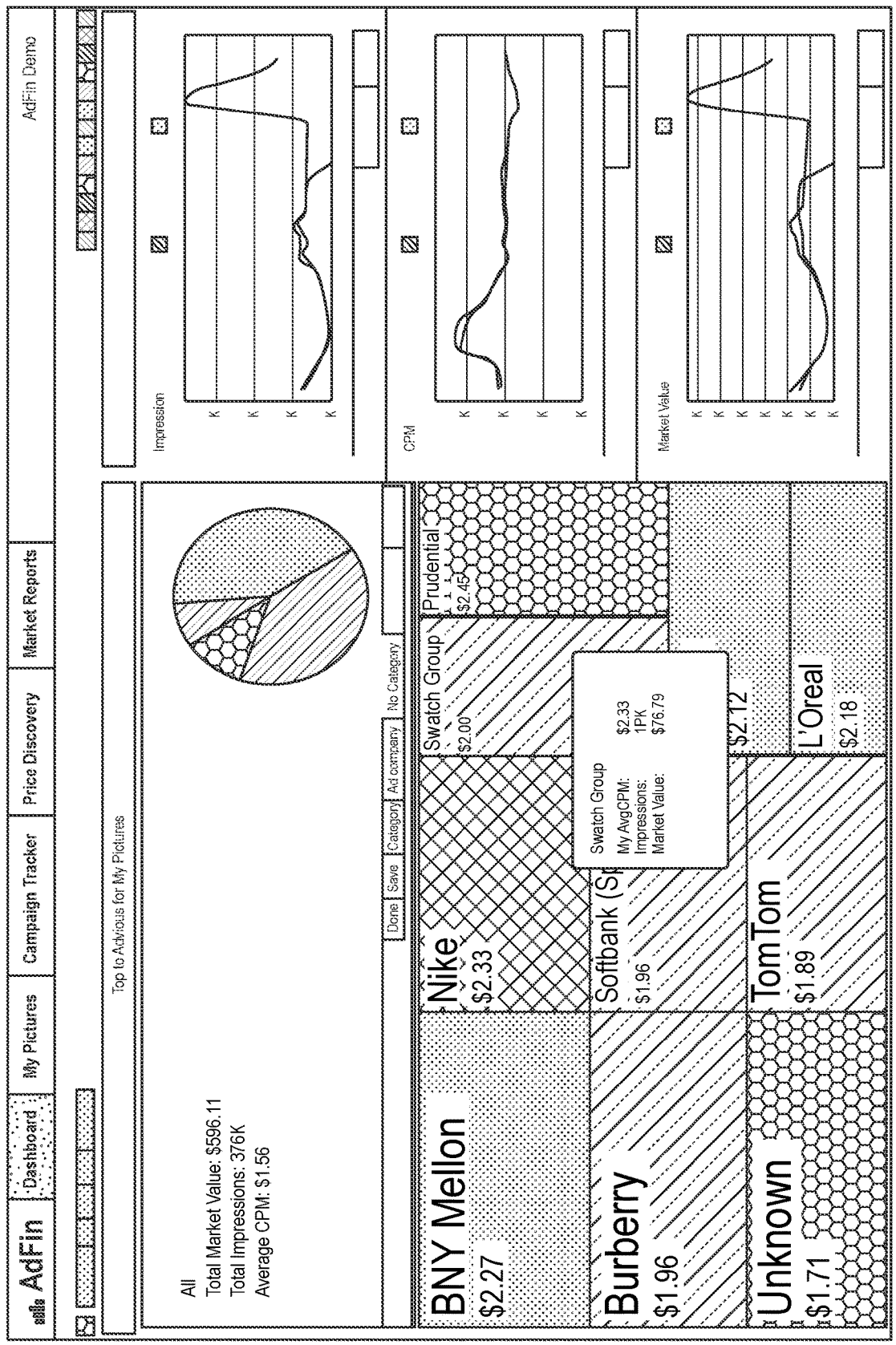
Figure 5L:
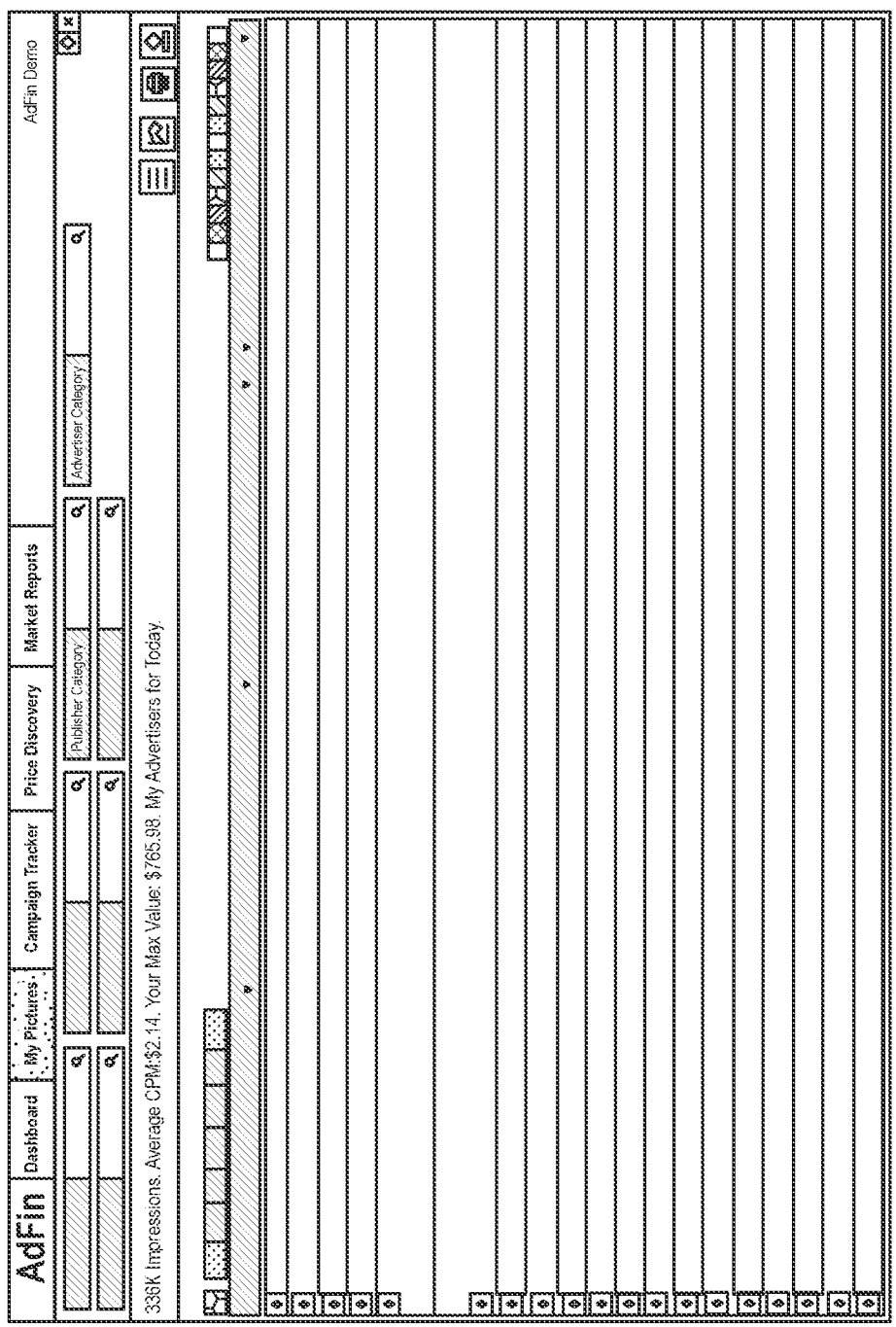
Figure 5L:
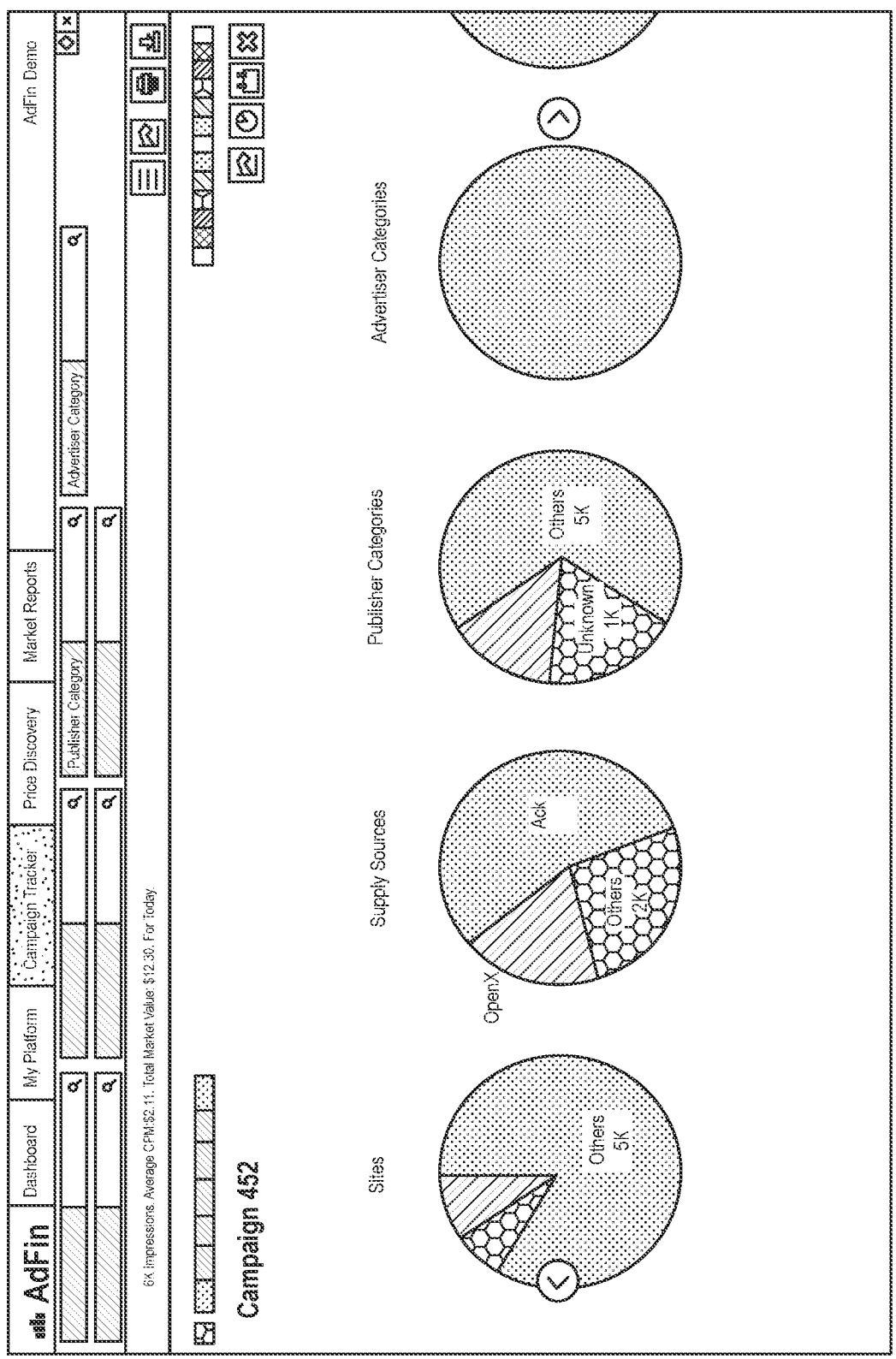
Figure 5L:
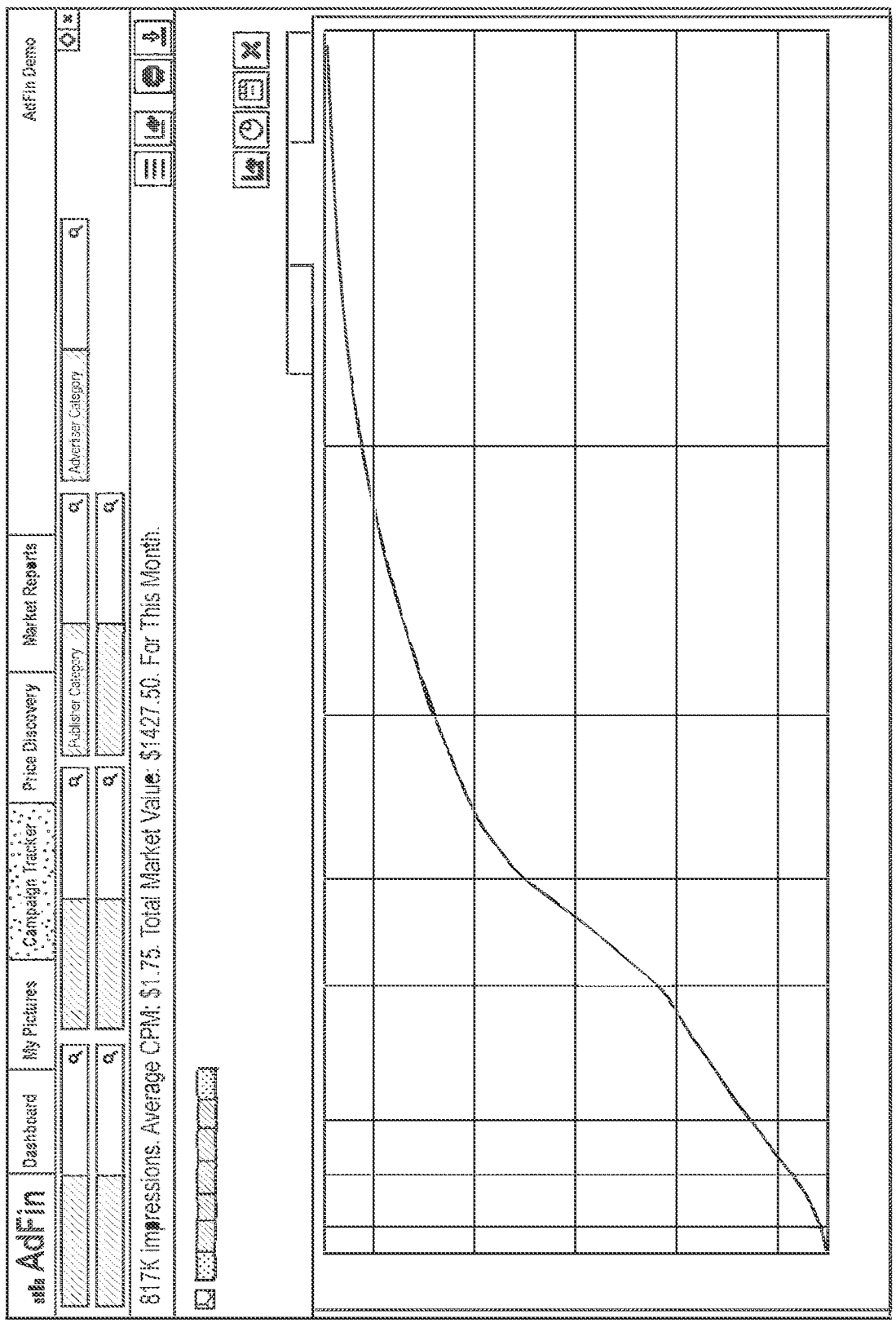
Figure 5M:
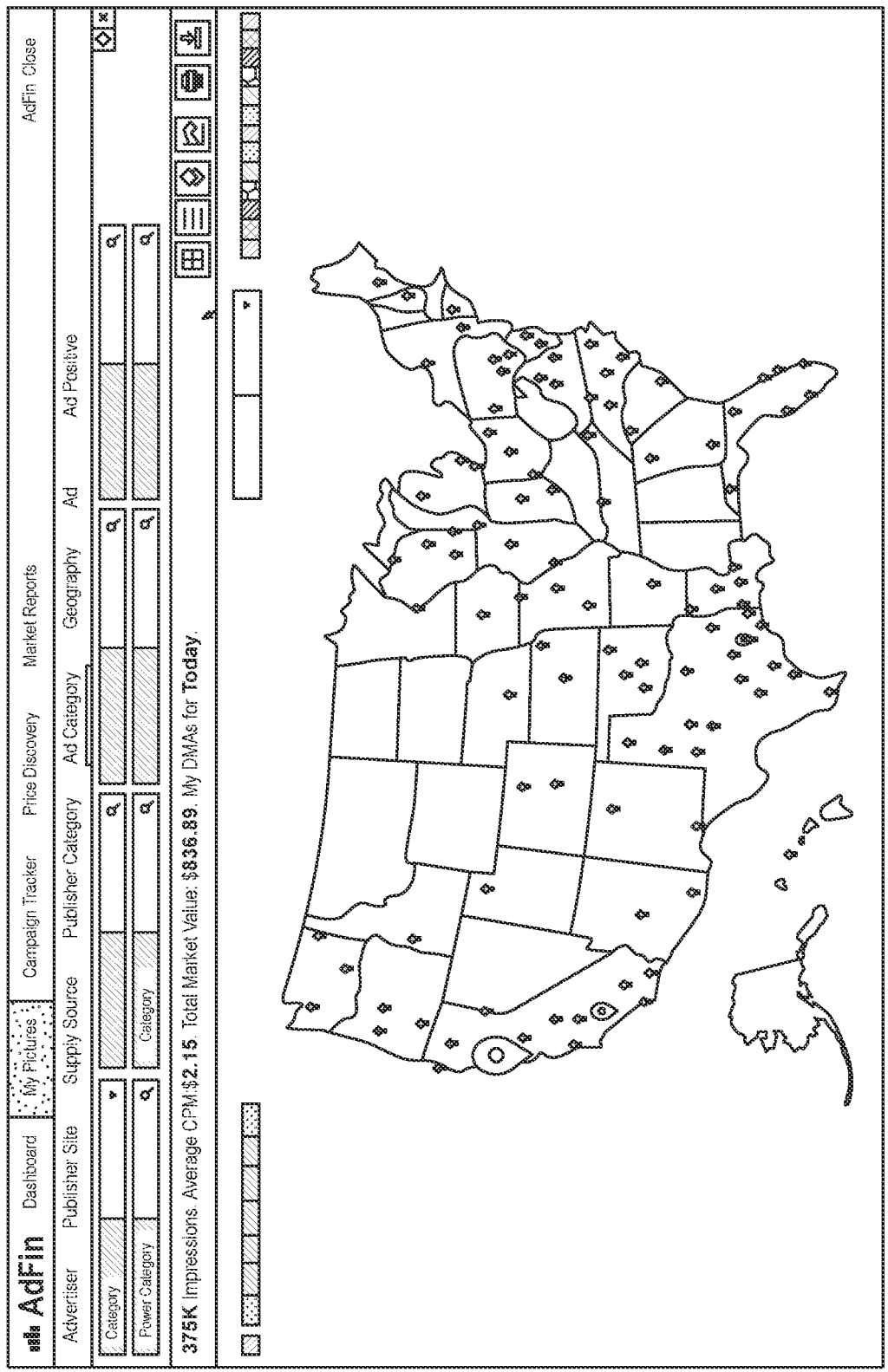
Figure 5N:
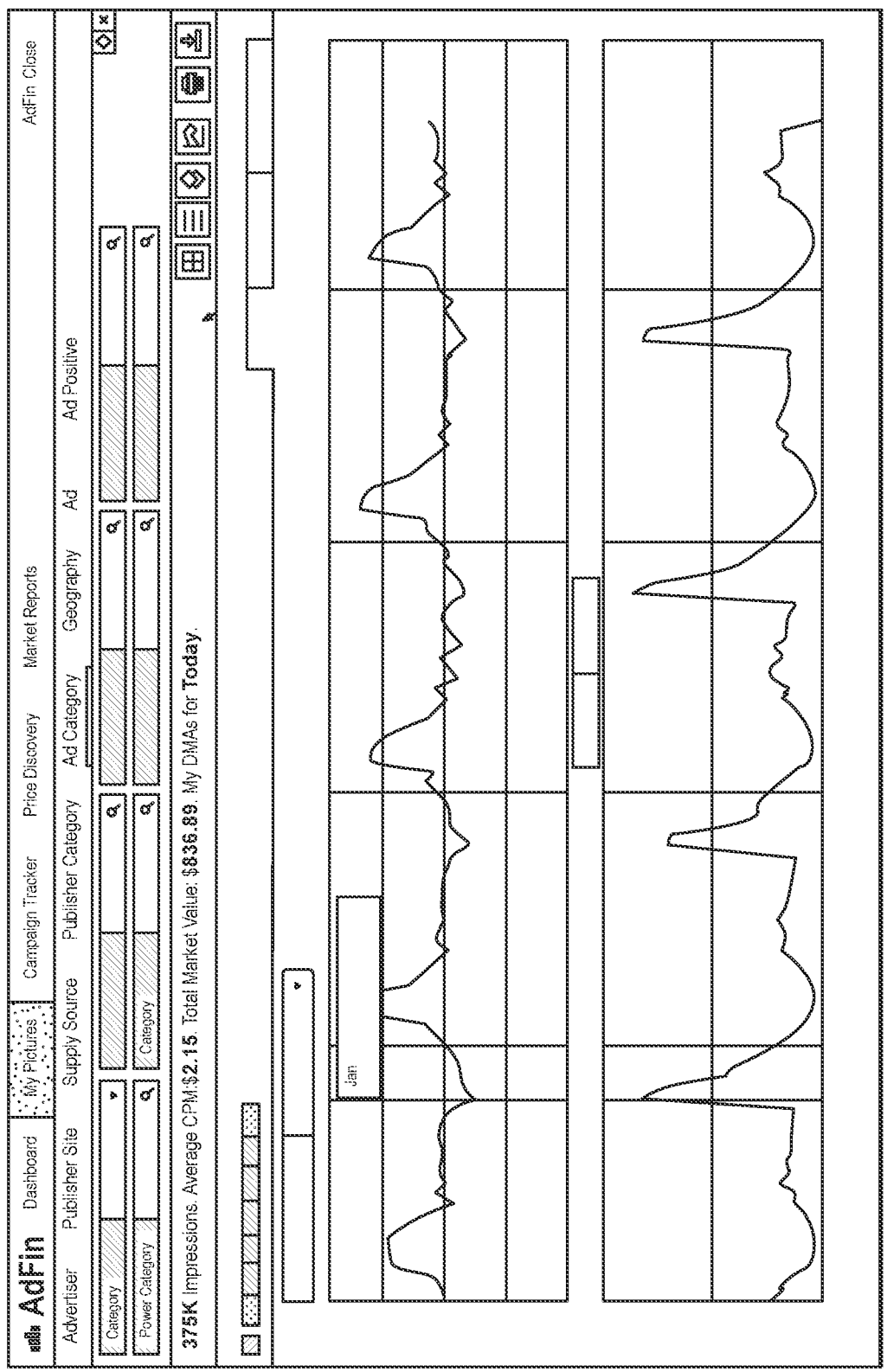
Figure 50I:
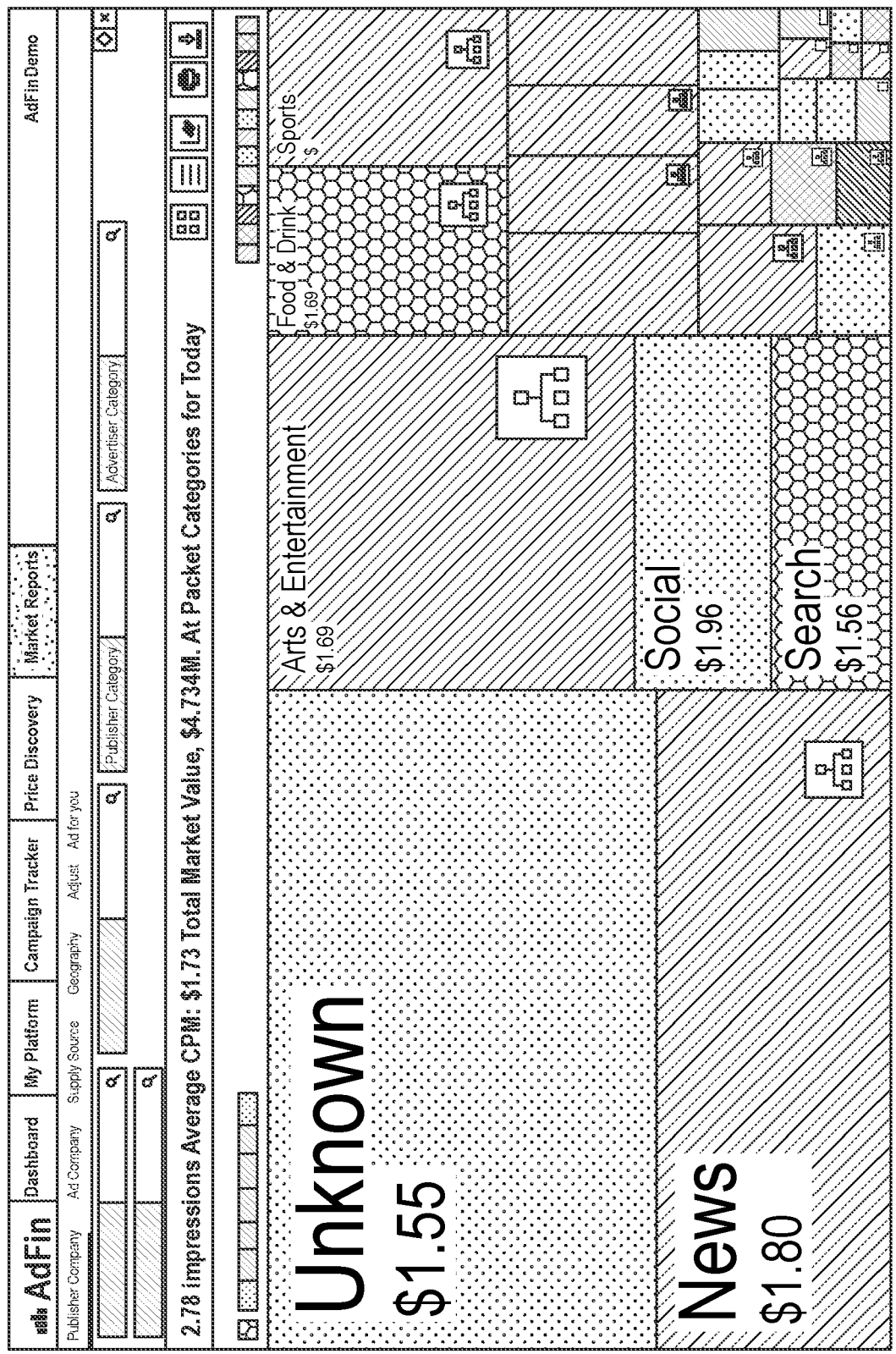
Figure 50I:
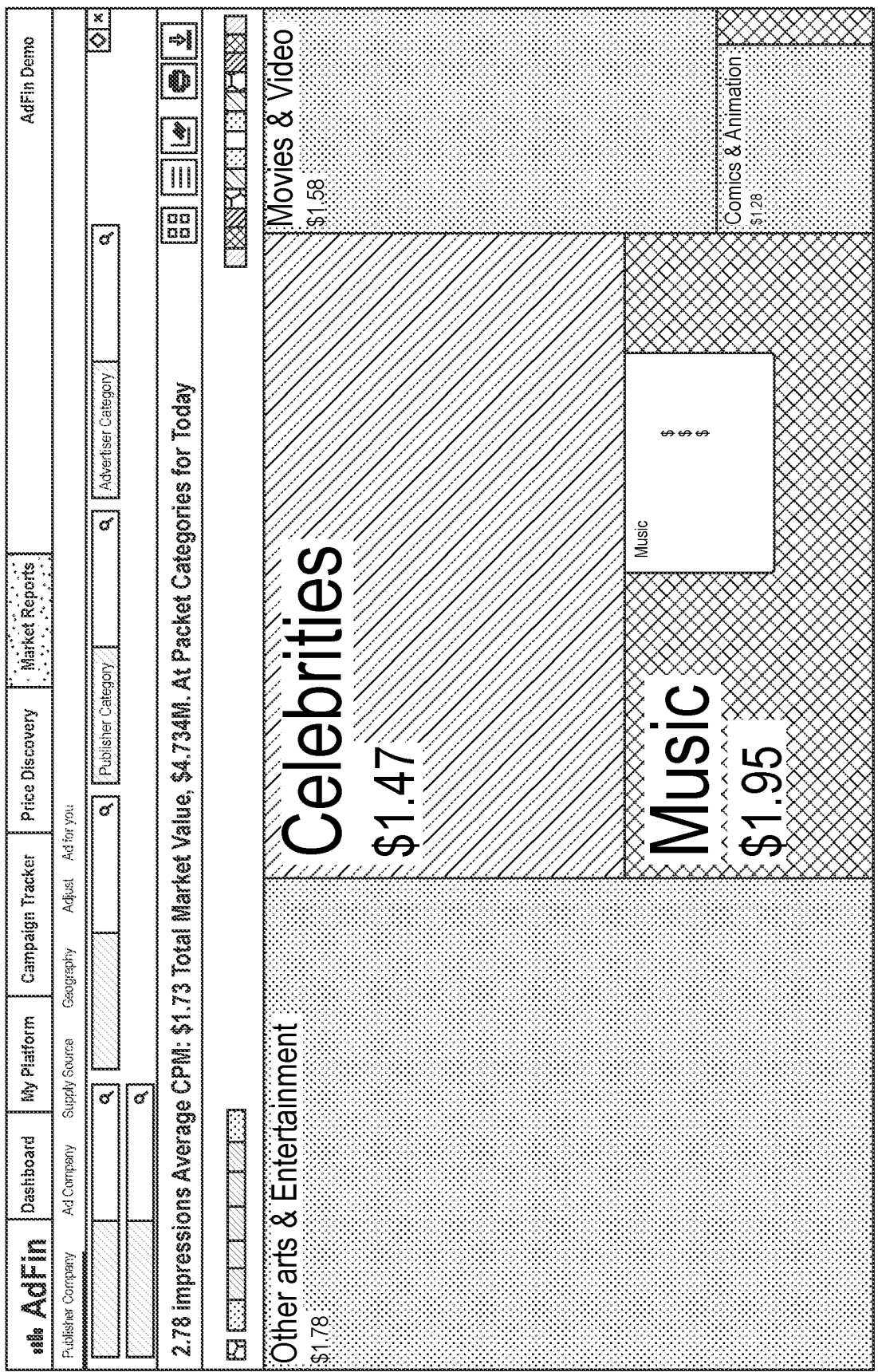
Figure 50I:
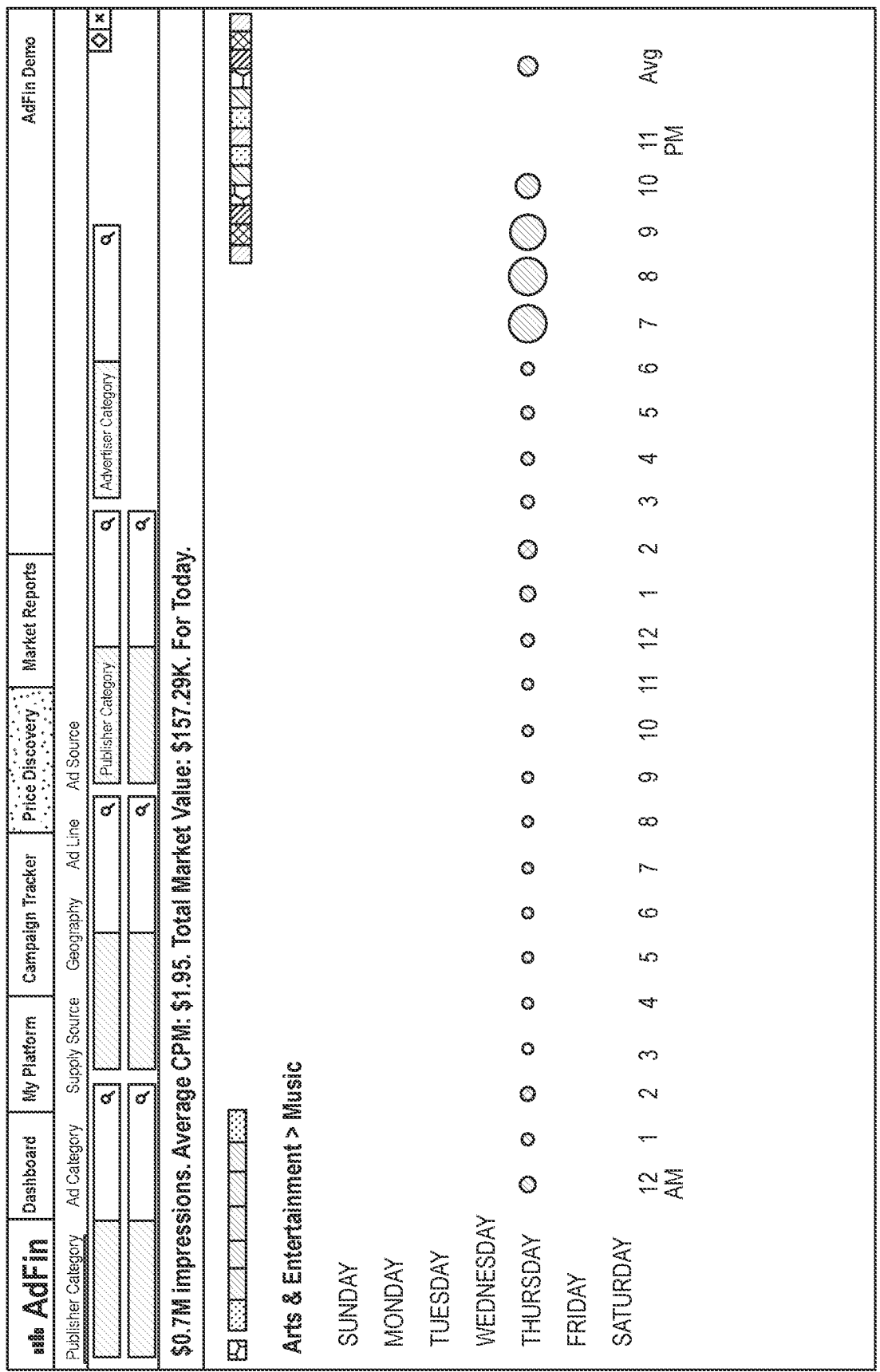
Figure 5O:
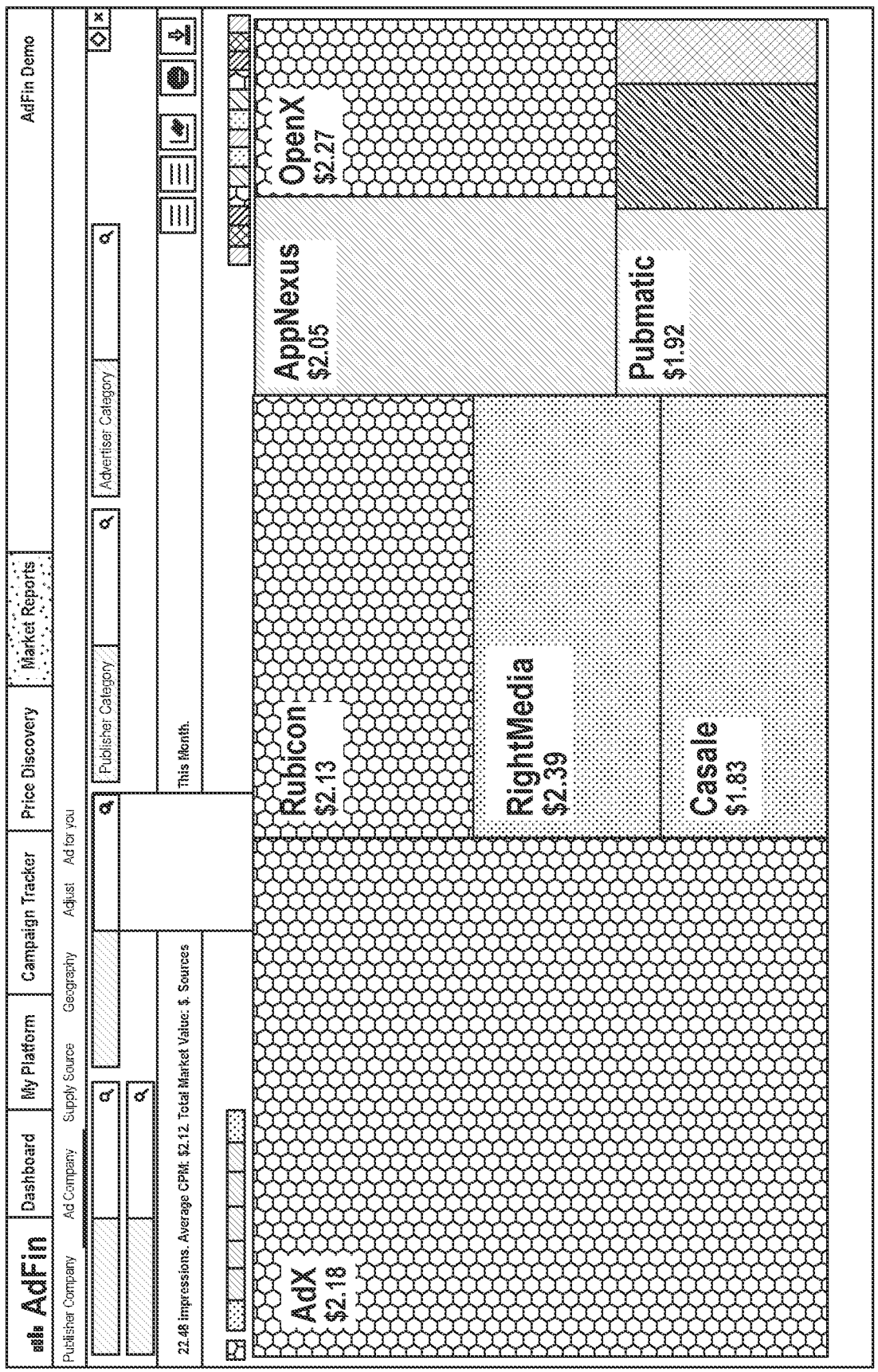
Figure 5:
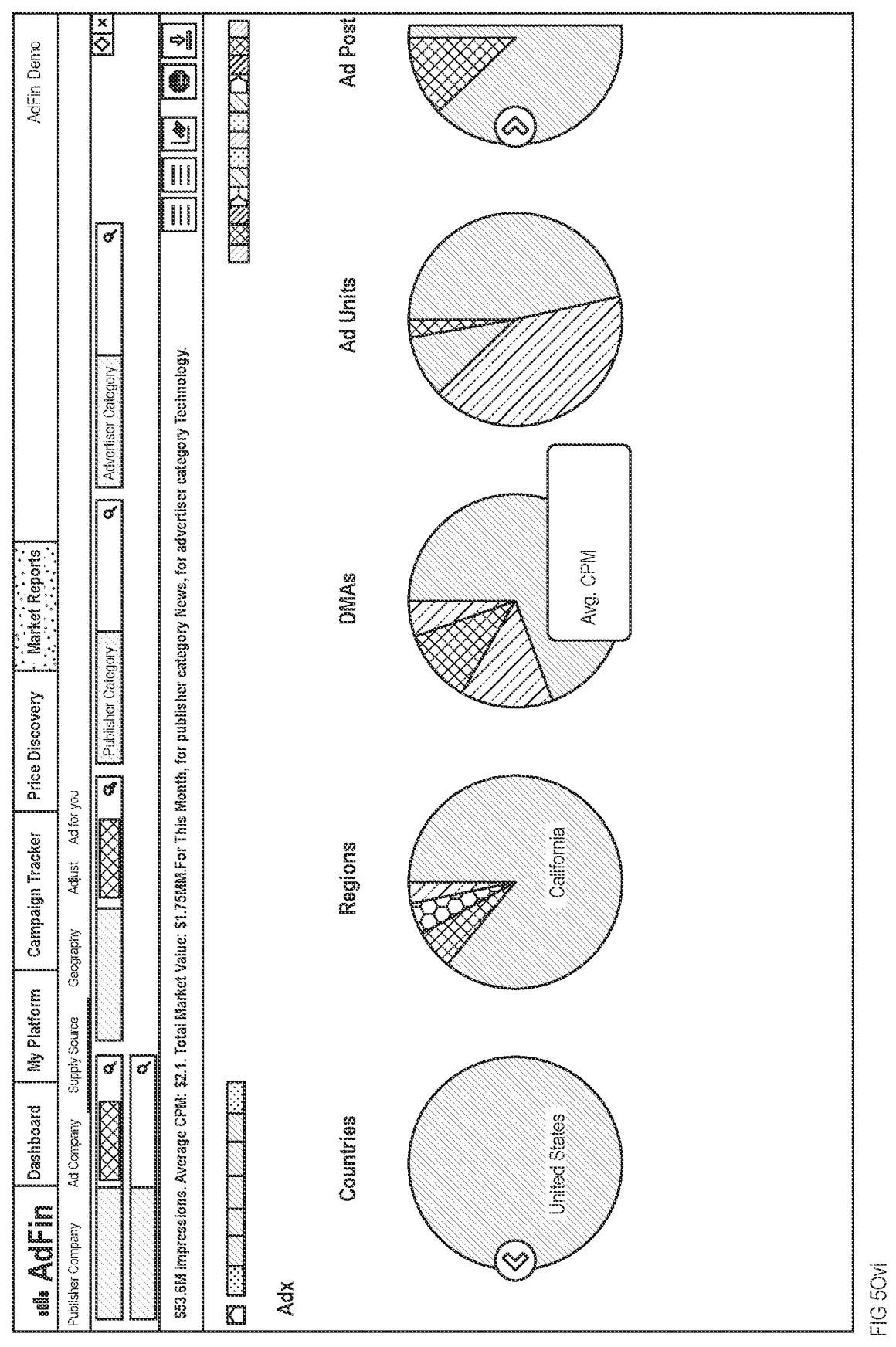

FIGS. 5A-5O provide exemplary UI diagrams illustrating client component UIs of the RDA within some embodiments. With reference to FIG. 5A, the RDA may provide a "dashboard" page for a user showing prices and impressions of ads for a period of time (e.g., past 7 days). FIG. 5B provides a detailed pricing plot based on user-specified parameters such as, but not limited to: date range, contextual category, supply source, placement size, ad position, states, DMA, and/or the like. FIG. 5C provides a categorized view of exemplary ad prices and volumes for different industries, e.g., arts/entertainment, culture, news, etc. FIG. 5D provides a categorized view of exemplary ad prices and volumes for different supply sources, e.g., AdEx, Rubicon, OpenX, PulsePoint, AdMeld, etc. FIG. 5E provides a categorized view of exemplary ad prices and volumes for different geo-locations, e.g., segmented by different states, etc. FIG. 5F provides a map view of exemplary ad prices and volume distribution on a demographic map. FIG. 5G provides exemplary ad pricing and volume data for different placement sizes, e.g., 728 by 90, 300 by 250, etc. FIGS. 5H-5I provide a 'daily view' of exemplary ad prices and volumes on different days of the week.

FIG. 5J provides an exemplary plot for ad price forecasting within embodiments of the RDA. In one implementation, the forecasting may be generated based on historical ad rates evolution patterns. For example, the RDA may predict ad pricing rates based on scheduled 505$a$ and/or non-scheduled events 505$b$ exceptions (e.g., each September fall semester starts, holidays, events such as Olympics, World Cups, election, celebrity news, etc.), e.g., pricing evolution may follow similar patterns with respect to similar events. The RDA may further incorporate atmospherics, weather, events, and/or similar patterns (e.g., scheduled events 505$a$, non-scheduled events 505$b$, cycles 505$c$) to forecast ad pricing.

With reference to FIG. 5Ki, in some implementations, the RDA may provide a "dashboard" showing the top several advertisers buying on the platform (e.g., top 10, etc), along with a summary data of the purchases of the advertisers and also a breakdown for each advertiser shown. For example, as shown in FIG. 5Kii, the breakdown data may comprise the top publisher sites the advertisers are buying on, geographic regions, categories for the advertisers, and/or the like. Furthermore, the RDA may provide details for one or more impressions and/or sets of impressions. With reference to FIG. 5Kiii, in some implementations, the RDA may allow for time tracking of purchases made via the platform. For example, purchases from different time periods (e.g., day to day, week to week, etc) may be compared, and the dashboard may display comparison information graphically. Similarly, the RDA may allow tracking of one or more market indices, as shown in FIG. 5Kiv.

With reference to FIG. 5Li, in some implementations, the RDA may allow users on the buy side, such as but not limited to DSPs, agencies, and/or the like to track their campaigns across their purchases (e.g., "buys") and/or any number of dimensions coming from their log files (e.g., publisher sites, supply sources, publisher categories, geographic regions, ad unit positions, etc). For example, each user may be able to track, for each of their campaigns, data relating to impressions (e.g., count), average CPMs, market values of what's being bought on the campaigns, etc. For example, the RDA may provide details on time series, price distributions and volume distributions of what is being bought, as shown in FIGS. 5Lii, 5Liii and 5Liv, respectively. Further, with reference to FIG. 5Lv, the RDA may allow tracking, for each campaign of an advertiser, a breakdown of different dimensions of the transactions such as sites on which advertising space was purchased, supply sources the purchases were made through, publisher categories, time-based aspects of the campaign (e.g., whether ads run hourly, daily, etc.), and/or the like.

With reference to FIG. 5Lvi, in some implementations, the RDA may allow comparison of prices with regards to the campaigns. For example, for an advertiser with multiple campaigns, the advertiser may be able to compare, in a time-series, the pricing of the campaigns. Further, as shown in FIG. 5Lvii, the RDA may display the average CPM baselined against the total CPM for the user's platform and the impressions. Similarly, the RDA may display price distributions baselined against that of the entire platform of the user. In some examples, the price distributions of different campaigns may track closely, as shown in FIG. 5Lviii, and a similar situation may arise for volume distributions. With reference to FIG. 5Lix, in some implementations, the RDA may provide a similar analysis showing how well campaigns track each other based on time series. For example, the CPMs may be compared for the different campaigns based on time. For example, it may show that campaigns may group into different sets that track intra-set, but the sets may not track with each other. This may allow the users to draw conclusions about the campaign and their relationships, for example. With reference to FIGS. 5Lx and 5Lxi, in some implementations, the RDA may allow the tracking, for each advertiser, of distributions across campaigns, publisher sites, supply sources, publisher categories, advertiser categories, geographic regions, ad units positions, etc), time behaviors, and/or the like.

With reference to FIG. 5Mi, in some implementations, the RDA may display in user's platform data on dimensions such as advertiser dimensions, publisher sites, supply sources, publisher categories, ad categories, geography, ad units, ad positions and/or the like. For example, the display may summarize in a heat map several data on advertisers purchases such as the sizes of the buys (e.g., size of the boxes may correspond to purchase size, etc), pricing they are paying for the ads (e.g., based on a color map, etc), and/or the like. In some implementations, the RDA may allow searching based on these parameters (for e.g., search for those with red pricing (i.e., below the average pricing, etc)"). With reference to FIG. 5Mii, in some implementations, the RDA may provide for each advertiser detailed data on, for example, the time series of what they are buying, the price distributions, volume distributions, and/or the like. In some implementations, such data may also be viewed by publisher sites, supply sources, etc. Similarly, such data may be viewed for different dimensions (e.g., advertisers, publishers' sites, etc.). As an example, FIGS. 5Miii-v display data such as pricings, impressions, market value, etc., for different geographic locations (e.g., countries, states, cities, etc.). Similar reports may be obtained for other dimensions such as ad units, ad positions, etc.

With reference to FIG. 5Ni, in some implementations, the RDA may provide a display of pricings based on time series (e.g., average CPM, market values, averages across entire platform, etc), price distributions (e.g., impression per price buckets (e.g., 60% impressions are $2 or less, etc), volume distributions (e.g., largest bucket at $1.30-$1.50 representing 10% of impressions, etc.), and/or the like. Such analysis on the pricing may also be performed based on dimensions (e.g., publisher sites, etc.), as shown in FIG. 5Nii. Similarly, the analysis may be performed in a time series, as well as by taking running averages. For example, FIG. 5Niii shows a day parting, i.e., a breakdown of programming, impressions, instantiations, etc., for example, by day and time.

With reference to FIG. 5Oi, in some implementations, the RDA may provide market reports that allow users of the platform to view pricing and volume data across the entire market as aggregated by marketing index. For example, the aggregating may be by publishers' category, rather than specific publishers. For example, RDA's taxonomy may group together different websites and correlate them to advertisers across different channels such as mobile, video, and/or the like. In some implementations, for each taxonomy group or category, the RDA may provide data such as average CPM, impressions, market value of the user baselined against that of the platform. Such analysis may also be done for sub-categories (e.g., celebrities, music, etc), as shown in FIG. 5Oii. With reference to FIG. 5Oiii, in some implementations, for these categories the data may be provided in a time series, for price distributions and volume distributions as described above. For example, such market reports for categories may also be displayed for "day-parts," for example, times and dates, as shown in FIG. 5Oiv. Similarly, the market reports analysis for categories may also be done by dimensions such as publisher categories, advertiser categories, geography, and/or the like, as shown in FIGS. 5Ov and 5Ovi.

FIG. 6A provides an exemplary RDA data hierarchy diagram illustrating how a named entity may, in some embodiments, provide raw data which may be classified and/or broken down into smaller data subsets according to metadata (e.g., schema, data source, time information) as well as according to segments, with each segment characterized by one or more attributes such as start time, length of time/duration, time zone, resolution, ID, physical dimensions, and/or the like). Metadata may be used, according to some embodiments of the RDA, by a router in order to break a query into multiple parts (e.g., one part per segment), and such query decomposition may occur in parallel with other functions of the RDA. Data segments may be stored by the RDA within one or more databases, which may be distributed, relational, time series, etc., in some embodiments using SQL or similar language, JSON, S-Expressions, and/or the like. The data segments may be stored in segments up to a fixed size (e.g., 250 MB or 1 GB). In some embodiments, the data may be stored in tables, which may include a timestamp column, as well as one or more 'search' columns and one or more 'value' columns (e.g., as shown in FIG. 6B). Search columns may include attributes such as time, size of the advertisement (e.g., physical size, pixel count, duration, etc.) domain advertiser, and/or the like, and may contain metric data as well as non-numerical data. Value data may include data intended for numerical aggregation, or may be fully aggregated for each segment within the table, and may include attributes such as volume, price (total), clicks, and/or the like. Tabulated segment data may be stored and sorted, e.g., first by time and search columns, then by value columns. In some embodiments, the data within each segment's columns may be stored independently, and packed and/or compressed.

FIG. 7 provides an exemplary overview of a data import process according to some embodiments of the RDA. The RDA may receive, at 701, batch data (e.g., datalogs) from a data source, such as a third-party provider of such data, and may subject such batch data to a map process whereby the data is mapped, e.g., at 702, according to attributes such as those discussed above with regard to schema, segments, and/or the like, and is aggregated at 703, for example such that value information is summed or otherwise consolidated within a given data segment. The resulting segmented data may then be output, e.g., at 704, to RDA database 719 where it is subsequently (and, in many embodiments, iteratively) optimized (e.g., at 710), for example by combining segments which are relatively small into larger segments where efficiency may be gained and/or better compression may be achieved. The RDA may also receive, e.g., at 705, a real-time stream of data which is buffered at 706, aggregated at 707, and in some embodiments further buffered at 708. As described above with regard to 704, the resulting reorganized and/or segmented data may then be transmitted, e.g., at 709, to RDA database 719 for optimization (e.g., at 710). Depending on the embodiment, recently imported data may be reoptimized on a continuous or near-continuous basis.

FIG. 8 shows an exemplary block diagram depicting exemplary query processing according to some embodiments of the RDA, whereby an incoming user query is broken up by a router according to one or more data segment(s) (e.g., one query per segment). Each sub-query is sent to a separate 'node' (where each node runs both a segment processor, e.g., for queries, as well as a router, e.g., for coordinating the query processing) for computation of the query results for each corresponding segment, e.g., on a segment processor. The node results are then sent to, and re-aggregated by, the router and delivered as a response to the querying user. An overview diagram of an exemplary networked cluster configuration, including routers, nodes, and a network file system, is provided in FIG. 9.

FIG. 10 provides a diagram depicting a cluster load balancing scheme employed by some embodiments of the RDA. In some embodiments, segments processed by the RDA have random 256-byte names. In order to achieve cluster load balancing, each node has multiple prefixes available/assigned to it, which may distributed on a circle. The hash function used for the prefixes may be generated based on the host/port combination, e.g., of a particular query, thereby resulting in consistent hashing. Clients interacting with the cluster may connect to a random node, and that node's router may then coordinate the processing of the query.

FIG. 11 provides an exemplary flow diagram depicting segment processing according to some embodiments of the RDA. Upon receipt/inputting of a router segment query (e.g., for one segment) at 1101, the RDA may, e.g., at 1102, check its segment query cache 1103, for example to save time by determining whether the same query has previously been performed, and/or to eliminate the need for duplicating data retrieval efforts when needed data is already stored in the cache. If a query response is immediately available within the cache, the query response may then immediately be returned to the router/requestor. If the cache cannot provide an immediate result, the RDA may create a plan for executing the query, e.g., at 1104, and subsequently execute the query (e.g., at 1105), for example by fetching columns at 1106 from the network file system, and storing them at 1107 in page cache memory, and/or in a local SSD cache at 1108. Once the query has been executed, query response 1109 is returned/output.

FIG. 12 provides an exemplary data flow diagram illustrating the purchase of future advertisements and/or ad futures, according to some embodiments of the RDA. By way of non-limiting example, an advertiser 1201 may, e.g., at 1202, indicate to the RDA Server 1210 a request to place an ad at a future date. The future ad request message 1202 may include information relevant to the determination of pricing and/or availability of the ad, such as the type, amount, duration, etc., of the ad (e.g., a banner ad for "Coca-Cola" during a soccer tournament on ESPN in May, etc.). An example listing of a future ad request 1202 to the RDA Server 1210, substantially in the form of a HTTP(S) POST message including XML-formatted data, is provided below:

```
POST /future_ad_request.php HTTP/1.1
Host: 192.168.23.126
Content-Type: Application/XML
Content-Length: 867
<?XML version = "1.0" encoding = "UTF-8"?>
<future_ad_request>
    <session_id> 4SDASDCHUF ˆGD& </session_id>
    <timestamp>2014-02-22 15:22:43</timestamp>
    <agent_id> AI001 </agent_id>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <login_id> Coca-Cola Brands </login_id>
    <password> XXfizz_popXXX </password>
    <status> valid </status>
    <future_ad>
        <ad_attribute_1> pop-up video ad </ad_attribute_1>
        <ad_attribute_2> 30 seconds </ad_attribute_2>
        <ad_attribute_3> ESPN website </ad_attribute_3>
        <ad_attribute_4> 720 x 300 </ad_attribute_4>
        ...
    </future_ad>
    ...
</future_ad_request>
```

The RDA Server may then poll speculative investors, e.g., at 1203, to determine their interest in trading futures for the requested advertisement, and receive a response 1206 (e.g., indicating the level of interest, available terms, etc.). The RDA may also forward the future ad request, e.g., at 1204, to one or more ad agencies 1215, which may in turn provide a response 1207 indicating the availability, pricing, and/or similar information with regard to the specified future advertisement. The RDA Server 1210 may then, at 1209, determine/compile a quote for the future ad, which it may provide to advertiser 1201, e.g., at 1211. An example listing of a futures quote 1211 sent to Advertiser 1201, substantially in the form of a HTTP(S) POST message including XML-formatted data, is provided below:

```
POST /future_quote.php HTTP/1.1
Host: www.RDA.com
Content-Type: Application/XML
Content-Length: 867
<?XML version = "1.0" encoding = "UTF-8"?>
<future_ad_quote_detail>
    <session_id> server_4SDASDCHUF ˆGD& </session_id>
    <timestamp>2014-02-22 18:22:43</timestamp>
    ...
    <recipient_id> RDA001 </recipient_id>
```

-continued

```
    <Option_1>
        <ad_price> $1,790 </ad_price>
        <redemption_date> 2014/05/01 </redemption_date>
        <ad_run_period>
            <start> 2014/05/01, 0800 EST </start>
            <end> 2014/05/01, 1130 EST </end>
        </ad_run_period>
        <ad_attribute_1> http://www.nytimes.com </ad_attribute_1>
        <ad_attribute_2> Section 2, Cover </ad_attribute_2>
        <ad_attribute_2> Upper Lefthand Corner of Page </ad_attribute_2>
        ...
        <ad_attribute_n> Interactive </ad_attribute_n>
        <ad_size>740 x 1240</ad_size>
        ...
    </Option_1>
    <Option_2>
        <ad_price> $8,490 </ad_price>
        <redemption_date> 2014/05/01 </redemption_date>
        <ad_run_period>
            <start> 2014/05/01, 1300 EST </start>
            <end> 2014/05/01, 1630 EST </end>
        </ad_run_period>
        <ad_attribute_1> http://www.espn.com </ad_attribute_1>
        <ad_attribute_2> Splash Page </ad_attribute_2>
        <ad_attribute_2> Banner at Page Bottom </ad_attribute_2>
        ...
        <ad_attribute_n> During Super Bowl Pregame </ad_attribute_n>
        <ad_size>740 x 1240</ad_size>
        ...
    </Option_2>
    ...
</future_ad_quote_detail>
```

The advertiser then selects and submits, via order submission 1213, the desired order at 1212 from among the options provided in the quote, and may optionally include account authorization therewith (e.g., for payment). At 1214, the RDA Server 1210 generates an obligation, and at 1216 may send an acknowledgment of a trade (i.e., an agreement to the obligation to provide the requested advertisement at a specified future time) to one or more speculators 1223. An example acknowledgment of the obligation at 1216 sent to speculators 1223, substantially in the form of a HTTP(S) POST message including XML-formatted data, is provided below:

```
POST /obligation_confirm.php HTTP/1.1
Host: www.RDA.com
Content-Type: Application/XML
Content-Length: 867
<?XML version = "1.0" encoding = "UTF-8"?>
<futures_contract_detail>
    <session_id> server_4SDASDCHUF ˆGD& </session_id>
    <timestamp>2014-02-22 19:01:43</timestamp>
        <contract_party_1>ABC Advertisers<contract_party_1>
        <contract_party_2>Speculator 1635<contract_party_2>
        <contract_price> $8,490 </contract_price>
        <redemption_date> 2014/05/01 </redemption_date>
        <ad_run_period>
            <start> 2014/05/01, 1300 EST </start>
            <end> 2014/05/01, 1630 EST </end>
        </ad_run_period>
        <ad_attribute_1> http://www.espn.com </ad_attribute_1>
        <ad_attribute_2> Splash Page </ad_attribute_2>
        <ad_attribute_2> Banner at Page Bottom </ad_attribute_2>
        ...
        <ad_attribute_n> During Super Bowl Pregame </ad_attribute_n>
        <ad_size>740 x 1240</ad_size>
        ...
</futures_contract_detail>
```

Once Advertiser 1201 redeems the future (e.g., at 1217), redemption request 1218 may be sent to RDA Server 1210 and, if necessary, forwarded at 1220 to one or more contracted speculators 1223. An example acknowledgment of the redemption request 1218, substantially in the form of a HTTP(S) POST message including XML-formatted data, is provided below:

```
POST /request_redemption.php HTTP/1.1
Host: www.RDA.com
Content-Type: Application/XML
Content-Length: 867
<?XML version = "1.0" encoding = "UTF-8"?>
  <request_redemption_detail>
    <session_id> server_6GUWQTCHUF ˆGD& </session_id>
    <redeeming_party>ABC Advertisers</redeeming_party>
    <timestamp>2014-02-22 19:01:43</timestamp>
      <contract_number> 56412A4 </contract_number>
      <contract_type>Futures Contract</contract_type>
      <updated_content>
        <ad_content_change>Coca-Cola Promo
        II</ad_content_change>
        <ad_run_period>
          <start> 2014/05/01, 1300 EST </start>
          <end> 2014/05/01, 1620 EST </end>
        </ad_run_period>
      </updated_content>
      ...
  </request_redemption_detail>
```

A request for fulfillment of the advertisement may then be sent to one or more Ad Agencies 1215 by the RDA Server (e.g., at 1224), and/or by one or more speculators, e.g., at 1221. The Ad Agency 1215 may then, at 1222, instantiate the ad. In one embodiment, there may be a corporate formation, e.g., by contract, formed around the obligation (i.e., the obligation may become 'incorporated') such that the obligation may be offered in an initial public offering (IPO) and subsequently traded in the open market. Such obligations may, for example, be listed in a public forum so that they are tradeable by a broad audience of potential investors (e.g., providing an incentive for current obligation holders to further trade their holdings, etc.).

FIG. 12A provides an example logic flow illustrating the determination of future quotes and the generation of related obligations, according to some embodiments of the RDA. An Advertiser 1201 may, for example, submits a request for a future ad at 1202 (as discussed above with reference to FIG. 12), for example specifying the type of ad, when the ad will be run, format, venue, expected content, and/or the like. The RDA Server 1210 may receive the Future Ad Request at 1225 and, in turn, send a request at 1226 to speculator(s) 1223 for bids on futures contracts which satisfy, at least in part, the terms specified by Advertiser 1201 in their request 1202. Upon the speculator(s)' receipt at 1227 of the request, speculator(s) 1223 may then determine at 1228 a level or amount of demand for entering into a futures contract in accordance with request 1226. Sepculator(s) 1223 may then, e.g., at 1206, send a Futures Poll Response (e.g., including the price(s), terms, modifications to the terms, etc.) back to the RDA Server 1210, which may in turn receive the response at 1206. The RDA Server 1210 may then (or, alternatively, at a point earlier in the process) perform a query of one or more databases, e.g., to determine an available inventory of options for satisfying Advertiser 1201'S Future Ad Request 1202 based on other pending requests which might still be pending (e.g., still being processed by the RDA), available complementary offers which are known to the RDA, and/or the like. The list of available alternatives/options for satisfying Advertiser 1201's Future Ad Request 1202 may, in some embodiments, be refined based upon the results of the querying at 1229 and/or based upon economic parameters internal to the RDA, such as bid/ask spreads, ratios, profit expected from a given transaction, etc. The RDA may, depending on the embodiment, incorporate rules for refining such lists according to threshold values of the aforementioned metrics. The RDA 1210 may then generate the requested futures quote (for example, including a list of options which may specify the transaction type, backing information, underwriter information, terms, modifications to terms (e.g., for cost savings), contract details, constraints, and/or the like) and send it, e.g., at 1231, to Advertiser 1201, who receives it at 1232. Advertiser 1201 may then make an election of one or more of the provided options at 1233, and may submit an "order" for the advertising futures, optionally including an authorization for payment and/or account access, and if applicable, including updated ad content intended for inclusion in the to-be-instantiated ad.

The RDA Server 1210 may receive, at 1234, the request to execute one or more Ad Futures transactions, and based upon the content of the order, may perform (e.g., at 1235) a recalculation of the transaction value. RDA server 1210 may then generate the specified obligation and store one or more journal entries to reflect the details of the transaction, e.g., at 1236. The RDA Server 1210 may, in some embodiments, also form a corporate entity (e.g., at 1237) surrounding the generated obligation such that the obligation becomes "incorporated," and subsequently may be publicly offered (i.e, in an "initial public offering") and traded by investors among the general public, i.e., on the "open market." At 1238, the RDA Server 1210 may send an acknowledgment of the agreement to trade one or more future obligations (i.e., agreements to enter into one or more futures contracts) to one or more speculators 1223, which may receive the acknowledgment at 1239.

It is further contemplated by this disclosure that the individualized, detailed trades described above via exemplary embodiments may collectively (i.e., in aggregate) be employed, in whole or in part, in the creation of indices (i.e., financial index generation) which may be used for purposes of analytics, modeling, prediction of market behaviors, and/or in the creation or derivation of financial instruments.

FIG. 13 provides example data flow diagrams at two different points in time, illustrating an embodiment of the RDA wherein an RDA index fund and future contracts related to that index fund may be used to hedge against investment risk related to a conventionally-purchased asset such as a composite fund. By way of non-limiting example only, an investor 1320 may, at a point in time defined in the figure as "t=0," decide to purchase (e.g., at 1301) 500 shares of a SPDR composite fund, e.g., from a third party brokerage, for $25 per share. An SPDR is an exchange-traded fund that is designed to track the performance of the S&P 500 stock market index. The investor may then receive confirmation of his/her purchase from the brokerage 1305 at 1302. Serially or in parallel, investor 1320 may also purchase (e.g., at 1303) 5 futures contracts (for 100 shares each, for purposes of illustration) of an RDA "Christmas" index fund (e.g., generated across multiple industry segments, and generally formulated to reflect the relative level of ad spend expected by market participants for the upcoming Christmas season) at $3 per contract, taking a long position with a $30 strike price. Investor 1320 may receive confirmation, e.g., at 1304, from RDA Agent 1330 that the sale and/or purchases indicated at 1303 have successfully taken place. At 1305, the RDA may then update one or more transaction ledgers in the RDA Database 1319, and optionally may send a transaction alert (at 1306) to RDA Server 1310, which may then check the RDA database for updates by querying at 1307 and receiving an update response message at 1308. The RDA Server may then at 1310, perform an update on its inventory of derivatives, pricing models for financial instruments, pricing models for advertisements, schedule of transactions to-be-executed, and/or the like. At a later point in time (e.g., at t=December $23^{rd}$, as illustrated in the lower portion of FIG. 13), investor 1320 may observe that the price per share of SPDR has devalued to $23 per share (a decrease in value across the 500 shares of $1,000), and correspondingly that the RDA Christmas index fund valuation has increased to $33 per share (for example, since additional/unanticipated ad spending is driving prices up, in response to the slow Christmas season). When investor 1320 takes delivery of his futures contracts upon their maturity, he will be entitled to purchase 500 shares of the RDA Christmas index fund at $30 per share (e.g., at 1313, with confirmation back from the RDA Agent 1330 at 1314 and similar RDA-side updates at 1315-1319, in similar fashion to 1305-1309 as discussed above) and, optionally, to sell the shares back to the market at the going rate of $33, thereby profiting $1,500 and offsetting the decrease in value of the SPDR fund.

In further implementations, RDA may help clients to optimize media purchase(s). For example, the RDA may obtain optimized buy points from an ad pricing map (e.g., the 'Day Part Map' shown in FIG. 5H) by capturing how much and how to allocate a client's ad budget on a certain day such that the client may achieve an ad campaign goal (e.g., reaching a certain volume of visits, etc.)

Various embodiments of the RDA are contemplated by this disclosure, with the below example embodiments A1-B20 provided to illustrate aspects of some non-limiting implementations of embodiments of the RDA.

A1. A processor-implemented digital asset real-time data aggregating method, comprising: retrieving a dataset of digital asset impression data associated with a plurality of digital assets; generating a histogram mapping digital asset placement sites to digital asset impressions; removing a digital asset placement site from the generated histogram when the digital asset placement site fails to meet a threshold number of impressions; dividing the histogram into a number of segments, each segment representing a type of entity; selecting a candidate digital asset placement site that represents market performance of a market sector; and calculating a digital asset index value using data associated with the selected candidate digital asset placement site.

A2. The method of embodiment A1, wherein the digital asset index value is a price index value, and wherein the data associated with the selected candidate digital asset placement site is pricing data.

A3. The method of embodiment A1, wherein the digital asset index value is a volume index value, and wherein the data associated with the selected candidate digital asset placement site is volume data.

A4. The method of embodiment A1, further comprising: selecting at least one further candidate digital asset placement site, wherein the selected candidate digital asset placement sites collectively represent market performance of a market sector; and assigning a weight to each candidate digital asset placement site; wherein calculating the digital asset index value comprises taking a weighted sum of data associated with the selected candidate digital asset placement sites.

A5. A digital asset real-time data aggregating apparatus, comprising a processor and a memory disposed in communication with the processor and storing processor-executable instructions to: retrieve a dataset of digital asset impression data associated with a plurality of digital assets; generate a histogram mapping digital asset placement sites to digital asset impressions; remove a digital asset placement site from the generated histogram when the digital asset placement site fails to meet a threshold number of impressions; divide the histogram into a number of segments, each segment representing a type of entity; select a candidate digital asset placement site that represents market performance of a market sector; and calculate a digital asset index value using data associated with the selected candidate digital asset placement site.

A6. The apparatus of embodiment A5, wherein the digital asset index value is a price index value, and wherein the data associated with the selected candidate digital asset placement site is pricing data.

A7. The apparatus of embodiment A5, wherein the digital asset index value is a volume index value, and wherein the data associated with the selected candidate digital asset placement site is volume data.

A8. The apparatus of embodiment A5, further comprising instructions to: select at least one further candidate digital asset placement site, wherein the selected candidate digital asset placement sites collectively represent market performance of a market sector; and assign a weight to each candidate digital asset placement site; wherein calculating the digital asset index value comprises taking a weighted sum of data associated with the selected candidate digital asset placement sites.

A9. A processor-readable non-transitory medium storing digital asset real-time data aggregating instructions, the instructions executable by a processor to: retrieve a dataset of digital asset impression data associated with a plurality of digital assets; generate a histogram mapping digital asset placement sites to digital asset impressions; remove a digital asset placement site from the generated histogram when the digital asset placement site fails to meet a threshold number of impressions; divide the histogram into a number of segments, each segment representing a type of entity; select a candidate digital asset placement site that represents market performance of a market sector; and calculate a digital asset index value using data associated with the selected candidate digital asset placement site.

A10. The medium of embodiment A9, wherein the digital asset index value is a price index value, and wherein the data associated with the selected candidate digital asset placement site is pricing data.

A11. The medium of embodiment A9, wherein the digital asset index value is a volume index value, and wherein the data associated with the selected candidate digital asset placement site is volume data.

A12. The medium of embodiment A9, further comprising instructions to: select at least one further candidate digital asset placement site, wherein the selected candidate digital asset placement sites collectively represent market performance of a market sector; and assign a weight to each candidate digital asset placement site; wherein calculating the digital asset index value comprises taking a weighted sum of data associated with the selected candidate digital asset placement sites.

A13. A processor-implemented digital asset real-time data aggregating method, comprising: receiving a future digital asset request specifying a plurality of digital asset attribute parameters and a requested redemption date; determining a demand for a futures contract related to the requested future digital asset; receiving an order to fulfill the future digital asset request; and generating a digital asset futures obligation.

A14. The method of embodiment A13, further comprising receiving a redemption request and sending an ad fulfillment request.

A15. A processor-implemented digital asset real-time data aggregating system, comprising: means for receiving a future digital asset request specifying a plurality of digital asset attribute parameters and a requested redemption date; means for determining demand for a futures contract related to the requested future digital asset; means for receiving an order to fulfill the future digital asset request; and means for generating a digital asset futures obligation.

A16. The system of embodiment A15, further comprising: means for receiving a redemption request; and means for sending an ad fulfillment request.

A17. A digital asset real-time data aggregating apparatus, comprising a processor and a memory disposed in communication with the processor and storing processor-executable instructions to: receive a future digital asset request specifying a plurality of digital asset attribute parameters and a requested redemption date; determine demand for a futures contract related to the requested future digital asset; receive an order to fulfill the future digital asset request; and generate a digital asset futures obligation.

A18. The apparatus of embodiment A17, further comprising instructions to receive a redemption request and send an ad fulfillment request.

A19. A processor-readable non-transitory medium storing processor-executable digital asset real-time data aggregating instructions, the instructions executable by a processor to: receive a future digital asset request specifying a plurality of digital asset attribute parameters and a requested redemption date; determine demand for a futures contract related to the requested future digital asset; receive an order to fulfill the future digital asset request; and generate a digital asset futures obligation.

A20. The medium of embodiment A19, further comprising instructions to receive a redemption request and send an ad fulfillment request.

B1. A processor-implemented digital asset real-time data aggregating method, comprising: determining a digital asset market bid sampling rate for a digital asset associated with a plurality of attribute parameters; submitting a digital asset pricing bid to an exchange platform; determining a current digital asset price based on bidding result of the digital asset market bids sampling; and aggregating the determined current digital asset price to generate a digital asset price index for the digital asset associated with a plurality of attribute parameters.

B2. The method according to embodiment B1, further comprising generating a financial instrument based on the generated digital asset price index.

B3. The method according to embodiment B2, further comprising: receiving a trading request for the financial instrument via a trading platform; and facilitating a transaction of trading the financial instrument via the trading platform.

B4. A digital asset real-time data aggregating apparatus, comprising a processor and a memory disposed in communication with the processor and storing processor-executable instructions to: determine a digital asset market bid sampling rate for a digital asset associated with a plurality of attribute parameters; submit a digital asset pricing bid to an exchange platform; determine a current digital asset price based on bidding result of the digital asset market bids sampling; and aggregate the determined current digital asset price to generate a digital asset price index for the digital asset associated with a plurality of attribute parameters.

B5. The apparatus according to embodiment B4, further comprising instructions to generate a financial instrument based on the generated digital asset price index.

B6. The apparatus according to embodiment B5, further comprising instructions to: receive a trading request for the financial instrument via a trading platform; and facilitate a transaction of trading the financial instrument via the trading platform.

B7. A processor-readable non-transitory medium storing digital asset real-time data aggregating instructions, the instructions executable by a processor to: determine a digital asset market bid sampling rate for a digital asset associated with a plurality of attribute parameters; submit a digital asset pricing bid to an exchange platform; determine a current digital asset price based on bidding result of the digital asset market bids sampling; and aggregate the determined current digital asset price to generate a digital asset price index for the digital asset associated with a plurality of attribute parameters.

B8. The medium according to embodiment B7, further comprising instructions to generate a financial instrument based on the generated digital asset price index.

B9. The apparatus according to embodiment B8, further comprising instructions to: receive a trading request for the financial instrument via a trading platform; and facilitate a transaction of trading the financial instrument via the trading platform.

B10. A processor-implemented digital asset real-time data aggregating method, comprising: determining a bidding price for a digital asset associated with a plurality of digital asset attribute parameters; generating a digital asset bidding request including the determined bidding price and information of the digital asset attribute parameters; submitting the digital asset bidding request to a digital asset exchange platform; receiving a bidding result from the digital asset exchange platform; determining a current price based on the bidding price associated with the plurality of the digital asset attribute parameters when the bidding result is positive; adjusting the bidding price for the digital asset associated with the plurality of digital asset attribute parameters and re-submitting a digital asset bidding request with the adjusted bidding price to the digital asset exchange platform when the bidding result is negative; and generating a digital asset price stream based on the current price for the digital asset associated with the plurality of the digital asset attribute parameters.

B11. The method of embodiment B10, wherein the digital asset is an advertisement.

B12. The method of embodiment B10, wherein the digital asset bidding request is submitted by a bidding agent.

B13. The method of embodiment B10, further comprising: submitting an access request to a demand side platform for digital asset pricing data; and obtaining digital asset pricing data from the demand side platform.

B14. The method of embodiment B10, further comprising: periodically sending an access request to a data source for digital asset pricing updates.

B15. The method of embodiment B10, wherein the digital asset price stream is generated based on any of: a bidding sampling result; digital asset pricing data obtained from a demand side platform; and digital asset pricing data obtained from a data source.

B16. A processor-implemented digital asset real-time data aggregating system, comprising: means for determining a bidding price for a digital asset associated with a plurality of digital asset attribute parameters; means for generating a digital asset bidding request including the determined bidding price and information of the digital asset attribute parameters; means for submitting the digital asset bidding request to a digital asset exchange platform; means for receiving a bidding result from the digital asset exchange platform; means for determining a current price based on the bidding price associated with the plurality of digital asset attribute parameters when the bidding result is positive; means for adjusting the bidding price for the digital asset associated with the plurality of digital asset attribute parameters and re-submitting a digital asset bidding request with the adjusted bidding price to the digital asset exchange platform when the bidding result is negative; and means for generating a digital asset price stream based on the current price for the digital asset associated with the plurality of the digital asset attribute parameters.

B17. The system of embodiment B16, wherein the digital asset price stream is generated based on any of: a bidding sampling result; digital asset pricing data obtained from a demand side platform; and digital asset pricing data obtained from a data source.

B18. A digital asset real-time data aggregating apparatus comprising a processor and a memory disposed in communication with the processor and storing processor-executable instructions to: determine a bidding price for a digital asset associated with a plurality of digital asset attribute parameters; generate a digital asset bidding request including the determined bidding price and information of the digital asset attribute parameters; submit the digital asset bidding request to a digital asset exchange platform; receive a bidding result from the digital asset exchange platform; determine a current price based on the bidding price associated with the plurality of digital asset attribute parameters when the bidding result is positive; adjust the bidding price for the digital asset associated with the plurality of digital asset attribute parameters and re-submitting a digital asset bidding request with the adjusted bidding price to the digital asset exchange platform when the bidding result is negative; and generate a digital asset price stream based on the current price for the digital asset associated with the plurality of the digital asset attribute parameters.

B19. The apparatus of embodiment B18, wherein the digital asset price stream is generated based on any of: a bidding sampling result; digital asset pricing data obtained from a demand side platform; and digital asset pricing data obtained from a data source.

B20. A processor-readable non-transitory medium storing processor-executable digital asset real-time data aggregating instructions, the instructions executable by a processor to: determine a bidding price for a digital asset associated with a plurality of digital asset attribute parameters; generate a digital asset bidding request including the determined bidding price and information of the digital asset attribute parameters; submit the digital asset bidding request to a digital asset exchange platform; receive a bidding result from the digital asset exchange platform; determine a current price based on the bidding price associated with the plurality of digital asset attribute parameters when the bidding result is positive; adjust the bidding price for the digital asset associated with the plurality of digital asset attribute parameters and re-submitting a digital asset bidding request with the adjusted bidding price to the digital asset exchange platform when the bidding result is negative; and generate a digital asset price stream based on the current price for the digital asset associated with the plurality of the digital asset attribute parameters.

RDA Controller

Figure 14:
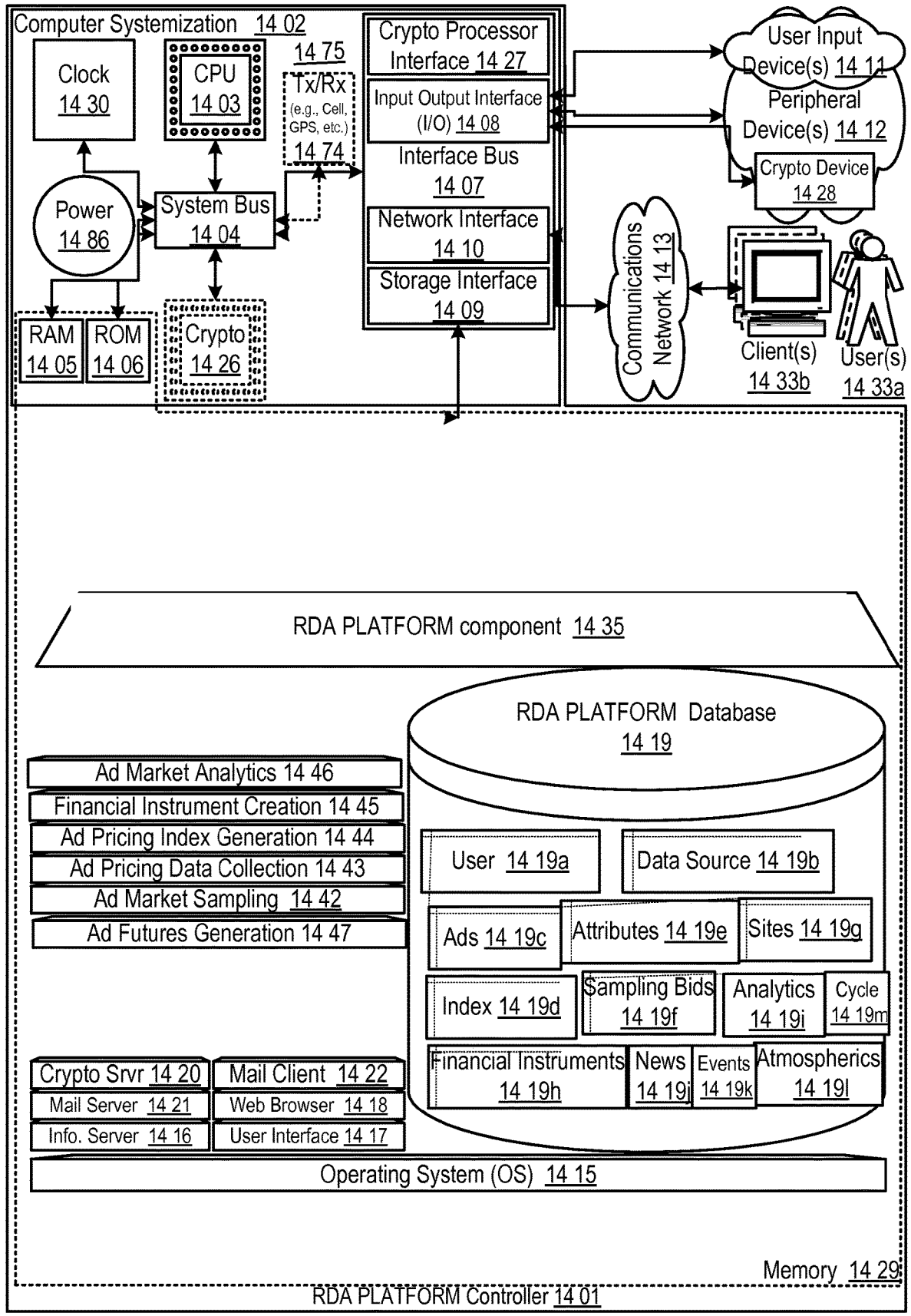
FIG. 14 shows a block diagram illustrating example aspects of a RDA controller.

FIG. 14 shows a block diagram illustrating example aspects of a RDA controller 1401. In this embodiment, the RDA controller 1401 may serve to aggregate, process, store, search, serve, identify, instruct, generate, match, and/or facilitate interactions with a computer through various technologies, and/or other related data.

Users, e.g., 1433*a*, which may be people and/or other systems, may engage information technology systems (e.g., computers) to facilitate information processing. In turn, computers employ processors to process information; such processors 1403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the RDA controller 1401 may be connected to and/or communicate with entities such as, but not limited to: one or more users from user input devices 1411; peripheral devices 1412; an optional cryptographic processor device 1428; and/or a communications network 1413. For example, the RDA controller 1401 may be connected to and/or communicate with users, e.g., 1433*a*, operating client device(s), e.g., 1433*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RDA controller 1401 may be based on computer systems that may comprise, but are not limited to, components such as: a computer systemization 1402 connected to memory 1429.

Computer Systemization

A computer systemization 1402 may comprise a clock 1430, central processing unit ("CPU(s)") and/or "processor(s)" (these terms are used interchangeably throughout the disclosure unless noted to the contrary)) 1403, a memory 1429 (e.g., a read only memory (ROM) 1406, a random access memory (RAM) 1405, etc.), and/or an interface bus 1407, and most frequently, although not necessarily, are all interconnected and/or communicating through a system bus 1404 on one or more (mother)board(s) 1402 having conductive and/or otherwise transportive circuit pathways through which instructions (e.g., binary encoded signals) may travel to effectuate communications, operations, storage, etc. The computer systemization may be connected to a power source 1486; e.g., optionally the power source may be internal. Optionally, a cryptographic processor 1426 and/or transceivers (e.g., ICs) 1474 may be connected to the system bus. In another embodiment, the cryptographic processor and/or transceivers may be connected as either internal and/or external peripheral devices 1412 via the interface bus I/O. In turn, the transceivers may be connected to antenna(s) 1475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing RDA controller to determine its location)); Broadcom BCM4329FKUBG transceiver chip (e.g., providing 802.11n, Bluetooth 2.1+ EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 1429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the RDA controller and beyond through various interfaces. Should processing requirements dictate a greater amount speed and/or capacity, distributed processors (e.g., Distributed RDA), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the RDA may be achieved by implementing a microcontroller such as CAST's R8051XC2 microcontroller; Intel's MCS 51 (i.e., 8051 microcontroller); and/or the like. Also, to implement certain features of the RDA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the RDA component collection (distributed or otherwise) and/or features may be implemented via the microprocessor and/or via embedded components; e.g., via ASIC, coprocessor, DSP, FPGA, and/or the like. Alternately, some implementations of the RDA may be implemented with embedded components that are configured and used to achieve a variety of features or signal processing.

Depending on the particular implementation, the embedded components may include software solutions, hardware solutions, and/or some combination of both hardware/software solutions. For example, RDA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the RDA features. A hierarchy of programmable interconnects allow logic blocks to be interconnected as needed by the RDA system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the RDA may be developed on regular FPGAs and then migrated into a fixed version that more resembles ASIC implementations. Alternate or coordinating implementations may migrate RDA controller features to a final ASIC instead of or in addition to FPGAs. Depending on the implementation all of the aforementioned embedded components and microprocessors may be considered the "CPU" and/or "processor" for the RDA.

Power Source

The power source 1486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1486 is connected to at least one of the interconnected subsequent components of the RDA thereby providing an electric current to all the interconnected components. In one example, the power source 1486 is connected to the system bus component 1404. In an alternative embodiment, an outside power source 1486 is provided through a connection across the I/O 1408 interface. For example, a USB and/or IEEE 1394 connection carries both data and power across the connection and is therefore a suitable source of power.

Interface Adapters

Interface bus(ses) 1407 may accept, connect, and/or communicate to a number of interface adapters, frequently, although not necessarily in the form of adapter cards, such as but not limited to: input output interfaces (I/O) 1408, storage interfaces 1409, network interfaces 1410, and/or the like. Optionally, cryptographic processor interfaces 1427 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 1409 may accept, communicate, and/or connect to a number of storage devices such as, but not limited to: storage devices 1414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 1410 may accept, communicate, and/or connect to a communications network 1413. Through a communications network 1413, the RDA controller is accessible through remote clients 1433b (e.g., computers with web browsers) by users 1433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed RDA), architectures may similarly be employed to pool, load balance, and/or otherwise increase the communicative bandwidth required by the RDA controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1410 may be used to engage with various communications network types 1413. For example, multiple network interfaces may be employed to allow for the communication over broadcast, multicast, and/or unicast networks.

Input Output interfaces (I/O) 1408 may accept, communicate, and/or connect to user input devices 1411, peripheral devices 1412, cryptographic processor devices 1428, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 1411 often are a type of peripheral device 1412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1412 may be connected and/or communicate to I/O and/or other facilities of the like such as network interfaces, storage interfaces, directly to the interface bus, system bus, the CPU, and/or the like. Peripheral devices may be external, internal and/or part of the RDA controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1428), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the RDA controller may be embodied as an embedded, dedicated, and/or monitor-less (i.e., headless) device, wherein access may be provided over a network interface connection.

Cryptographic units such as, but not limited to, microcontrollers, processors 1426, interfaces 1427, and/or devices 1428 may be attached, and/or communicate with the RDA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1429. However, memory is a fungible technology and resource, thus, any number of memory embodiments may be employed in lieu of or in concert with one another. It is to be understood that the RDA controller and/or a computer systemization may employ various forms of memory 1429. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 1429 may include ROM 1406, RAM 1405, and a storage device 1414. A storage device 1414 may employ any number of computer storage devices/ systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1429 may contain a collection of program and/or database components and/or data such as, but not limited to: operating system component(s) 1415 (operating system); information server component(s) 1416 (information server); user interface component(s) 1417 (user interface); Web browser component(s) 1418 (Web browser); database(s) 1419; mail server component(s) 1421; mail client component(s) 1422; cryptographic server component(s) 1420 (cryptographic server); the RDA component(s) 1435; and/or the like (i.e., collectively a component collection). These components may be stored and accessed from the storage devices and/or from storage devices accessible through an interface bus. Although non-conventional program components such as those in the component collection may be stored in a local storage device 1414, they may also be loaded and/or stored in memory such as: peripheral devices, RAM, remote storage facilities through a communications network, ROM, various forms of memory, and/or the like.

Operating System

The operating system component 1415 is an executable program component facilitating the operation of the RDA controller. The operating system may facilitate access of I/O, network interfaces, peripheral devices, storage devices, and/ or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RDA controller to communicate with other entities through a communications network 1413. Various communication protocols may be used by the RDA controller as a subcarrier transport mechanism for interaction, such as, but not limited to: multicast, TCP/IP, UDP, unicast, and/or the like.

Information Server

An information server component 1416 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the RDA controller based on the remainder of the HTTP request. For example, a request such as http://123.124.125.126/myInformation-.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RDA database 1419, operating systems, other program components, user interfaces, Web browsers, and/or the like.

Access to the RDA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RDA. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RDA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1417 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1418 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the RDA equipped nodes. The combined application may be nugatory on systems employing standard Web browsers.

Mail Server

A mail server component 1421 is a stored program component that is executed by a CPU 1403. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the RDA.

Access to the RDA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1422 is a stored program component that is executed by a CPU 1403. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1420 is a stored program component that is executed by a CPU 1403, cryptographic processor 1426, cryptographic processor interface 1427, cryptographic processor device 1428, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RDA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RDA component to engage in secure transactions if so desired. The cryptographic component facilitates the secure accessing of resources on the RDA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RDA Database

The RDA database component 1419 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RDA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the RDA database is implemented as a data-structure, the use of the RDA database 1419 may be integrated into another component such as the RDA component 1435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1419 includes several tables 1419*a-m*. A Users table 1419*a* may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a RDA. A Data Source table 1419*b* may include fields such as, but not limited to: source_ID, source_name, source_server_IP, device_domain, source_url, source_security_protocol, source_ftp, device_securekey, and/or the like. An Ads table 1419*c* may include fields such as, but not limited to: ads_ID, ads_name, ads_type, ads_sponsor, ads_channel, ads_time, ads_geo, ads_attribute, ads_format, and/or the like. An Index table 1419*d* may include fields such as, but not limited to: index_id, index_name, index_attribute, index_value, index_rate, index_volume, index_timestamp, index_source, and/or the like. An attribute table 1419*e* may include fields such as, but not limited to: geo-location, industry, publisher, industry_advertisers, ad_size, ad_format (e.g., banner, audio, video, content synthesis, demographic synthesized ads, intended audience demographics, etc.), media_channels (e.g., TV, video, mobile, search, dialogue, glasses, billboards, social, radio, print, atmospherics, weather, events, etc.), ad-device_types (e.g., browser, mobile, etc.), search_channel, time, duration, news_events, and/or the like. A Sampling Bids table 1419*f* may include fields such as, but not limited to: bid_id, bid_time, bid_attribute, bid_ad type, bid_ad_name, bid_ad_description, bid_rate, bid_result, and/or the like. A Sites table 1419*g* may include fields such as, but not limited to: site_id, site_name, site_domain, site_url, site_content, site_tag, site_context,site_impression, site_visits, site_headline, site_page, site_ad_price, site_placement, site_position, and/or the like. A Financial Instrument table 1419*h* may include fields such as, but not limited to: instrument_id, instrument_type, instrument_Reg, instrument_structure, instrument_asset_id, instrument_ad_index, instrument_index_value, instrument_exchange id, and/or the like. An Analytics table 1419*i* may include fields such as, but not limited to: Analytics_id, analytics_time, analytics ad_id, analytics_source_id, analytics_plot, analytics_prejection, analytics_map, analytics UI_template, analytics_buy_point, and/or the like. A News table 1419*j* may include fields such as, but not limited to: news_id, news_time, news_date, news_title, news_source, news_geo, news_zipcode, news_type, news industry, news_target_audience, news_impact_audience, news_description, news_tag, and/or the like. An Events table 1419*k* may include fields such as, but not limited to: events_id, events_time, events_date, events_title, events_sponsor, events_geo, events_zipcode, events_type, events_industry, events_participants, events_impactor, event_broadcasting, events_description, events_tag, and/or the like. An Atmospherics table 1419*l* may include fields such as, but not limited to: atmo_id, atmo_time, atmo_date, atmo_type, atmo_industry, atmo_target_group, atmo_impactor, atmo_context tag, atmo_rating, atmo_content, atmo_description, and/or the like. A Cycle table 1419*k* may include fields such as, but not limited to: cycle_id, cycle_name, cycle_start_date, cycle_end_date, cycle_duration, cycle_frequency, cycle_type, cycle_sponsor, cycle_geo, cycle_zipcode, cycle_industry, cycle_participants, cycle_impactor, cycle_description, cycle_tag, and/or the like.

In one embodiment, the RDA database may interact with other database systems. For example, employing a distributed database system, queries and data access by search RDA component may treat the combination of the RDA database, an integrated data security layer database as a single database entity.

In one embodiment, user programs may contain various user interface primitives, which may serve to update the RDA. Also, various accounts may require custom database tables depending upon the environments and the types of clients the RDA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1419a-m. The RDA may be configured to keep track of various settings, inputs, and parameters via database controllers.

The RDA database may communicate to and/or with other components in a component collection, including itself, and/or facilities of the like. Most frequently, the RDA database communicates with the RDA component, other program components, and/or the like. The database may contain, retain, and provide information regarding other nodes and data.

The RDAs

The RDA component 1435 is a stored program component that is executed by a CPU. In one embodiment, the RDA component incorporates any and/or all combinations of the aspects of the RDA discussed in the previous figures. As such, the RDA affects accessing, obtaining and the provision of information, services, transactions, and/or the like across various communications networks. The features and embodiments of the RDA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the RDA's features and facilities, and in many cases reduce the costs, energy consumption/ requirements, and extend the life of RDA's underlying infrastructure; this has the added benefit of making the RDA more reliable. Similarly, many of the features and mechanisms are designed to be easier for users to use and access, thereby broadening the audience that may enjoy/employ and exploit the feature sets of the RDA; such ease of use also helps to increase the reliability of the RDA. In addition, the feature sets include heightened security as noted via the Cryptographic components 1420, 1426, 1428 and throughout, making access to the features and data more reliable and secure.

The RDA component may transform ad bidding request (e.g., see 203 in FIG. 2A) via RDA components, such as but not limited to Ad Market Sampling component 1442 (e.g., see FIGS. 4A-4F), Ad Pricing Data Collection 1443 (e.g., see FIG. 3A), Ad Pricing Index Generation 1444 (e.g., see FIGS. 3B-3C), Financial Instrument Creation 1445, Ad Market Analytics 1446 (e.g., see FIG. 5J), Ad Futures Generation 1447 (e.g., see FIG. 12), and/or the like into ad pricing indices, financial instruments and/or the like and use of the RDA.

The RDA component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the RDA server employs a cryptographic server to encrypt and decrypt communications. The RDA component may communicate to and/or with other components in a component collection, including itself, and/or facilities of the like. Most frequently, the RDA component communicates with the RDA database, operating systems, other program components, and/or the like. The RDA may contain, communicate, generate, obtain, and/or provide program component, system, user, and/or data communications, requests, and/or responses.

Distributed RDAs

The structure and/or operation of any of the RDA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the RDA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the RDA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference herein.

In order to address various issues and advance the art, the entirety of this application for REAL-TIME DIGITAL ASSET SAMPLING APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a RDA individual and/or enterprise user, database configuration and/or relational model, data type, data transmission and/or network framework, syntax structure, and/or the like, various embodiments of the RDA may be implemented that allow a great deal of flexibility and customization. For example, aspects of the RDA may be adapted for data network bandwidth management. While various embodiments and discussions of the RDA have been directed to aggregating virtual commodity bidding and transactional data, however, it is to be understood that the embodiments described herein may be readily configured and/or customized for a wide variety of other applications and/or implementations.

What is claimed is:

1. An apparatus comprising:
a memory;
a network interface;
at least one processor to:
store, across a plurality of nodes, attributes of advertisements previously rendered online, such that each node stores a specific advertising attribute, the attributes comprising presentation format, geo-location of each rendered advertisement, size of each rendered advertisement, and display duration;
receive, via the network interface, a query for pricing related to advertising space with specific attributes available on a website;
separate the query into multiple subqueries;
associate each subquery with a respective attribute of the advertisements previously rendered online;
determine a hash for each node based on a host/port combination associated with each subquery;
route, via the network interface, each subquery to a respective node based at least partially on the hash;
receive attribute-specific pricing information from each node;
aggregate the attribute-specific pricing information received from each node;
display aggregated pricing information on a graphical user interface based on results provided by each node;
receive a bid, via the graphical user interface, to place an online advertisement with the specific attributes on a website;
determine that the bid to place the online advertisement is a winning bid, based at least in part on a bid price and the aggregated pricing information; and
transmit a message announcing that the bid is a winning bid.

2. The apparatus of claim 1, wherein the at least one processor is further configured to render on the graphical user interface a curve indicative of the aggregated pricing information.

3. The apparatus of claim 1, wherein the aggregated pricing information further comprises a list of websites that provide advertising space with the specific attributes.

4. The apparatus of claim 3, wherein the at least one processor is further configured to remove websites from the list of websites whose minimum number of ad impressions falls below a threshold.

5. The apparatus of claim 3, wherein the at least one processor is further configured to assign a weight to each website in the list based on prior market performance.

6. The apparatus of claim 3, wherein the at least one processor is further configured to receive an indication that advertising space with the specific attributes is available on a website.

7. The apparatus of claim 3, wherein the at least one processor is further configured to track data related to an advertisement shown on a website.

8. The apparatus of claim 1, wherein, to store the attributes of advertisements previously rendered online, the at least one processor is configured to distribute the attributes of the advertisements across different nodes.

9. A method comprising:
storing, by at least one processor, across a plurality of nodes, attributes of advertisements previously rendered online, such that each node stores a specific advertising attribute, the attributes comprising presentation format, geo-location of each rendered advertisement, size of each rendered advertisement, and display duration;
receiving, by the at least one processor, a query for pricing related to advertising space with specific attributes available on a website;
separating, by the at least one processor, the query into subqueries such that each subquery is associated with a respective attribute;
separating, by the at least one processor, the query into multiple subqueries;

associating, by the at least one processor, each subquery with a respective attribute of the advertisements previously rendered online;

determining, by the at least one processor, a hash for each node based on a host/port combination associated with each subquery;

routing, by the at least one processor, each subquery to a respective node based at least partially on the hash;

receiving, by the at least one processor, attribute-specific pricing information from each node;

aggregating, by the at least one processor, the attribute-specific pricing information received from each node;

displaying, by the at least one processor, aggregated pricing information on a graphical user interface based on results provided by each node;

receiving, by the at least one processor, a bid, via the graphical user interface, to place an online advertisement with the specific attributes on a website;

determining, by the at least one processor, that the bid to place the online advertisement is a winning bid, based at least in part on a bid price and the aggregated pricing information; and transmitting, by the at least one processor, a message announcing that the bid is a winning bid.

10. The method of claim 9, further comprising rendering, by the at least one processor, on the graphical user interface a curve indicative of the aggregated pricing information.

11. The method of claim 9, wherein the aggregated pricing information further comprises a list of websites that provide advertising space with the specific attributes.

12. The method of claim 11, further comprising removing, by the at least one processor, websites from the list of websites whose minimum number of ad impressions falls below a threshold.

13. The method of claim 11, further comprising assigning, by the at least one processor, a weight to each website in the list based on prior market performance.

14. The method of claim 11, further comprising receiving, by the at least one processor, an indication that advertising space with the specific attributes is available on a website.

15. The method of claim 11, further comprising tracking, by the at least one processor, data related to an advertisement shown on a website.

16. The method of claim 9, wherein storing the attributes of advertisements previously rendered online further comprises distributing, by the at least one processor, the attributes of the advertisements across different nodes.

* * * * *